United States Patent
Goldston et al.

(10) Patent No.: US 11,039,660 B2
(45) Date of Patent: *Jun. 22, 2021

(54) SHOES, DEVICES FOR SHOES, AND METHODS OF USING SHOES

(71) Applicant: Athletic Propulsion Labs LLC, Los Angeles, CA (US)

(72) Inventors: Mark Goldston, Beverly Hills, CA (US); Adam Goldston, Los Angeles, CA (US); Ryan Goldston, Los Angeles, CA (US)

(73) Assignee: Athletic Propulsion Labs LLC, Beverly Hills, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 16/126,758

(22) Filed: Sep. 10, 2018

(65) Prior Publication Data

US 2019/0059512 A1 Feb. 28, 2019

Related U.S. Application Data

(63) Continuation of application No. 14/271,197, filed on May 6, 2014, now Pat. No. 10,085,514, which is a
(Continued)

(51) Int. Cl.
*A43B 13/18* (2006.01)
*A43B 3/00* (2006.01)
(Continued)

(52) U.S. Cl.
CPC ............ *A43B 13/181* (2013.01); *A43B 3/001* (2013.01); *A43B 3/0031* (2013.01); *A43B 7/144* (2013.01);
(Continued)

(58) Field of Classification Search
CPC ...... A43B 13/18; A43B 13/181; A43B 13/182; A43B 13/183; A43B 13/185; A43B 13/186
(Continued)

(56) References Cited

U.S. PATENT DOCUMENTS 413,693 A * 10/1889 Walker .................. A43B 13/182
36/28
507,490 A 10/1893 Gambino
(Continued)

FOREIGN PATENT DOCUMENTS

CN 2884963 4/2007
CN 200994449 12/2007
(Continued)

OTHER PUBLICATIONS

International Preliminary Report on Patentability for PCT patent application No. PCT/US2010/030012 dated Oct. 11, 2011.
(Continued)

*Primary Examiner* — Marie D Bays
(74) *Attorney, Agent, or Firm* — Foley & Lardner LLP

(57) ABSTRACT

A shoe includes a first plate and a second plate that are located in a portion of the shoe between an upper and an outsole of the shoe, and a nest formed as a bag filled with one or more gasses located between the first plate and the second plate. The shoe may further include one or more springs located in cavities in the gas filled nest for biasing the first plate and the second plate apart from each other. Pods may be located within the openings in the center of the springs, and the pods may be filled with one or more gasses. The pods may protrude from a bottom or a top surface of the nest. Spring sandwiches including one or more springs
(Continued)

positioned between plates may be constructed and placed in various portions of a shoe. The shoe may also include piping with lights.

20 Claims, 102 Drawing Sheets

Related U.S. Application Data continuation of application No. 13/270,153, filed on Oct. 10, 2011, now Pat. No. 8,752,306, which is a continuation-in-part of application No. 12/754,333, filed on Apr. 5, 2010, now Pat. No. 8,347,526, which is a continuation-in-part of application No. 12/467,679, filed on May 18, 2009, now Pat. No. 8,112,905.

(60) Provisional application No. 61/446,989, filed on Feb. 25, 2011, provisional application No. 61/299,761, filed on Jan. 29, 2010, provisional application No. 61/168,533, filed on Apr. 10, 2009.

(51) Int. Cl.
  *A43B 7/14* (2006.01)
  *F16F 13/00* (2006.01)

(52) U.S. Cl.
  CPC ............ *A43B 7/148* (2013.01); *A43B 7/1445* (2013.01); *A43B 13/182* (2013.01); *F16F 13/007* (2013.01)

(58) Field of Classification Search
  USPC ........................................ 36/28, 7.8
  See application file for complete search history.

(56) References Cited

U.S. PATENT DOCUMENTS

| | | |
|---|---|---|
| 1,010,187 A | 11/1911 | Scott |
| 1,069,001 A | 7/1913 | Guy |
| 1,088,328 A | 2/1914 | Cucinotta |
| 1,502,087 A * | 7/1924 | Bunns ................. A43B 13/182 36/28 |
| 2,109,180 A | 2/1938 | Mohun |
| 2,357,281 A | 8/1944 | Williams |
| 2,394,281 A | 2/1946 | Williams |
| 2,437,227 A | 3/1948 | Hall |
| 2,509,980 A * | 5/1950 | McCallum ........... A43C 15/161 36/62 |
| 2,682,712 A | 7/1954 | Owsen et al. |
| 2,721,400 A * | 10/1955 | Israel ................. A43B 13/182 36/169 |
| 2,766,901 A * | 10/1956 | Sunko ................. E05D 5/10 220/844 |
| 3,120,712 A | 2/1964 | Menken |
| 3,600,743 A * | 8/1971 | Meadows ............ E05D 11/105 16/278 |
| 3,869,752 A * | 3/1975 | Klay .................. E05D 3/02 16/234 |
| 4,016,662 A | 4/1977 | Thompson |
| 4,364,188 A * | 12/1982 | Turner ................ A43B 5/06 36/129 |
| 4,457,084 A | 7/1984 | Horibata et al. |
| 4,486,964 A | 12/1984 | Rudy |
| 4,506,460 A | 3/1985 | Rudy |
| 4,546,555 A | 10/1985 | Spademan |
| 4,592,153 A | 6/1986 | Jacinto |
| 4,603,452 A * | 8/1986 | Paciorek ............. E05D 7/10 16/262 |
| 4,709,489 A | 12/1987 | Welter |
| 4,771,554 A | 9/1988 | Hannemann |
| 4,815,221 A | 3/1989 | Diaz |
| 4,844,519 A * | 7/1989 | Dagon ................. E05B 37/20 292/57 |
| 4,854,057 A | 8/1989 | Misevich et al. |
| 4,878,300 A | 11/1989 | Bogaty |
| 4,894,934 A * | 1/1990 | Illustrato ................ A43B 21/26 36/102 |
| 4,901,987 A | 2/1990 | Greenhill et al. |
| 5,060,401 A | 10/1991 | Whatley |
| 5,092,060 A | 3/1992 | Frachey et al. |
| 5,159,767 A | 11/1992 | Allen |
| 5,203,095 A | 4/1993 | Allen |
| 5,224,278 A | 7/1993 | Jeon |
| 5,279,051 A | 1/1994 | Whatley |
| 5,282,325 A * | 2/1994 | Beyl .................... A43B 13/182 36/27 |
| 5,325,611 A | 7/1994 | Dyer et al. |
| 5,343,639 A | 9/1994 | Kilgore et al. |
| D355,755 S | 2/1995 | Kilgore |
| 5,437,110 A | 8/1995 | Goldston et al. |
| 5,464,197 A | 11/1995 | Ecclesfield |
| 5,502,901 A | 4/1996 | Brown |
| 5,513,448 A * | 5/1996 | Lyons ................. A43B 13/182 36/27 |
| 5,588,227 A | 12/1996 | Goldston et al. |
| 5,596,819 A | 1/1997 | Goldston et al. |
| 5,622,358 A | 4/1997 | Komura et al. |
| 5,649,373 A | 7/1997 | Winter et al. |
| 5,651,196 A | 7/1997 | Hsieh |
| 5,671,552 A | 9/1997 | Pettibone et al. |
| 5,706,589 A | 1/1998 | Marc |
| 5,743,028 A * | 4/1998 | Lombardino ........ A43B 13/182 36/27 |
| 5,845,419 A | 12/1998 | Begg |
| 5,875,567 A | 3/1999 | Bayley |
| 5,896,679 A | 4/1999 | Baldwin |
| 5,983,529 A | 11/1999 | Serna |
| 6,006,449 A * | 12/1999 | Orlowski ............. A43B 13/182 36/27 |
| 6,029,374 A | 2/2000 | Herr et al. |
| 6,041,478 A * | 3/2000 | Martin ................ E05D 15/242 16/380 |
| 6,055,747 A | 5/2000 | Lombardino |
| D433,216 S | 11/2000 | Avar et al. |
| 6,282,814 B1 | 9/2001 | Krafsur et al. |
| 6,336,249 B1 * | 1/2002 | Plumley ................ E05D 5/04 16/225 |
| 6,393,731 B1 * | 5/2002 | Moua ................ A43B 13/182 36/27 |
| 6,457,261 B1 | 10/2002 | Crary |
| 6,546,648 B2 * | 4/2003 | Dixon ................... A43B 5/00 36/25 R |
| 6,562,427 B2 * | 5/2003 | Hung ................. A43B 13/182 36/28 |
| 6,568,102 B1 | 5/2003 | Healy et al. |
| 6,662,472 B1 | 12/2003 | Hsu |
| 6,665,957 B2 | 12/2003 | Levert et al. |
| 6,730,379 B2 | 5/2004 | Bonk et al. |
| 6,751,891 B2 | 6/2004 | Lombardino |
| 6,860,034 B2 | 3/2005 | Schmid |
| 6,865,824 B2 | 3/2005 | Levert et al. |
| 6,886,274 B2 | 5/2005 | Krafsur et al. |
| D507,094 S | 7/2005 | Lyden |
| 6,920,705 B2 | 7/2005 | Lucas et al. |
| 6,928,756 B1 | 8/2005 | Haynes |
| 6,944,972 B2 | 9/2005 | Schmid |
| 6,983,553 B2 | 1/2006 | Lussier et al. |
| 7,100,308 B2 | 9/2006 | Aveni |
| 7,140,125 B2 | 11/2006 | Singleton et al. |
| 7,155,844 B2 * | 1/2007 | Chu ..................... A43B 13/181 36/28 |
| 7,159,338 B2 | 1/2007 | Levert et al. |
| 7,171,765 B2 | 2/2007 | Lo |
| D538,018 S | 3/2007 | Hlavacs |
| 7,219,447 B2 | 5/2007 | Levert et al. |
| 7,287,340 B2 | 10/2007 | Talbott |
| 7,290,354 B2 | 11/2007 | Perenich |
| 7,418,790 B2 | 9/2008 | Kerrigan |
| 7,441,347 B2 | 10/2008 | Levert et al. |
| 7,600,330 B2 | 10/2009 | Chen |
| 7,900,376 B2 | 3/2011 | Rabushka |

(56) References Cited

U.S. PATENT DOCUMENTS

| | | | |
|---|---|---|---|
| 7,950,166 B1* | 5/2011 | Perenich | A43B 13/141 36/102 |
| 8,112,905 B2 | 2/2012 | Bemis et al. | |
| 8,347,526 B2 | 1/2013 | Goldston et al. | |
| 8,495,825 B2 | 7/2013 | Goldston et al. | |
| 8,621,766 B2 | 1/2014 | Goldston | |
| 9,044,064 B2* | 6/2015 | Baucom | A43B 13/122 |
| 9,194,166 B1* | 11/2015 | Spiegel | E05D 11/1007 |
| 9,414,642 B2* | 8/2016 | Berend | A43B 13/141 |
| 10,045,588 B2* | 8/2018 | Berend | A43B 23/22 |
| 2001/0049888 A1* | 12/2001 | Krafsur | A43B 7/1425 36/27 |
| 2002/0073579 A1* | 6/2002 | Lombardino | A43B 13/182 36/28 |
| 2002/0133976 A1 | 9/2002 | Crutcher | |
| 2002/0144430 A1 | 10/2002 | Schmid | |
| 2002/0174567 A1 | 11/2002 | Krafsur et al. | |
| 2002/0189134 A1* | 12/2002 | Dixon | A43B 5/00 36/27 |
| 2003/0051372 A1 | 3/2003 | Lyden | |
| 2003/0126760 A1* | 7/2003 | LeVert | A43B 7/1425 36/27 |
| 2003/0163933 A1* | 9/2003 | Krafsur | A43B 7/1425 36/27 |
| 2003/0192200 A1 | 10/2003 | Dixon | |
| 2003/0200677 A1 | 10/2003 | Abraham | |
| 2003/0217483 A1 | 11/2003 | Abraham | |
| 2004/0118017 A1 | 6/2004 | Dalton et al. | |
| 2004/0154191 A1* | 8/2004 | Park | A43B 7/081 36/28 |
| 2004/0237340 A1 | 12/2004 | Rembrandt | |
| 2005/0081401 A1 | 4/2005 | Singleton et al. | |
| 2005/0126039 A1* | 6/2005 | LeVert | A43B 7/1425 36/27 |
| 2005/0138839 A1 | 6/2005 | Terlizzi et al. | |
| 2005/0166422 A1* | 8/2005 | Schaeffer | A43B 13/181 36/27 |
| 2005/0193595 A1 | 9/2005 | Jennings | |
| 2005/0241184 A1* | 11/2005 | LeVert | A43B 13/182 36/27 |
| 2005/0247385 A1 | 11/2005 | Krafsur et al. | |
| 2006/0021259 A1* | 2/2006 | Wood | A43C 15/167 36/128 |
| 2006/0048412 A1 | 3/2006 | Kerrigan | |
| 2006/0065499 A1* | 3/2006 | Smaldone | A43B 13/183 188/372 |
| 2006/0075657 A1* | 4/2006 | Chu | A43B 21/26 36/28 |
| 2006/0130371 A1 | 6/2006 | Schneider | |
| 2006/0277788 A1 | 12/2006 | Fujii | |
| 2007/0209232 A1 | 9/2007 | Chen | |
| 2008/0098619 A1 | 5/2008 | Smaldone et al. | |
| 2008/0184596 A1 | 8/2008 | Yu | |
| 2008/0209762 A1 | 9/2008 | Krafsur | |
| 2008/0263899 A1 | 10/2008 | Lee | |
| 2008/0271340 A1 | 11/2008 | Grisoni et al. | |
| 2008/0313928 A1* | 12/2008 | Adams | A43B 5/1633 36/103 |
| 2009/0064536 A1 | 3/2009 | Klassen et al. | |
| 2009/0100716 A1* | 4/2009 | Gerber | A43B 5/02 36/114 |
| 2009/0113760 A1 | 5/2009 | Dominguez | |
| 2010/0251571 A1* | 10/2010 | Woodard | A43B 13/181 36/103 |
| 2010/0257752 A1* | 10/2010 | Goldston | A43B 3/0031 36/108 |
| 2010/0257753 A1* | 10/2010 | Bemis | A43B 13/16 36/114 |
| 2011/0005100 A1 | 1/2011 | Smaldone et al. | |
| 2012/0023784 A1 | 2/2012 | Goldston et al. | |
| 2012/0096741 A1 | 4/2012 | Goldston et al. | |
| 2012/0110871 A1 | 5/2012 | Elnekaveh | |
| 2012/0204442 A1 | 8/2012 | Elnekaveh | |
| 2013/0091735 A1 | 4/2013 | Goldston et al. | |
| 2013/0118028 A1* | 5/2013 | Yoon | A43B 13/183 36/27 |
| 2015/0181977 A1* | 7/2015 | Klug | A43C 15/162 36/134 |

FOREIGN PATENT DOCUMENTS

| | | |
|---|---|---|
| EP | 0 552 994 B1 | 7/1993 |
| EP | 1 346 655 B1 | 9/2003 |
| WO | WO-99/38405 A1 | 8/1999 |

OTHER PUBLICATIONS

International Search Report and Written Opinion of the International Searching Authority for PCT patent application No. PCT/US2010/030012 dated Jul. 27, 2010.
Notice of Allowance and Fee(s) Due for U.S. Appl. No. 12/754,333 dated Nov. 23, 2012.
Notice of Allowance and Fee(s) Due for U.S. Appl. No. 13/341,267 dated Jun. 14, 2013.
Notice of Allowance and Fee(s) Due issued for U.S. Appl. No. 12/467,679 dated Nov. 14, 2011.
Notice of Allowance dated Oct. 21, 2013 for U.S. Appl. No. 13/708,883.
Notification of Transmittal of the International Search Report and the Written Opinion of the International Searching Authority for PCT patent application No. PCT/US2010/030012 dated Apr. 5, 2010.
Office Action dated May 29, 2013 in Taiwan Application No. 099110809.
Office Action for U.S. Appl. No. 13/341,267 dated Feb. 22, 2013.
Office Action dated Jul. 31, 2013 in U.S. Appl. No. 13/708,883.
Translation of Office Action for Taiwan Application No. 099110809.
U.S. Office Action for U.S. Appl. No. 12/754,333, dated Oct. 25, 2012.
U.S. Office Action for U.S. Appl. No. 12/754,333 dated Jun. 29, 2012.
U.S. Office Action dated Mar. 3, 2014 for U.S. Appl. No. 13/270,153.
U.S. Office Action dated Mar. 4, 2014 for U.S. Appl. No. 14/095,941.
U.S. Notice of Allowance dated Apr. 2, 2014, from U.S. Appl. No. 13/270,153.
U.S. Notice of Allowance dated Apr. 9, 2014, from U.S. Appl. No. 14/095,941.
U.S. Notice of Allowance dated Jun. 1, 2018, from U.S. Appl. No. 14/271,197.
U.S. Notice of Allowance dated Mar. 28, 2016, from related U.S. Appl. No. 14/095,950.
U.S. Notice of Allowance dated Nov. 23, 2012, from U.S. Appl. No. 12/754,333.
U.S. Office Action dated Dec. 22, 2017, from U.S. Appl. No. 14/271,197.
U.S. Office Action dated Jun. 29, 2012, from U.S. Appl. No. 12/754,333.
U.S. Office Action dated Mar. 4, 2014, from U.S. Appl. No. 14/095,941.
U.S. Office Action dated Oct. 25, 2012, from U.S. Appl. No. 12/754,333.
U.S. Office Action dated Sep. 6, 2017, from U.S. Appl. No. 14/271,197.
U.S. Office Action dated Sep. 7, 2011, from U.S. Appl. No. 12/467,679.
U.S. Office Action dated Feb. 22, 2013, from U.S. Appl. No. 13/341,267.
U.S. Office Action dated Nov. 20, 2015, from U.S. Appl. No. 14/095,950.
U.S. Office Action dated Jan. 31, 2017, from U.S. Appl. No. 14/271,197.

* cited by examiner

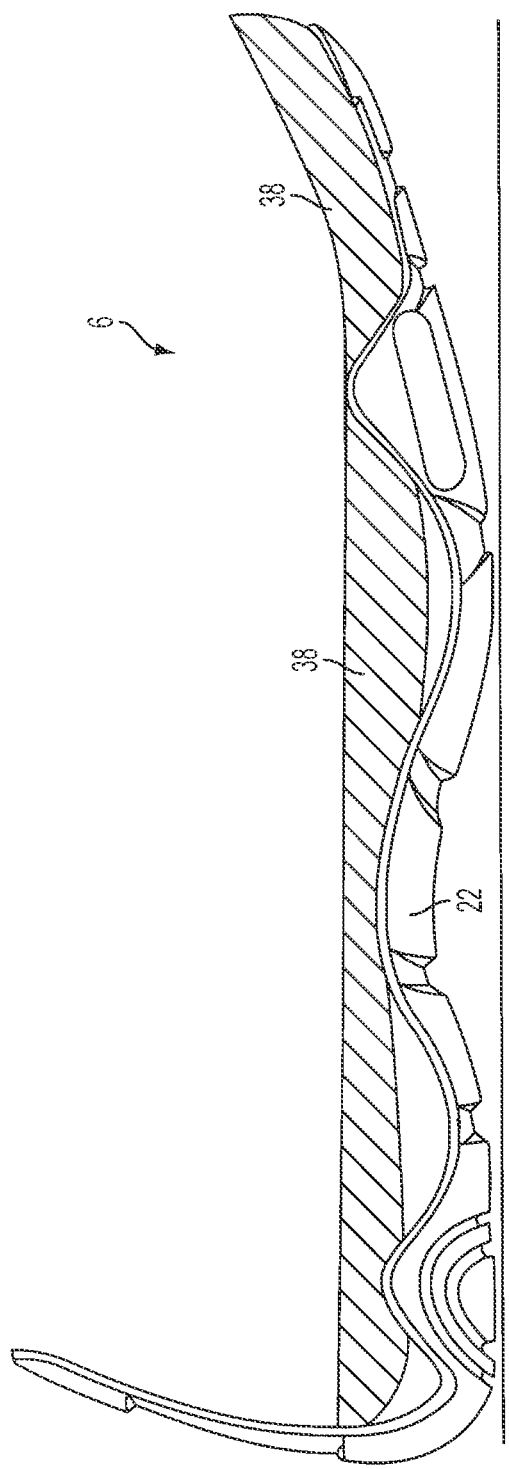
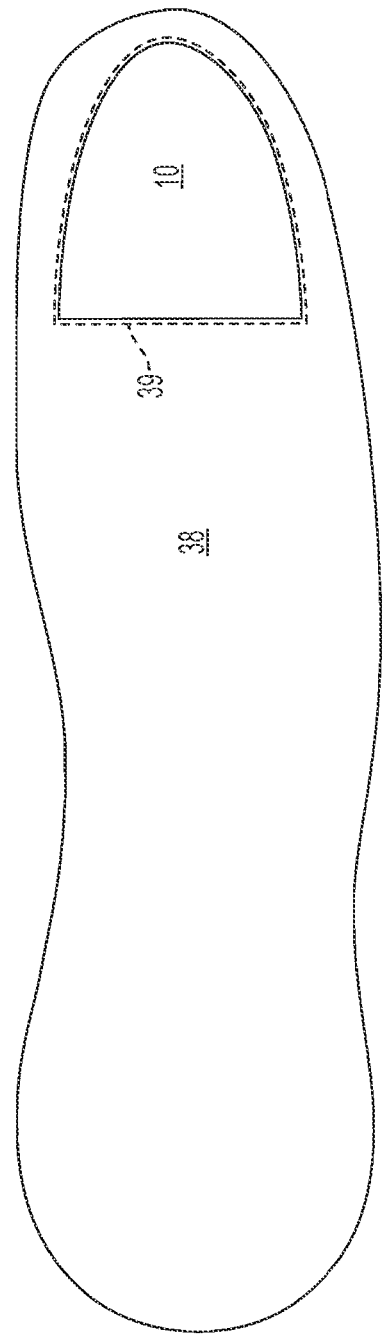
FIG. 13a
FIG. 13b

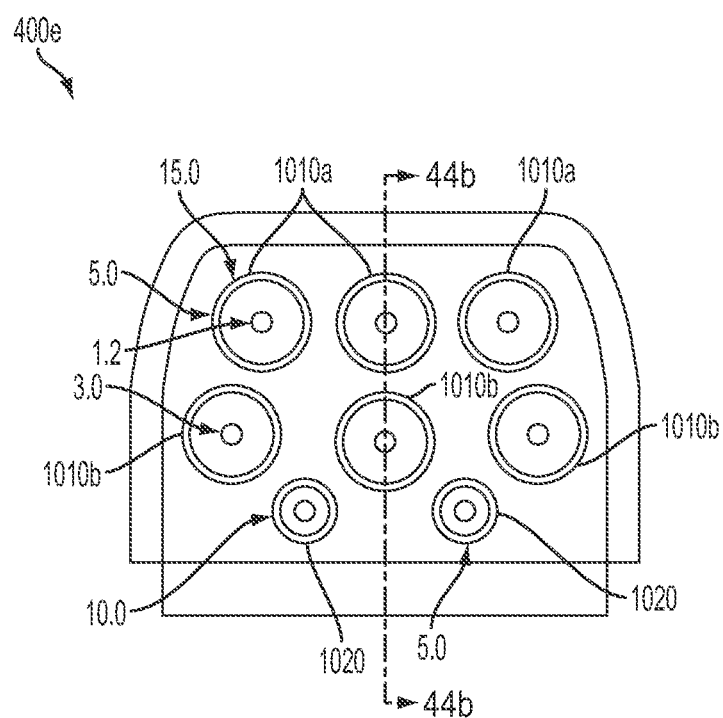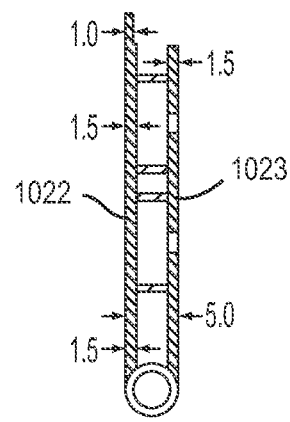
FIG. 44a
FIG. 44b

FIG. 53a
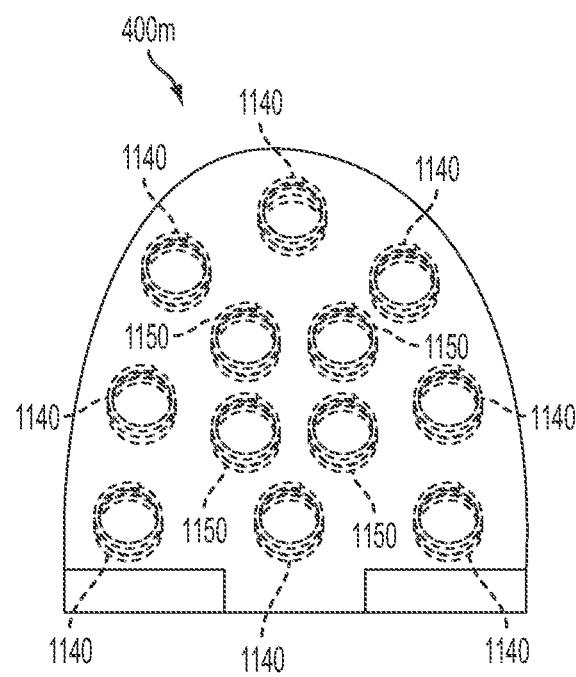
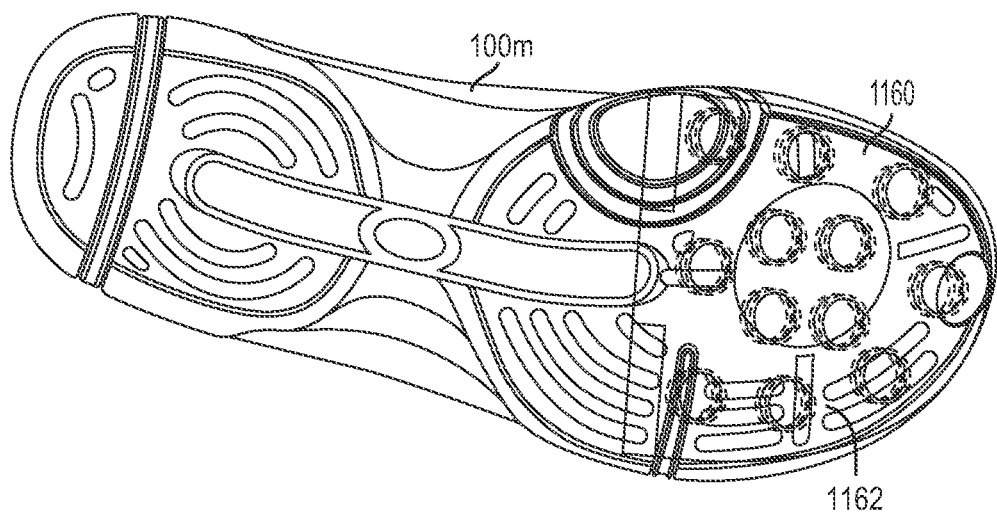
FIG. 53b

HEEL VIEW

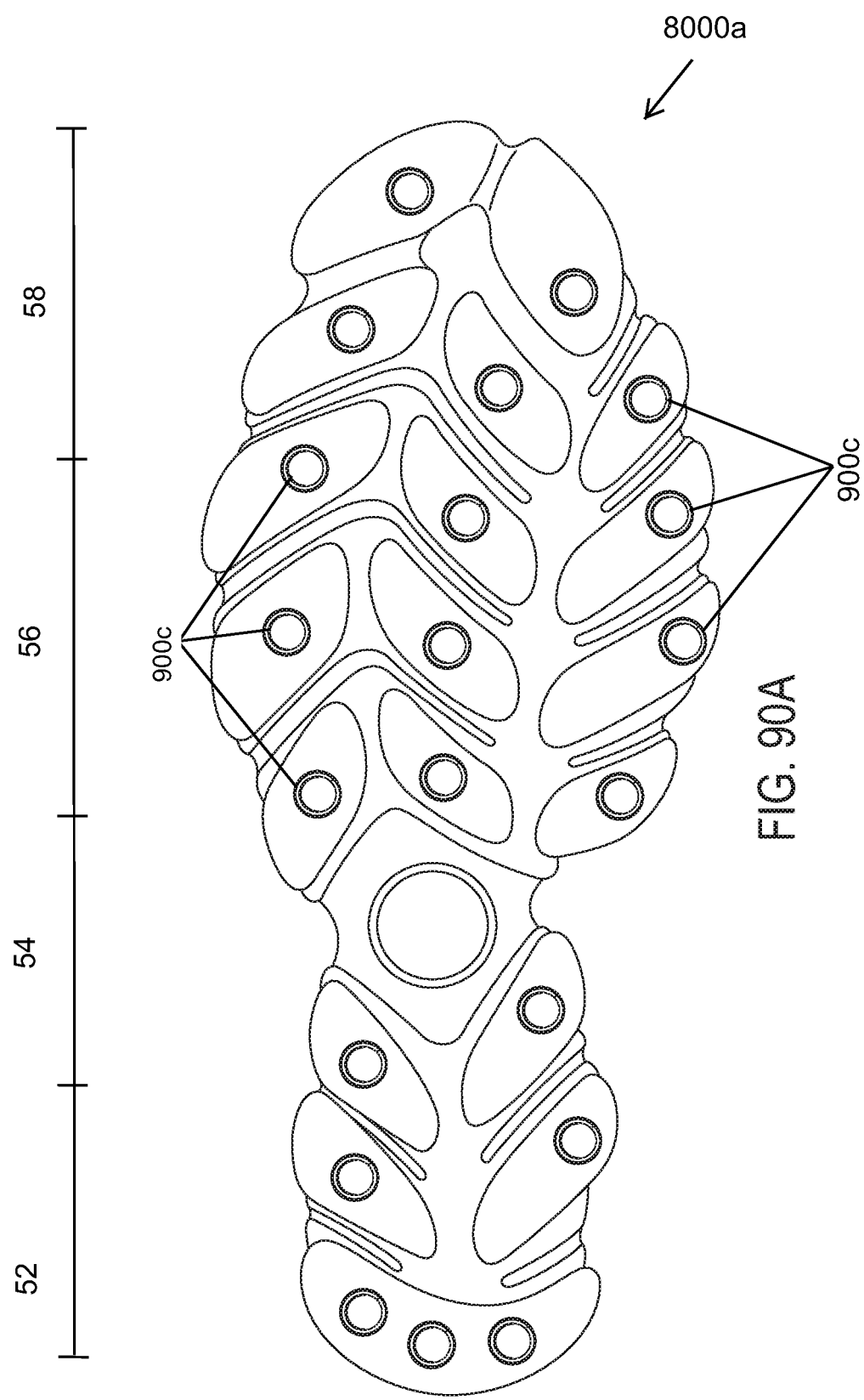

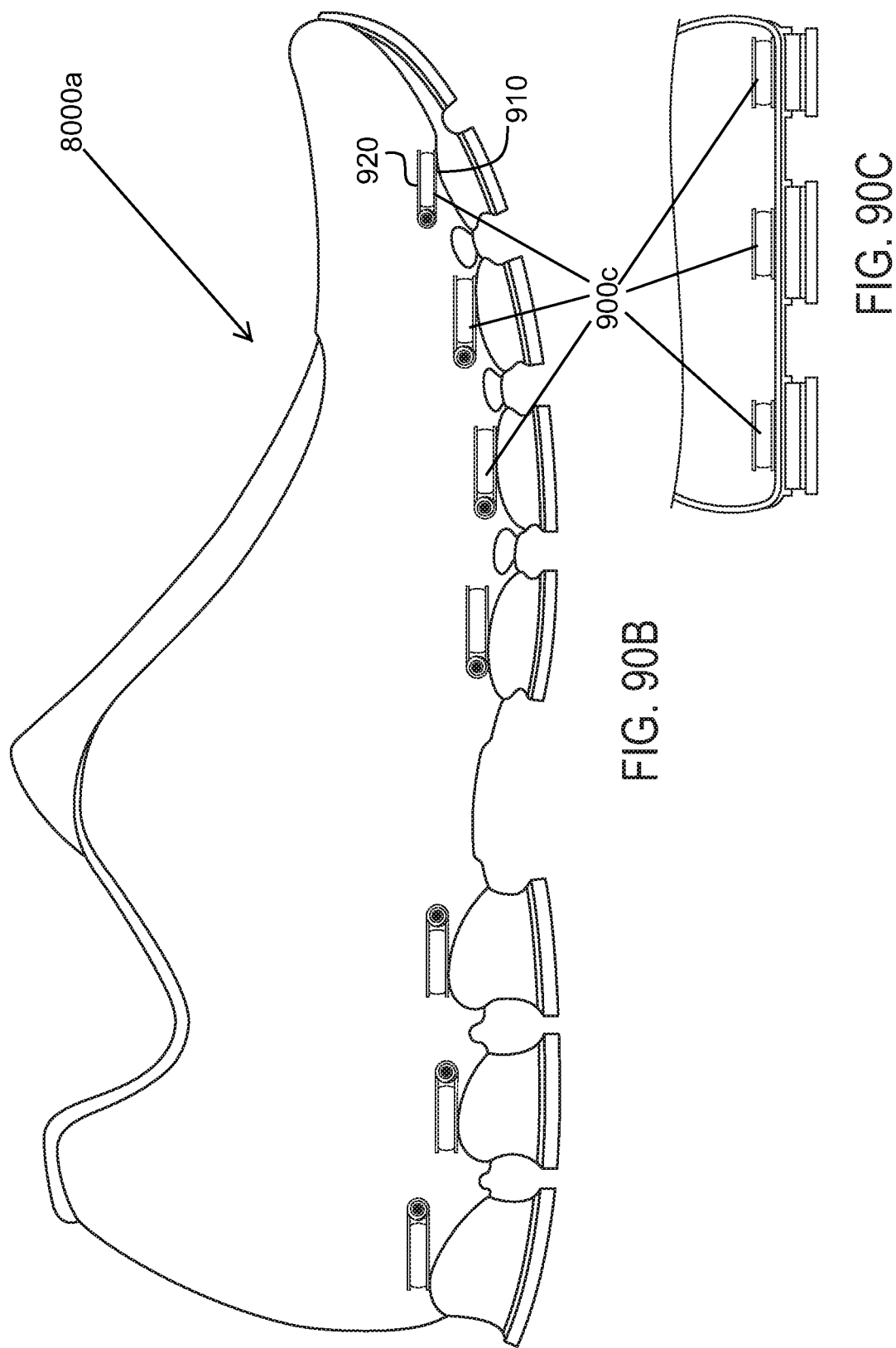

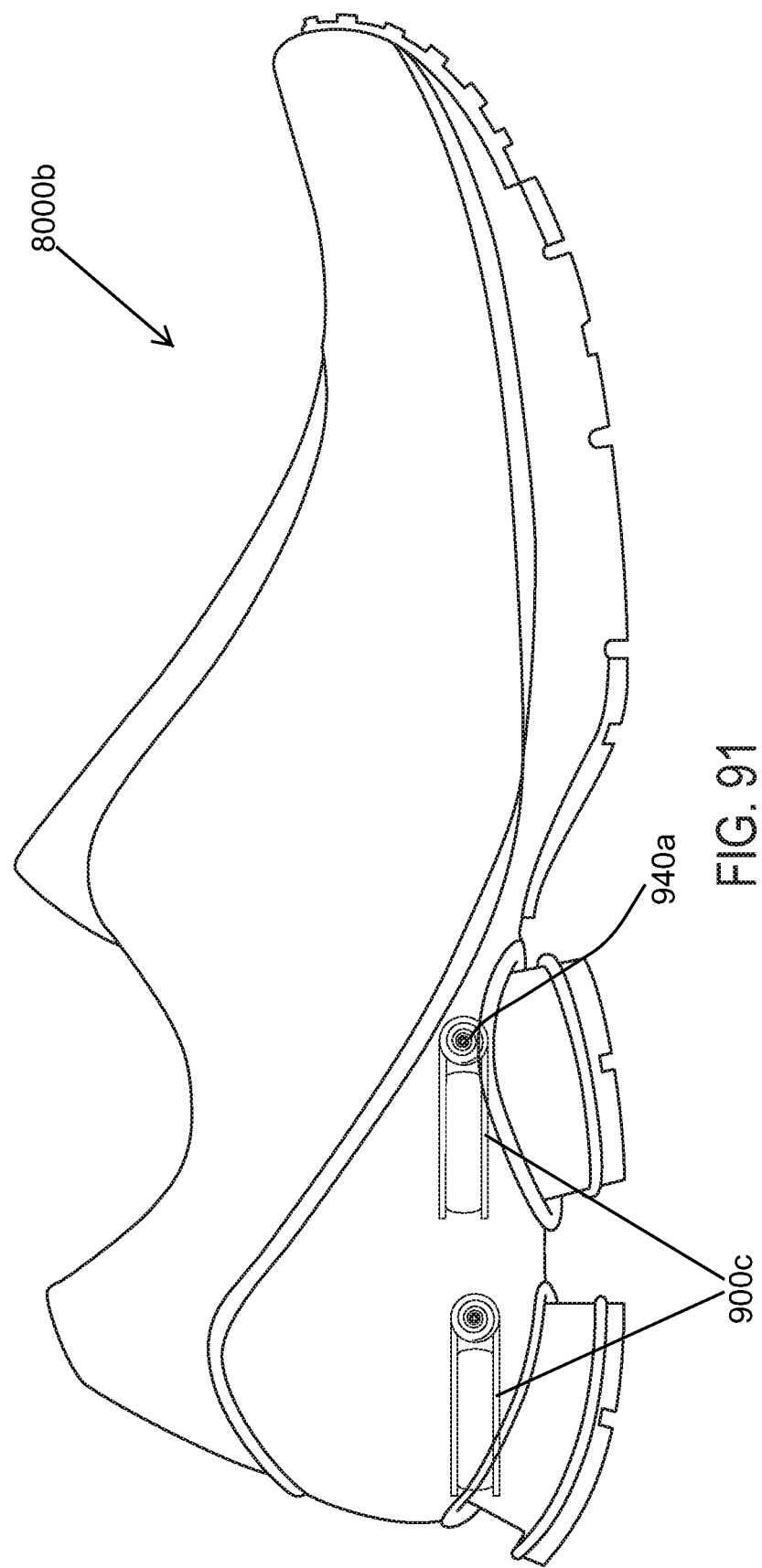

SHOES, DEVICES FOR SHOES, AND METHODS OF USING SHOES

CROSS-REFERENCE TO RELATED PATENT APPLICATIONS

This application is a continuation of U.S. patent application Ser. No. 14/271,197, filed May 6, 2014, which is a continuation of U.S. patent application Ser. No. 13/270,153, filed Oct. 10, 2011, which is a continuation-in-part of U.S. patent application Ser. No. 12/754,333, filed Apr. 5, 2010, which is a continuation-in-part of U.S. patent application Ser. No. 12/467,679, filed May 18, 2009, which claims priority from U.S. Provisional Patent App. Ser. No. 61/168,533, filed Apr. 10, 2009. U.S. patent application Ser. No. 12/754,333 also claims priority from U.S. Provisional Patent App. Ser. No. 61/299,761, filed Jan. 29, 2010. U.S. patent application Ser. No. 13/270,153 also claims priority from U.S. Provisional Patent App. Ser. No. 61/446,989, filed Feb. 25, 2011. The entire content of each of the above mentioned patent applications is incorporated by reference herein.

BACKGROUND OF THE INVENTION

1. Field of the Invention

Embodiments of the present invention relate in general to footwear, and particularly to energy absorption and return systems for use in footwear.

2. Related Art

In prior U.S. Pat. Nos. 5,437,110 and 5,596,819, a discussion was provided of the desirability of providing adjustable foot-strike energy shock absorption and return. Those patents disclosed the use of a device disposed in the midsole of a shoe under the heel. The device used an adjustable mechanism to store and return to the wearer's foot shock energy experienced during walking or running.

Those prior patents discussed a variety of related art, including U.S. Pat. Nos. 4,486,964, 4,506,460, 2,357,281, 2,394,281, 4,709,489, 4,815,221, 4,854,057, and 4,878,300 as disclosing a variety of spring systems for shoes that related to heel-strike energy absorption and return. Since the time of those patents, other patents and applications have addressed a variety of spring mechanisms for shoes. See, e.g., U.S. Pat. Nos. 6,282,814, 6,751,891, 6,865,824, 6,886,274, 7,159,338, 7,219,447, 7,287,340, and 7,290,354, as well as published applications 2005/0166422 and 2009/0064536.

A step forward or stride consists of a dynamic process sometimes referred to as gait. The science surrounding gait is extensive, but embodiments of the present invention focus upon that aspect that a layman might identify as toe-off when jumping. Gait can be broken down into three distinct phases as follows: (1) the contact phase which begins with heel strike and continues until the foot is flat on the surface, (2) the mid-stance phase beginning from the foot flat and a shift of body weight and continuing until the heel rises, and, lastly, (3) the propulsion phase where toe-off (or jumping) would occur.

The related art does not focus upon the propulsion phase of the gait cycle. Most of the devices are directed to the contact phase and use heel-related mechanisms to store and return energy. Because energy stored in the contact phase via a heel spring is dissipated by the time the propulsion phase begins, heel springs have not proven effective for energy storage and return. Some of the related art also use springs under the ball of the foot. In addition to not being effective in the propulsion phase, such devices can have adverse physiological effects on the foot if not properly positioned.

SUMMARY OF THE DISCLOSURE

A shoe includes a first plate and a second plate that are located in a portion of the shoe between an upper and an outsole of the shoe, and a nest formed as a bag filled with one or more gasses located between the first plate and the second plate. The shoe may further include one or more springs located in cavities in the gas filled nest for biasing the first plate and the second plate apart from each other. Pods may be located within the openings in the centers of the springs, and the pods may be filled with one or more gasses. The pods may protrude from a bottom or a top surface of the nest. In various embodiments, the first plate and the second plate are positioned entirely in a forefoot portion of a shoe such that the first and second plates are located entirely ahead of a ball portion of the shoe and entirely in front of a flex zone of the shoe. Spring sandwiches including one or more springs positioned between plates may be constructed and placed in various portions of a shoe. The shoe may also include piping with lights.

A device in accordance with an embodiment is installable in a shoe and includes a first plate, a second plate, a gas filled bag positioned between the first plate and the second plate, and a spring positioned in a cavity of the gas filled bag. In various embodiments, the gas filled bag is filled with a plurality of gases. In some embodiments, the gas filled bag is filled with one or more gases selected from the group of helium, neon, methane, ammonia, hydrogen, and nitrogen. In various embodiments, the gas filled bag holds compressed air. Also, in various embodiments, the gas filled bag is filled with a gas that is lighter than air. In some embodiments, the gas filled bag comprises polyurethane.

In various embodiments the device further comprises a pod positioned in an interior volume of the spring. In some embodiments, the pod is filled with gas. Also, in some embodiments, an end of the pod is attached to the gas filled bag. In various embodiments, the gas filled bag has a protrusion that is surrounded by the spring.

In some embodiments, the device further includes one or more additional springs positioned in a corresponding one or more additional cavities of the gas filled bag. In some embodiments, the spring and the additional springs are positioned in two rows of three springs each between the first plate and the second plate. In various embodiments, the springs are positioned to bias the first plate and the second plate apart from each other.

In various embodiments, the gas filled bag comprises an outer shell that encloses a hollow interior filled with gas. In some embodiments, the gas filled bag is filled with nitrogen and is pressurized. In various embodiments, a hinge of the first plate and a hinge of the second plate are secured to each other with a pin. Also, in various embodiments, the first plate and the second plate each comprise polyether block amide.

A shoe in accordance with an embodiment includes an upper, an outsole, and one or more devices positioned between the upper and the outsole. In various embodiments, each of the one or more devices includes a first plate, a second plate, a gas filled bag positioned between the first plate and the second plate, and one or more springs positioned in a corresponding one or more cavities of the gas filled bag.

In various embodiments, a plurality of the devices are positioned in a heel portion of the shoe and there are a greater number of devices on an outer side of the heel portion than on an inner side of the heel portion. In some embodiments, a plurality of the devices are positioned in a forefoot portion of the shoe and there are a greater number of devices on a big toe side of the forefoot portion than on a pinky toe side of the forefoot portion. In various embodiments, the gas filled bag of each of the one or more devices is filled with nitrogen. Also, in various embodiments, each of the one or more devices further includes one or more pods that each extend into a center of a corresponding spring of the one or more springs. In some embodiments, the gas filled bag of each of the one or more devices has one or more protrusions that each extend into a center of a corresponding spring of the one or more springs. Also, in some embodiments, the shoe further includes lights positioned on the upper.

A shoe in accordance with various embodiments comprises a first plate and a second plate that are located in a forefoot portion of the shoe between an upper and an outsole of the shoe, and one or more springs for biasing the first plate and the second plate apart from each other. In various embodiments, the shoe further comprises filler material disposed between the first plate and the second plate. Also, in various embodiments, the filler material has one or more openings in which the one or more springs are positioned.

In some embodiments, the one or more springs comprise at least one compression spring disposed between the first and second plates. Also, in some embodiments, the one or more springs comprise a torsion spring connected to the first and second plates. In various embodiments, the first plate and the second plate are parts of a single continuous member.

In various embodiments, the one or more springs comprise a plurality of springs that are arranged in at least two rows. Also, in various embodiments, the one or more springs comprise a plurality of springs that are arranged in at least three rows. In some embodiments, the one or more springs comprise at least two springs that are of different sizes and the smaller of the at least two springs is positioned closer to a front of the shoe than the larger of the at least two springs. Also, in some embodiments, the one or more springs comprise a plurality of springs that are located across substantially an entire area defined by the forefoot portion of the shoe.

In various embodiments, the one or more springs comprise a plurality of springs that are arranged to be in at least one of a rectangular, square, circular, oval, or triangular pattern. Also, in various embodiments, the first plate and the second plate are each in a substantially circular shape and at least one spring of the one or more springs is attached at a center of each of the first and second plates. In some embodiments, the one or more springs comprise a plurality of springs that are arranged such that at least one spring is located under each toe of a user.

A device in accordance with various embodiments comprises a first plate and a second plate that are installable in a forefoot portion of a shoe, and an energy return member positioned between the first plate and the second plate. In various embodiments, the energy return member comprises a spring. Also, in various embodiments, the energy return member comprises a rubber half-ball shaped protrusion. In some embodiments, the energy return member comprises a pad with a cylindrical protrusion and a spring positioned around the cylindrical protrusion.

A shoe in accordance with various embodiments comprises a midsole having a heel portion, a ball portion, and a forefoot portion, and a device comprising two plates and a spring, where the device is located in a cavity in the forefoot portion of the midsole. In various embodiments, the spring is located between the two plates. In some embodiments, the shoe further comprises an outsole having an opening to expose at least a portion of the device. Also, in some embodiments, at least one of the two plates is at least partially transparent. In various embodiments, the shoe further comprises a sockliner having a propulsion enhancement material on a bottom surface of a forefoot portion of the sockliner and a heel shock absorber on a bottom surface of a heel portion of the sockliner. Also, in various embodiments, the shoe further comprises a shank attached to the midsole.

A method in accordance with various embodiments comprises applying, with a foot, a force on at least one of two plates that is positioned in a forefoot portion of a shoe, so as to move the two plates together and increase a loading of a spring, and then launching the foot due to the two plates being moved apart by the spring as the foot is being lifted.

A device in accordance with various embodiments is located ahead of the ball of the foot and directly below the forefoot of the foot in a forefoot portion of a shoe. In various embodiments, the device stores and returns energy during the propulsion phase of a gait. In some embodiments, the device includes opposing plates hinged together and biased apart by a torsion spring that may be adjustable. Also, in some embodiments, lightweight foam is disposed between the plates. In other embodiments, additional springs, such as wave springs, or the like, may be disposed within or outside of foam at the front of the device.

Such devices are very effective in storing and returning energy where an athlete needs it most: at the front of the shoe, which is where the toe-off in running or jumping occurs. Furthermore, in various embodiments, the device replaces a portion of the midsole that would otherwise be under the forefoot, and is thus easy to install in a production environment, as it simply is affixed to the outsole. The use of a torsion spring in various embodiments allows for easy adjustability of the device by a wearer of the shoe.

A shoe in accordance with various embodiments comprises an upper, an outsole, a pair of hinged plates attached between the outsole and the upper in a forefoot portion of the shoe, and a spring biasing the plates apart, whereby energy is stored and returned during a propulsion phase of a gait cycle in a human step.

In various embodiments, the shoe further comprises foam disposed between the plates. Also, in various embodiments, the shoe further comprises a shroud enclosing an outer periphery of the plates. In some embodiments, the spring comprises a torsion spring disposed in a hinge portion of the plates. Also, in some embodiments, the torsion spring is adjustable.

In various embodiments, the spring comprises at least one wave spring disposed between the plates. In some embodiments, the shoe further comprises an energy return material disposed between the plates. In some embodiments, the energy return material comprises rubber or Hytrel®. In various embodiments, one of the plates wraps around a portion of the upper to form a toe bumper.

A device in accordance with various embodiments is installed in a forefoot portion of a shoe between an upper and an outsole of the shoe, and is used to store and return energy during a propulsion phase of a gait cycle in a human step. In various embodiments, the device comprises a pair of opposing plates, hinge means for attaching the plates together at one end, and spring means for biasing the plates apart, whereby, when a wearer of the shoe moves into an apex of a gait cycle, a force applied on the plates pushes the plates together, increasing a loading of the spring means, and providing the wearer with a launch factor equal to a release of torque from the spring means.

In some embodiments, the spring means comprises a torsion spring. Also, in some embodiments, the spring means further comprises at least one wave spring. In various embodiments, the device further comprises means for precluding debris from entering an area between the plates. In some embodiments, the means for precluding debris from entering the area between the plates comprises foam. Also, in some embodiments, the means for precluding debris from entering the area between the plates comprises a shroud along a peripheral portion of the plates. In various embodiments, the spring means comprises an adjustment means for changing a force applied by the spring means to the plates to bias them apart.

A shoe in accordance with various embodiments comprises an outsole having a heel portion, a ball portion, and a forefoot portion, and a device comprising two plates and a spring, where the device is located at least partially above the forefoot portion of the outsole. In various embodiments, the shoe further comprises a midsole, and the device is located in a cavity in the midsole. In some embodiments, the spring is located between the two plates.

A method in accordance with various embodiments allows for storing and returning energy during a propulsion phase of a gait cycle in a human step using a device in a shoe including two plates and a spring that biases the two plates apart from each other. In various embodiments, the method comprises applying, with a foot, a force on at least one of the two plates that is positioned in the shoe beneath a forefoot portion of the foot, so as to move the two plates together and increase a loading of the spring, and launching the foot due to the two plates being moved apart by the spring as the foot is being lifted.

BRIEF DESCRIPTION OF THE DRAWINGS

FIG. 13a shows a side view of a portion of a shoe in accordance with an embodiment;

FIG. 13b shows a top view of a midsole having a cavity in which a device is located in accordance with an embodiment;

FIG. 44a shows a possible arrangement of springs on a plate for a device according to an embodiment;

FIG. 44b shows a cross section of the device in FIG. 44a at line 44b-44b;

FIG. 53a shows another embodiment of a device for a shoe;

FIG. 53b shows an embodiment of a shoe including the device of FIG. 53a where the device extends across approximately an entire area in a forefoot portion of the shoe;

FIG. 60b shows a side view of the device of FIG. 60a;

FIG. 60c shows a front view of the device of FIG. 60a;

FIG. 60d shows a perspective view of the device of FIG. 60a;

FIG. 90A shows a bottom view of a shoe in accordance with an embodiment;

FIG. 90B shows a side view of the shoe from FIG. 90A;

FIG. 90C shows a portion of a shoe in accordance with an embodiment;

FIG. 91 shows a side view of a shoe in accordance with an embodiment;

FIG. 95B shows a side view of an embodiment of a shoe;

FIG. 96 shows a schematic diagram of an inside view of an embodiment of a shoe;

FIG. 97 shows an outside view of the shoe of FIG. 96;

FIG. 98 shows a top view of the shoe of FIGS. 96 and 97;

FIG. 99 shows a bottom view of the shoe of FIGS. 96, 97, and 98, and locations of devices in the shoe;

Figure 99:
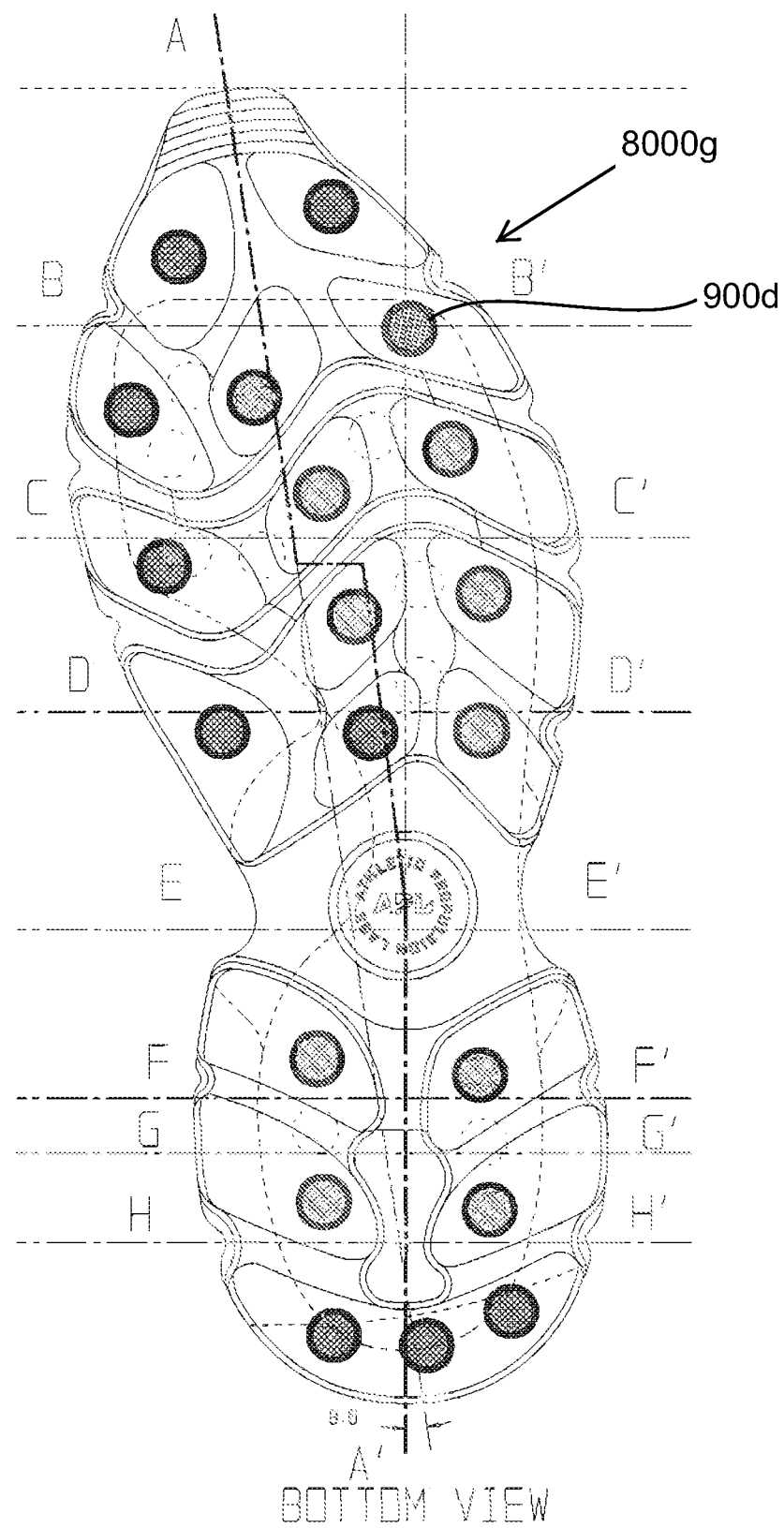
Figure 100A:
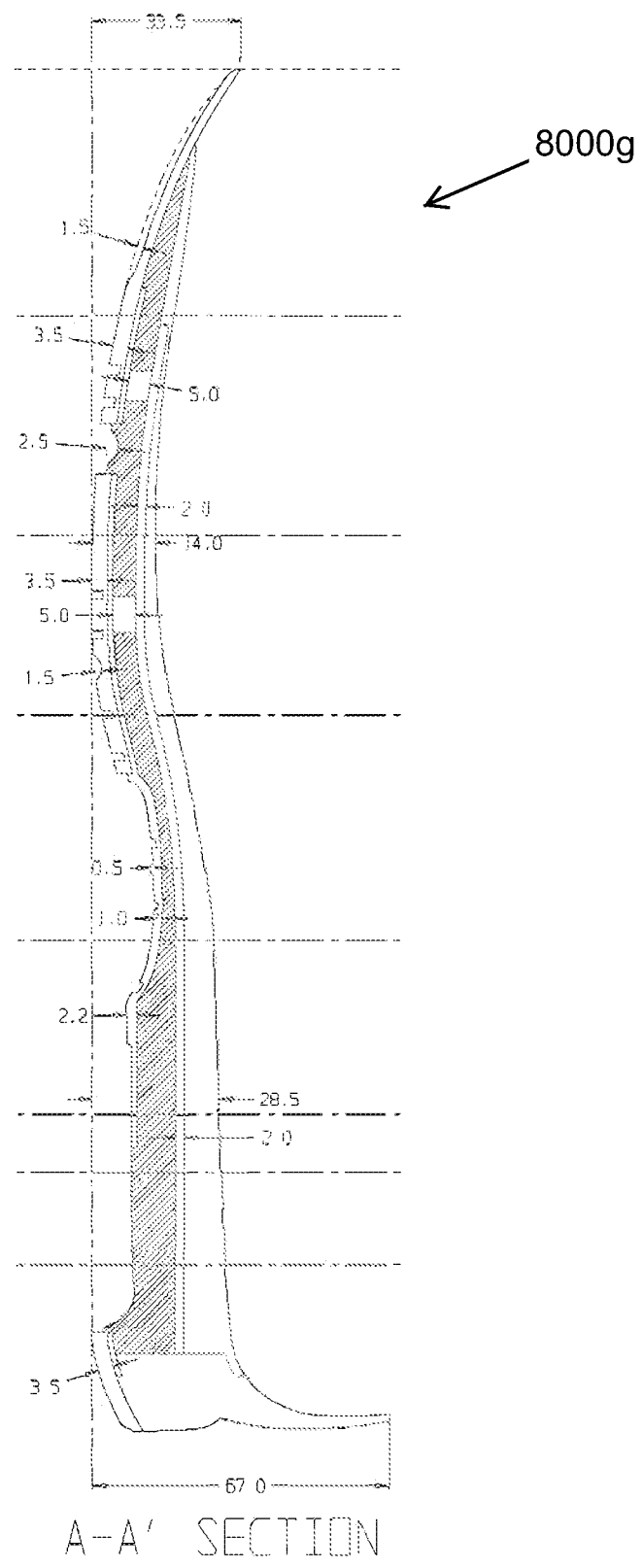
Figure 100B:
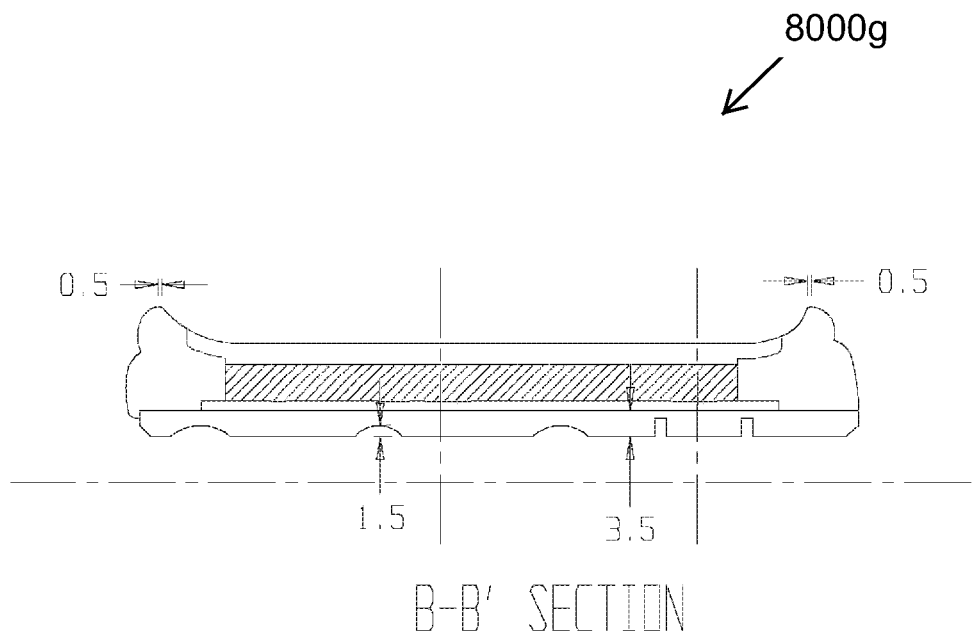
Figure 100C:
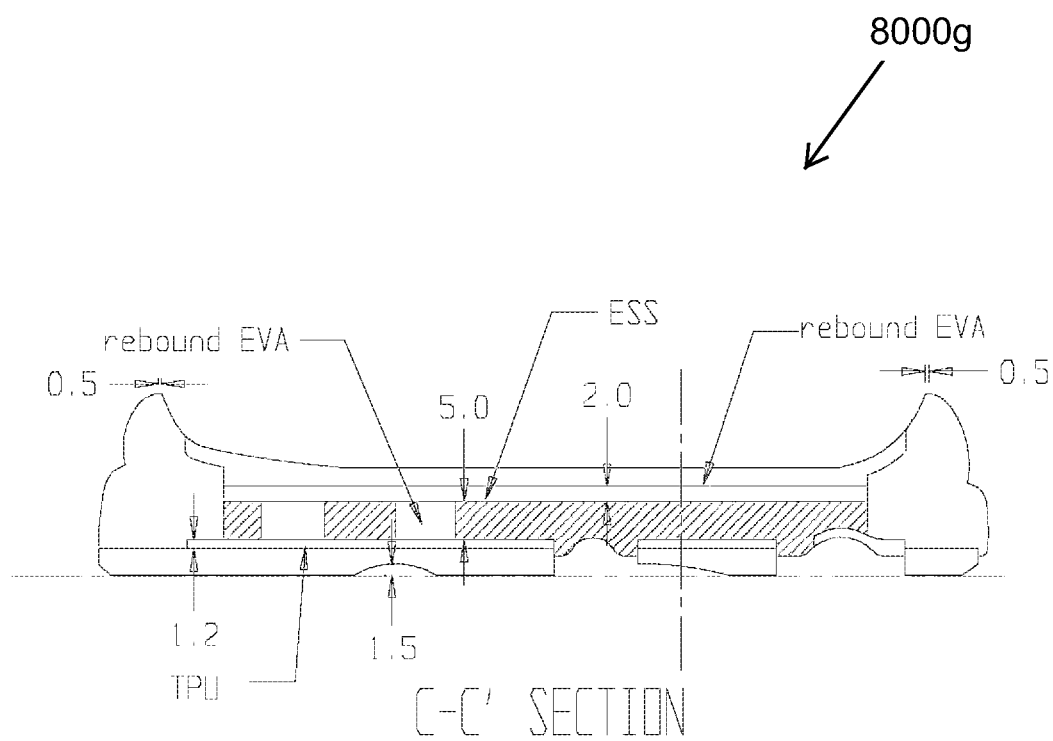
Figure 100D:
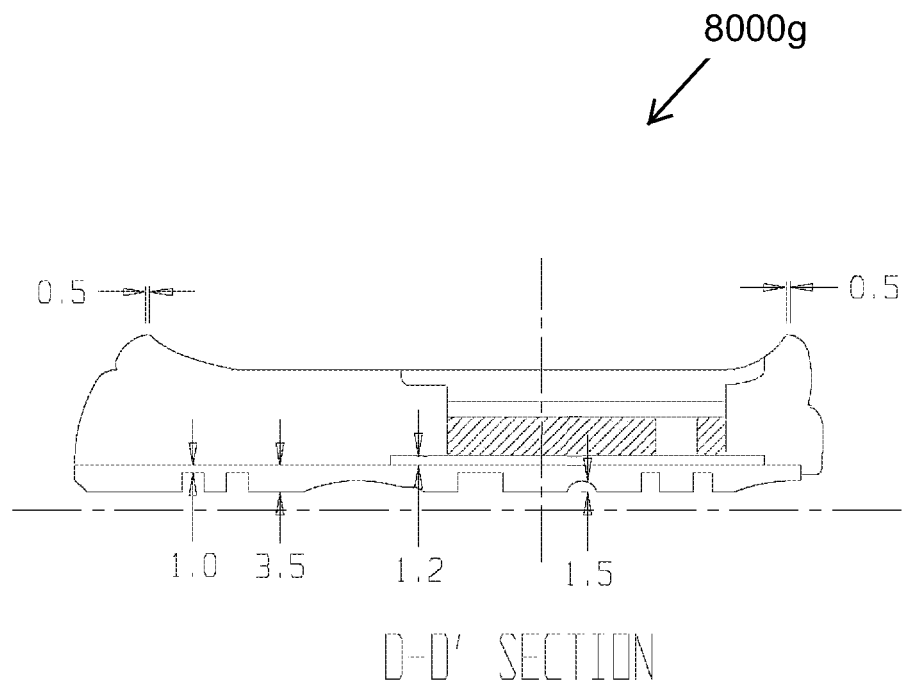
Figure 100E:
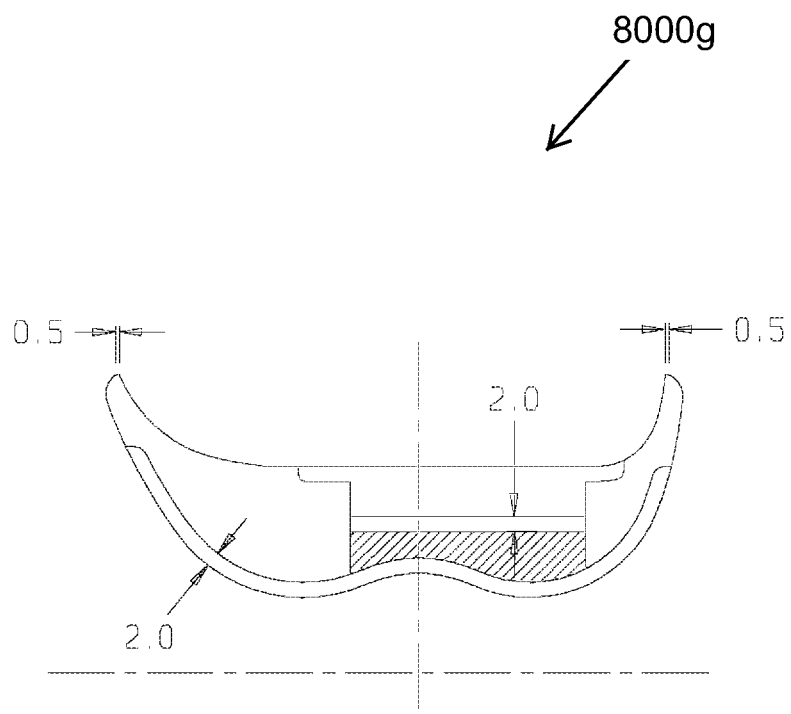
Figure 100F:
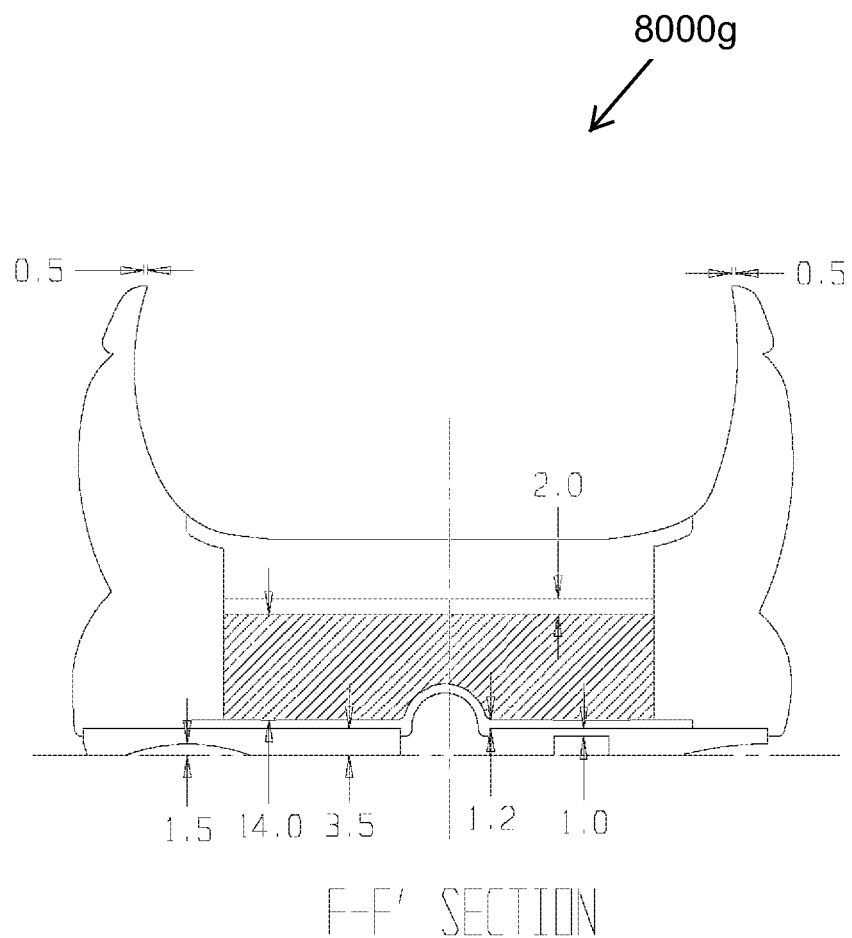
Figure 100G:
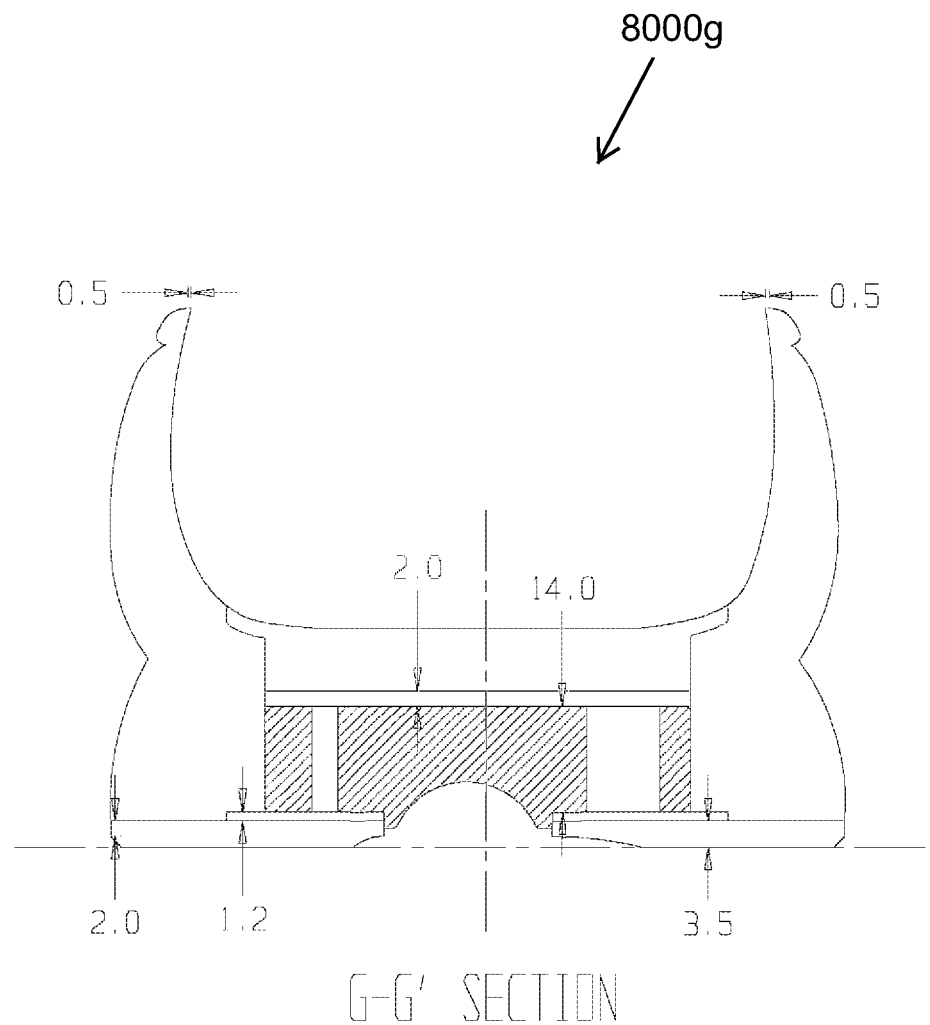
Figure 100H:
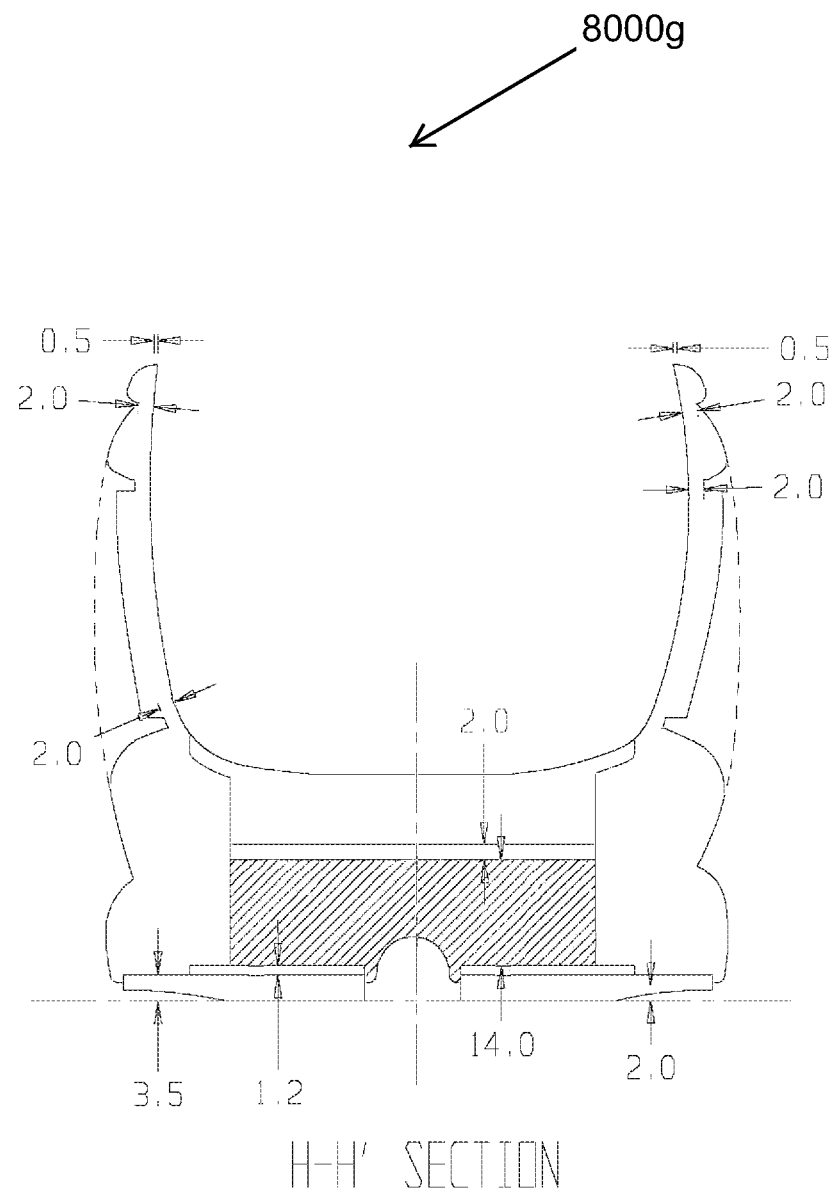

FIG. 100*a* shows a cross sectional view of the shoe of FIG. 99 along the line A-A' from FIG. 99;

FIG. 100*b* shows a cross sectional view of the shoe of FIG. 99 along the line B-B' from FIG. 99;

FIG. 100*c* shows a cross sectional view of the shoe of FIG. 99 along the line C-C' from FIG. 99;

FIG. 100*d* shows a cross sectional view of the shoe of FIG. 99 along the line D-D' from FIG. 99;

FIG. 100*e* shows a cross sectional view of the shoe of FIG. 99 along the line E-E' from FIG. 99;

FIG. 100*f* shows a cross sectional view of the shoe of FIG. 99 along the line F-F' from FIG. 99;

FIG. 100*g* shows a cross sectional view of the shoe of FIG. 99 along the line G-G' from FIG. 99; and FIG. 100*h* shows a cross sectional view of the shoe of FIG. 99 along the line H-H' from FIG. 99.

DETAILED DESCRIPTION OF PREFERRED EMBODIMENTS

Figure 1:
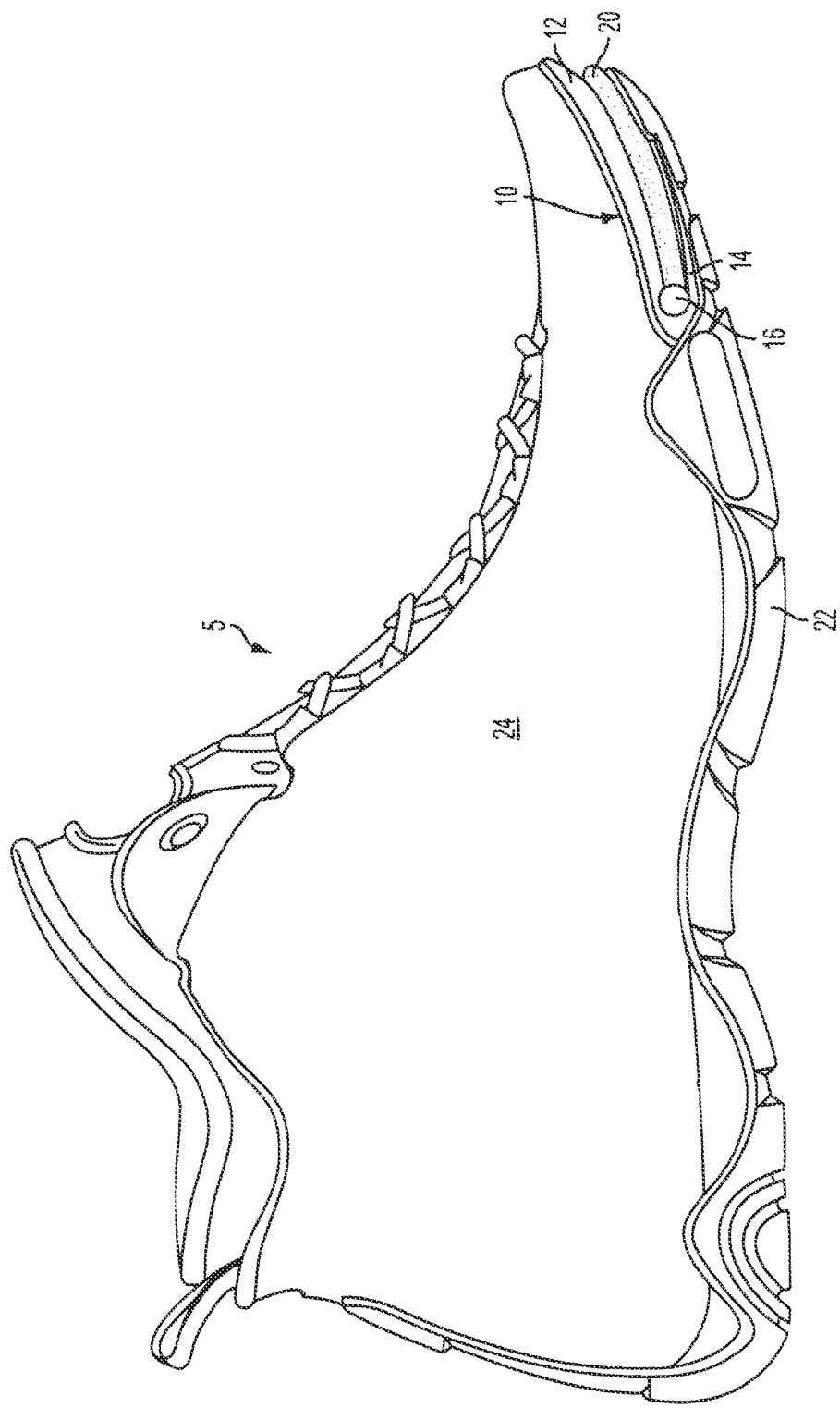
FIG. 1 shows a side view of a device in accordance with an embodiment when installed in a shoe.
Figure 2:
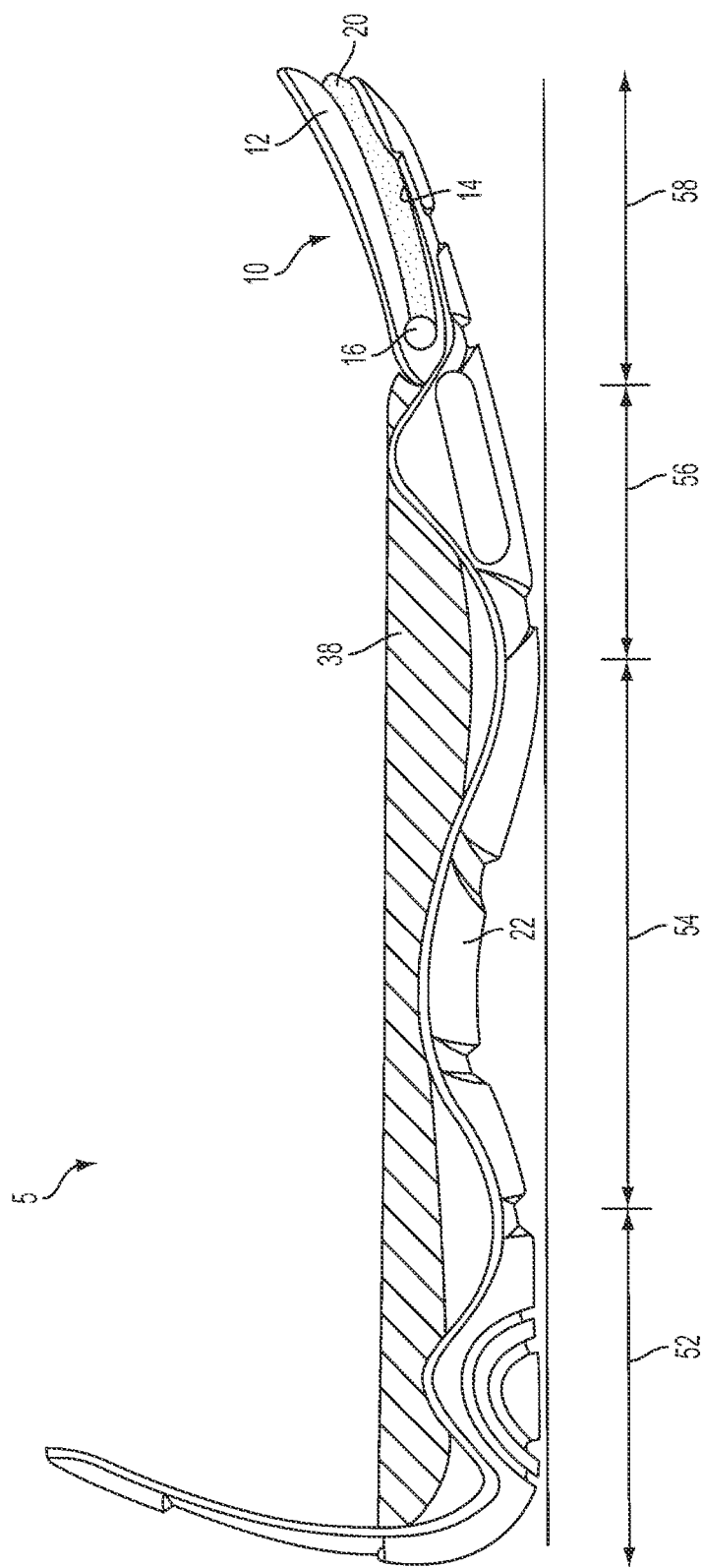
FIG. 2 shows a side view of a portion of a shoe in accordance with an embodiment including a device in an outsole of the shoe.
Figure 3:
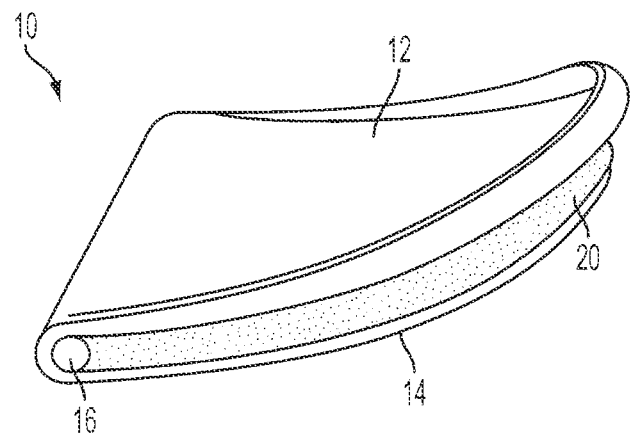
FIG. 3 shows a perspective view of a device in accordance with an embodiment.
Figure 4:
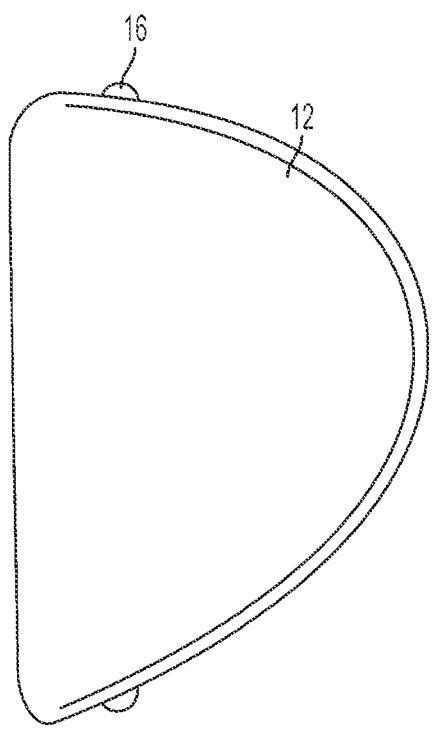
FIG. 4 shows a top view of a device in accordance with an embodiment.
Figure 5:
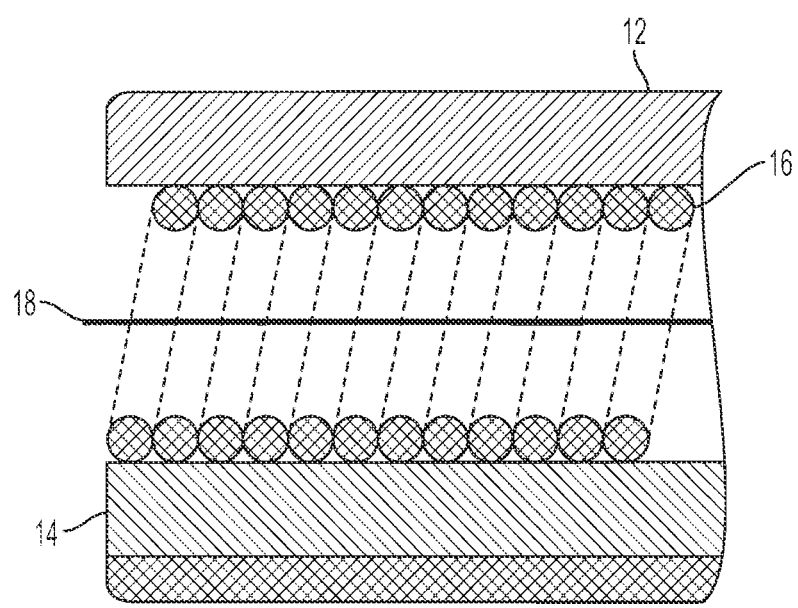
FIG. 5 shows a partial cross sectional view of a torsion spring mounting in a device in accordance with an embodiment.

Referring to FIG. 1, a shoe 5 is provided with a device 10 according to an embodiment. The device 10 is mounted in an outsole 22 of the shoe 5, as shown in more detail in FIG. 2. With reference to FIGS. 1, 2, and 5, the device 10 includes a top plate 12 and a bottom plate 14 that are hinged together via a pin 18 (or similar means). In various embodiments, the plates 12 and 14 are designed such that they have a very limited motion around a hinge axis. Also, in various embodiments, in a neutral position the plates 12 and 14 are parallel to each other, forming what might be explained as a duckbill, as shown in FIGS. 3 and 4. In some embodiments, the plates 12 and 14 have a limited motion that allows movement toward one another but not opening beyond (any more than) the two plates being parallel to each other.

With reference to FIG. 1, various materials could be used for the plates 12 and 14, including polymer, block polymer, monomer, etc., that exhibit properties conducive to use in processes known as injection molding, and in some cases extrusion and the like, or other types of molding such as compression molding, etc. In various embodiments, material is selected for rigidity, because in practice the device 10 will be subjected to tremendous force as a wearer goes through a gait cycle ending up on the balls of the feet. At the apex of a propulsion phase of the gait cycle, the device 10 will be subjected to several times the wearer's body weight as the device 10 is "loading". During this loading, it may be desirable that the device 10 does not deform under stress. Such deformity may result in loss of load factor resulting in diminished return of energy and a corresponding decrease in the actual intended performance. As such, thin steel is potentially usable to reinforce other materials to ensure the requisite rigidity.

A variety of hinge mechanisms could be used with the plates 12 and 14, such as a barrel hinge, butt hinge, living hinge, plain hinge, or others. In various embodiments, a barrel hinge can include molded features to control a movement of the plates 12 and 14 around its axis, to prevent it from springing open, such as a slot and key feature, or notched stop. A barrel hinge would form the two plates 12 and 14 into a single device with a single axis of rotation.

With reference to FIGS. 1, 2, and 5, in various embodiments a helical torsion spring 16 may encircle the hinge pin 18, and may bias the plates 12 and 14 apart consistent with a strength of the particular spring utilized. In various embodiments, the helical torsion spring 16 is constructed from a metal wire or rod twisted or formed into a helical coil. In such embodiments, each end of the coil may be biased against the plates 12 and 14. Such torsion springs may be similar to those shown in U.S. Pat. No. 5,464,197. That patent shows a coil spring member with arms that provide an opposing bias. Adjustment of the torsion may be achieved via an inner coil which acts to control the deformation of an outer coil. In various embodiments, a torsion spring could be located within a barrel hinge formed as an integral member of the top and bottom plates 12 and 14. Once the device 10 has been properly assembled and installed within the forepart of footwear, and the wearer of the footwear moves into an apex of a gait cycle (i.e. toe-off in jumping), the force applied to the top plate 12 will push the two plates 12 and 14 together. This will increase the torque loading of the helical torsion spring 16, and provide the wearer with a launch factor equal to a release of torque from the helical torsion spring 16.

Figure 8:
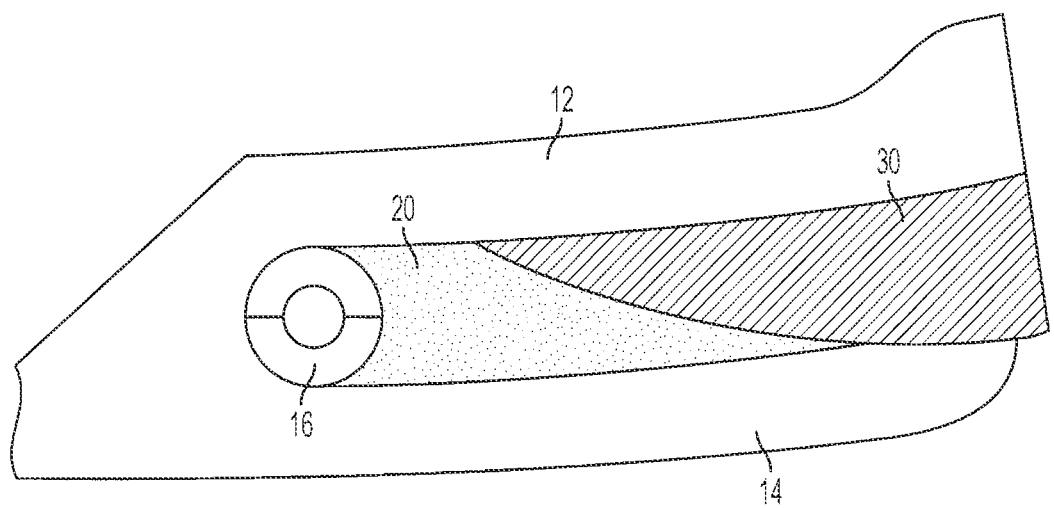
FIG. 8 shows an embodiment of a device.

In various embodiments, between the plates 12 and 14 there can be lightweight foam 20, as shown in FIGS. 1-3. This component's purpose is basically as filler, and may extend partially (FIG. 8) or completely (FIG. 2) between the plates 12 and 14. In various embodiments, the device 10 may perform optimally in a case where a space between the plates 12 and 14 is void or empty. However, given the normal spectrum of use for footwear, it might not be desirable to leave the space empty in many instances. Dirt, mud, water, snow, ice, etc. (debris) may find its way within the space and could significantly decrease or even destroy the function of the device. Therefore, various embodiments include a means of blocking debris from entering the space between the plates 12 and 14. Because the device 10 of various embodiments would perform optimally without any material between the plates 12 and 14, it may be desirable for performance reasons to include a material that is lightweight, reflects good tear strength values, and that possesses specific compression properties. In addition to the criteria above, the ideal candidate foam 20 in various embodiments would compress under very low loading and compress to 30% of original thickness gauge—or more. Based upon these criteria, the foam 20 would preferably be of an open cell type. Thus, polyurethane, rubber, rubber latex, PVC or polyethylene can be used in various embodiments.

Figure 7:
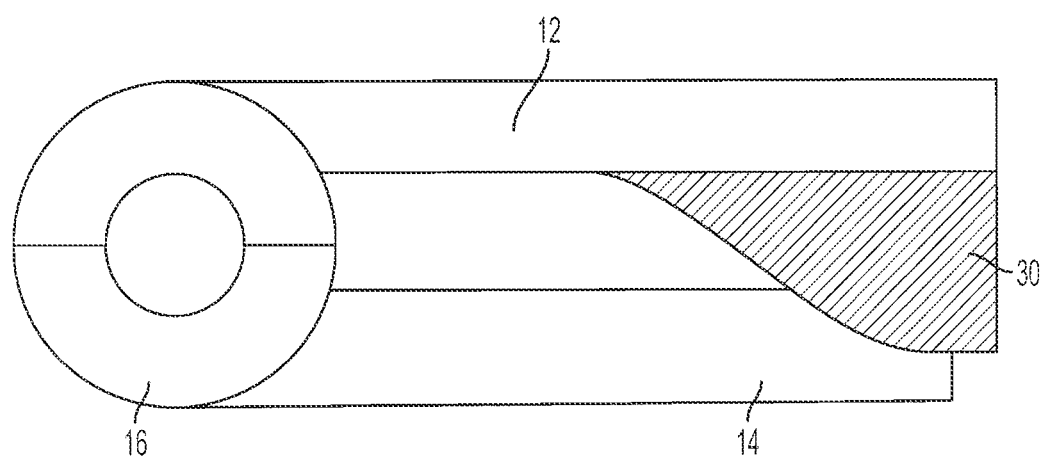
FIG. 7 shows an alternative embodiment of the device including a shroud.

One purpose of the foam 20 is to avoid debris collecting between the plates 12 and 14. The foam 20 may slightly inhibit the performance of the device 10 in various embodiments, since it adds resistance in the loading phase of performance. As such, in an alternative embodiment shown in FIG. 7, the foam 20 (FIG. 3) may be replaced with a front shroud 30 on one of the plates 12, 14 (in FIG. 7, it is shown attached to the top plate 12). In various embodiments, the shroud 30 acts to keep debris from entering between the plates 12 and 14, and wraps around a perimeter of the toe area.

Figure 12:
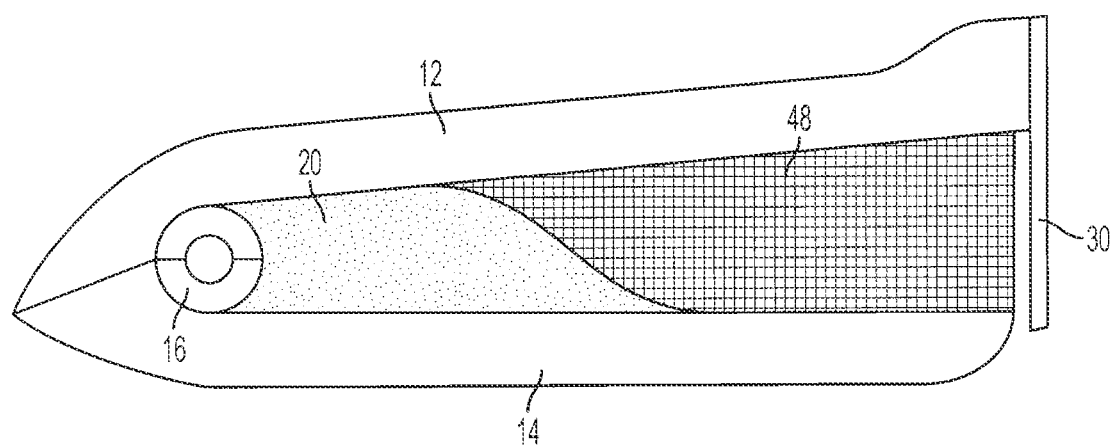
FIG. 12 shows an embodiment of a device, with an energy return material augmenting a torsion spring.

In addition, with reference to FIGS. 9a, 9b, 10, and 11, in various embodiments the foam 20 may be reduced in size or removed completely to allow the use of one or more other springs 32, 34, 36. The springs 32, 34, 36 assist the torsion spring 16 in providing propulsion to the wearer of the shoe. In various embodiments, such additional springs could be wave springs as shown in U.S. Pat. No. 4,901,987, or the like. Wave springs are particularly advantageous because the energy return is almost entirely axial, which would serve to press the plates 12 and 14 apart after compression. The springs 32, 34, 36 could be attached directly to the top and bottom plates 12 and 14 in various embodiments. With reference to FIG. 12, in various embodiments an energy return or rebound material 48 may be disposed between the plates 12 and 14. In some embodiments, the energy return material 48 comprises rubber, Hytrel®, or the like, and creates an additional energy return effect.

Figure 9A:
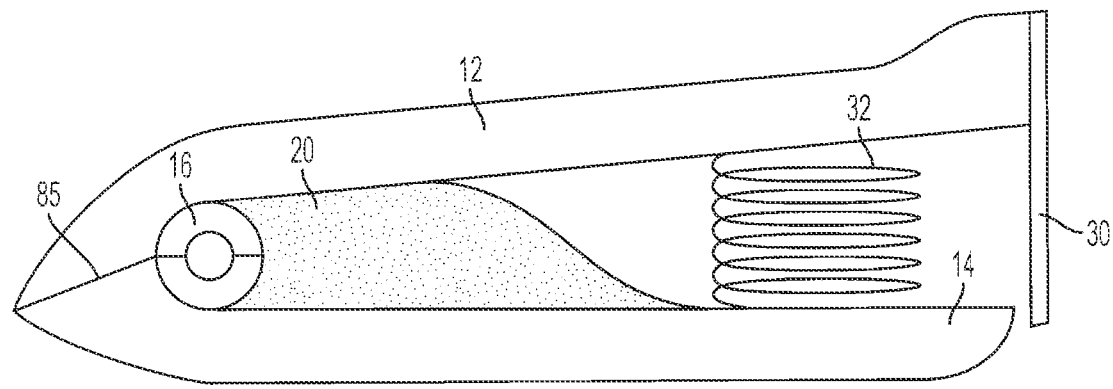
FIG. 9a shows an embodiment of a device, with a wave spring augmenting a torsion spring.
Figure 9B:
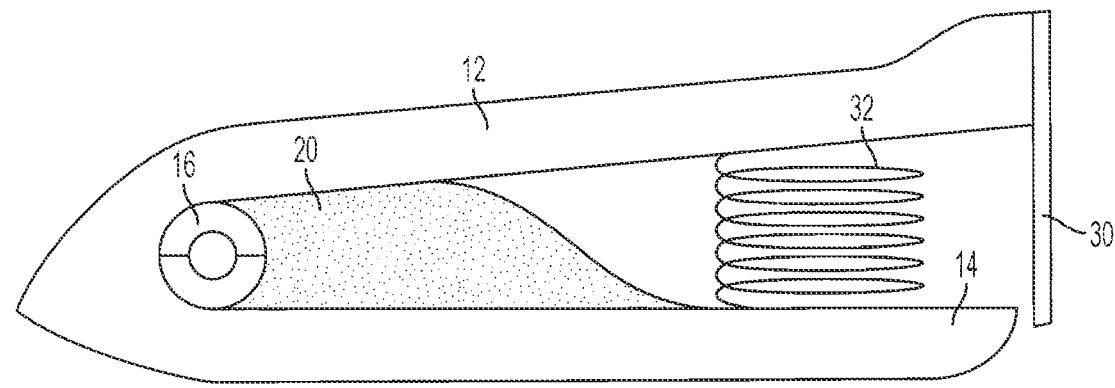
FIG. 9b shows another embodiment of a device, with a wave spring augmenting a torsion spring.
Figure 10:
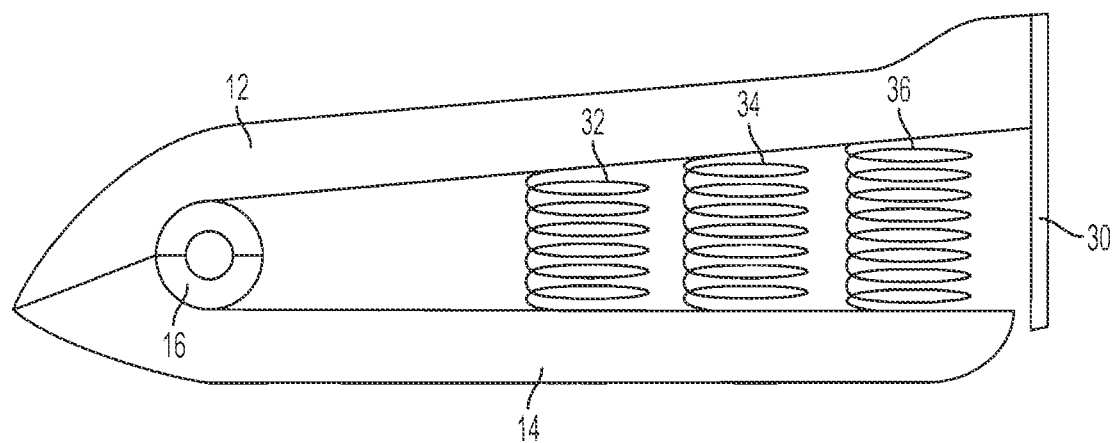
FIG. 10 shows an embodiment of a device, with wave springs augmenting a torsion spring.
Figure 11:
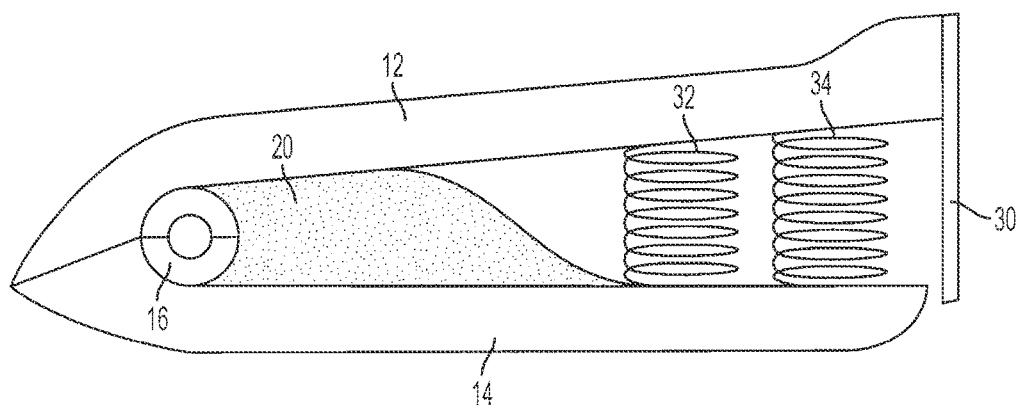
FIG. 11 shows an embodiment of a device, with wave springs augmenting a torsion spring.

With reference to FIG. 9a, in various embodiments the top plate 12 and the bottom plate 14 are manufactured as separate units and may have portions in contact with each other at a contact location 85. With reference to FIG. 9b, in various other embodiments, the top plate 12 and the bottom plate 14 are manufactured as a single continuous unit.

As mentioned and as illustrated in FIG. 2, in various embodiments the device 10 is mounted to the outsole 22 under a forefoot region by conventional means (gluing, stitching, etc.) and replaces the midsole 38 in the forefoot portion of the shoe 5. Thus, in such embodiments, the midsole 38 would extend only from the heel portion of the outsole 22 up to the device 10. With reference to FIG. 2, the shoe 5 may be described with respect to different portions of the shoe 5 along a length of the shoe 5, including a heel portion 52, an arch portion 54, a ball portion 56, and a forefoot portion 58.

Figure 6:
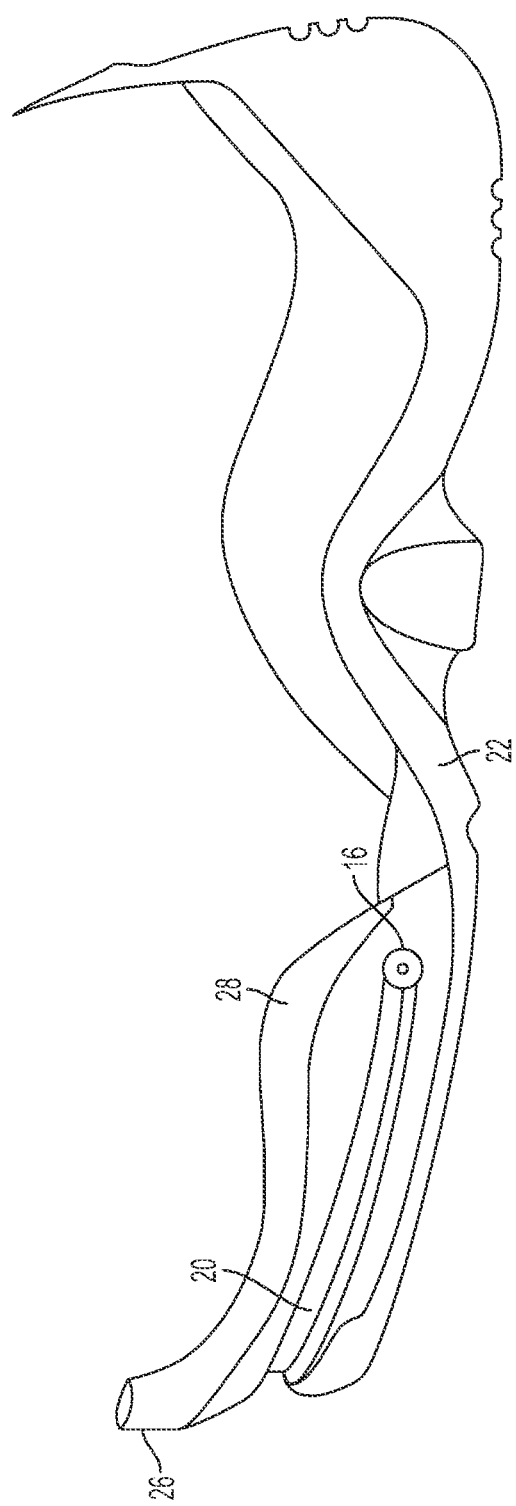
FIG. 6 shows an alternative embodiment of a device in a portion of a shoe, with a top part of the device functioning as a toe bumper.

With reference to FIG. 1, in various embodiments, an optimal function of the device 10 within the shoe 5 requires an absence of any material (foam/rubber/etc.) between the device and the shoe upper 24. In other words, it is desirable in various embodiments to have the shoe upper 24 sit directly on the device 10 in the forepart, as shown in FIG. 1. Therefore, with reference to FIGS. 1 and 6, in various embodiments the top plate 12 of the device 10 would be configured to wrap up around the shoe upper 24 and in addition to its primary function of propulsion, forms features such as a toe bumper 26 and a sidewall 28. Such a unique construction with the top plate 12 configured to wrap up around the shoe upper 24 may create a very rigid toe bumper 26 and sidewall 28.

With this approach, an alternative embodiment for the top plate 12 would have the top plate 12 manufactured from more typical, softer/flexible materials (rubber/foam/etc.) and a secondary component then added to it (e.g. steel) added to provide rigidity directly above the bottom plate 14. The bottom plate 14 in such embodiments may still be manufactured from the rigid materials.

FIG. 13a shows a side view of part of a shoe 6 in accordance with another embodiment. The shoe 6 includes an outsole 22 and a midsole 38. In the shoe 6, the midsole 38 extends into a forefoot portion of the shoe 6. FIG. 13b illustrates a top view of the midsole 38 from FIG. 13a in accordance with an embodiment, where the midsole 38 includes a cavity 39 in which an embodiment of the device 10 is located. Thus, various embodiments allow for placing the device 10 within a midsole 38, such as within the cavity 39 of the midsole 38 or otherwise surrounded by the midsole 38.

Figure 14:
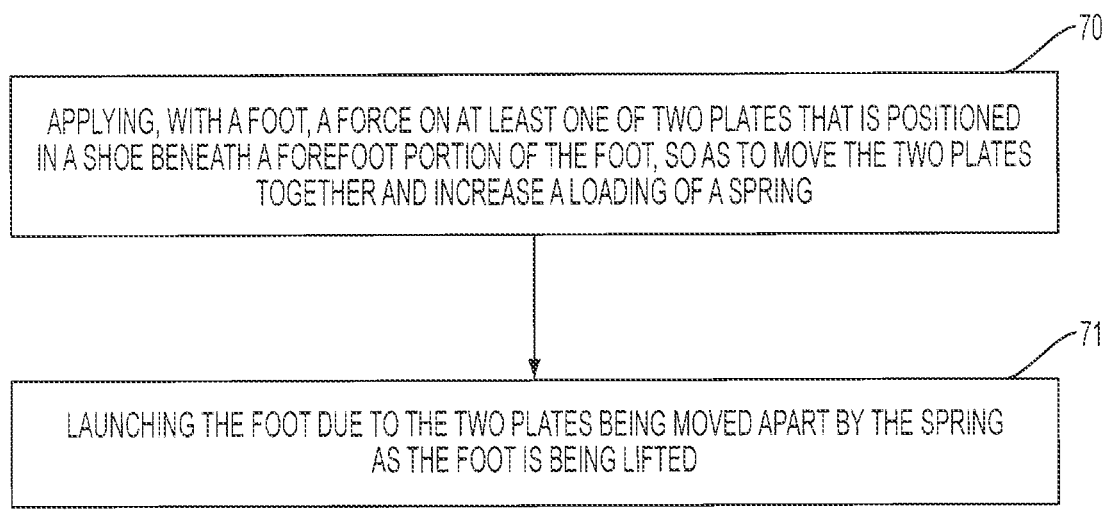
FIG. 14 shows a flowchart of a method in accordance with an embodiment.

FIG. 14 illustrates a method in accordance with an embodiment. In various embodiments, the method of FIG. 14 allows for storing and returning energy during a propulsion phase of a gait cycle in a human step using a device in a shoe including two plates and a spring that biases the two plates apart from each other. In various embodiments, the method comprises (step 70) applying, with a foot, a force on at least one of the two plates that is positioned in the shoe beneath a forefoot portion of the foot, so as to move the two plates together and increase a loading of the spring, and (step 71) launching the foot due to the two plates being moved apart by the spring as the foot is being lifted.

Figure 15:
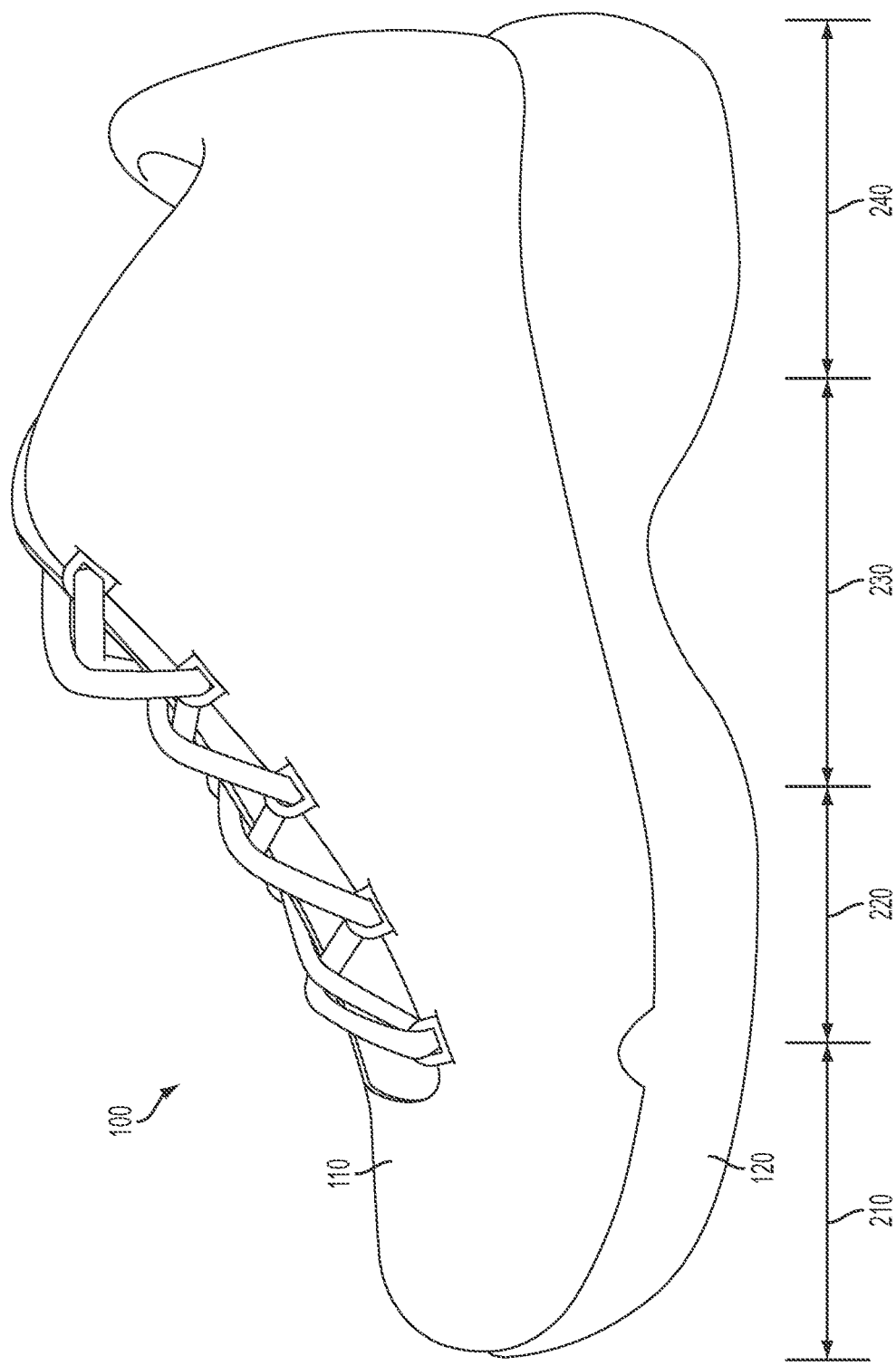
FIG. 15 shows a shoe that includes a device according to an example embodiment.

FIG. 15 shows a shoe 100 according to another example embodiment. The shoe 100 may include an upper 110 and an outsole 120. The shoe 100 may be divided into various portions, such as a forefoot portion 210, a ball portion 220, an arch portion 230, and a heel portion 240. The outsole 120 is designed to be placed on the ground in normal operation of the shoe 100. The upper 110 includes an opening for a foot and means for tightening the shoe 100 around the foot, such as laces, a zipper, or the like. In various embodiments, the upper 110 may comprise a synthetic carbon fiber material, or the like. The forefoot portion 210 of the shoe 100 is located at the front of the shoe, and the forefoot portion 210 may support the toes of a foot when the foot is inserted into the shoe 100. The ball portion 220 is located adjacent to the forefoot portion 210, and the ball portion 220 may support the ball of a foot when the foot is inserted into the shoe 100. The arch portion 230 is located adjacent to the ball portion 220, and may provide support to an arch of the foot. The heel portion 240 is located adjacent to the arch portion 230 and at the rear of the shoe, and provides support to a heel of the foot.

Figure 16:
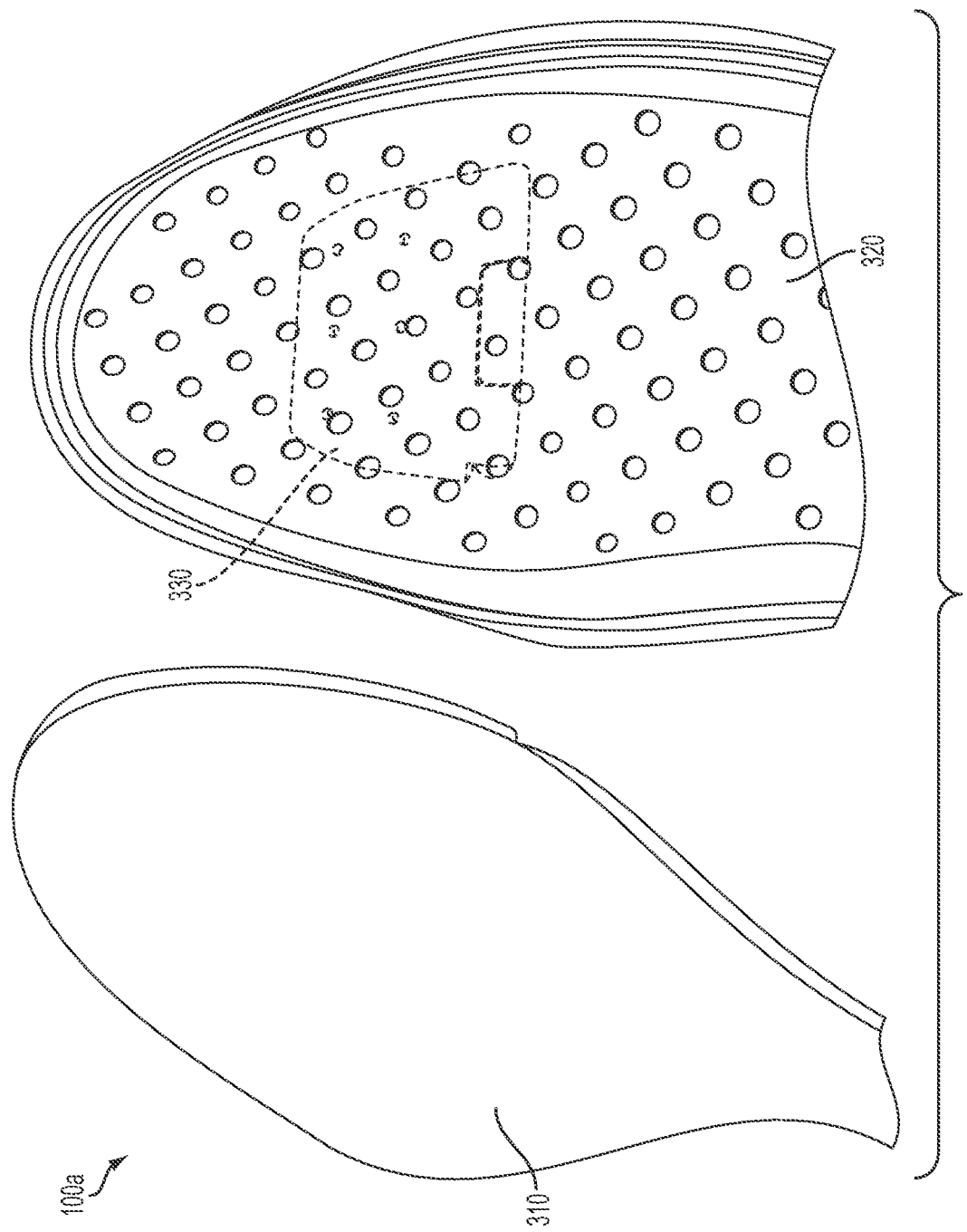
FIG. 16 shows a location of an example device that may be placed under a sockliner and an insole that may be used in a shoe in accordance with an embodiment.

FIG. 16 shows an example sockliner 310 and an insole 320 that may be used in a shoe 100a of an embodiment that may be similar to the shoe 100 (FIG. 15). Shoe 100a is shown in FIG. 16 with the upper removed so as to make the insole 320 visible. In various embodiments, the sockliner 310 may be made of various materials designed to provide shock absorption under the heel and other portions of the foot. The sockliner 310 may also provide additional energy return under the forefoot portion to propel a user upward during a liftoff phase of a jump. Also shown in FIG. 16 is an area 330 on a surface of the insole 320 designating a location under which a device may be placed. The area 330 is located at the forefoot portion of the shoe 100a.

Figure 17:
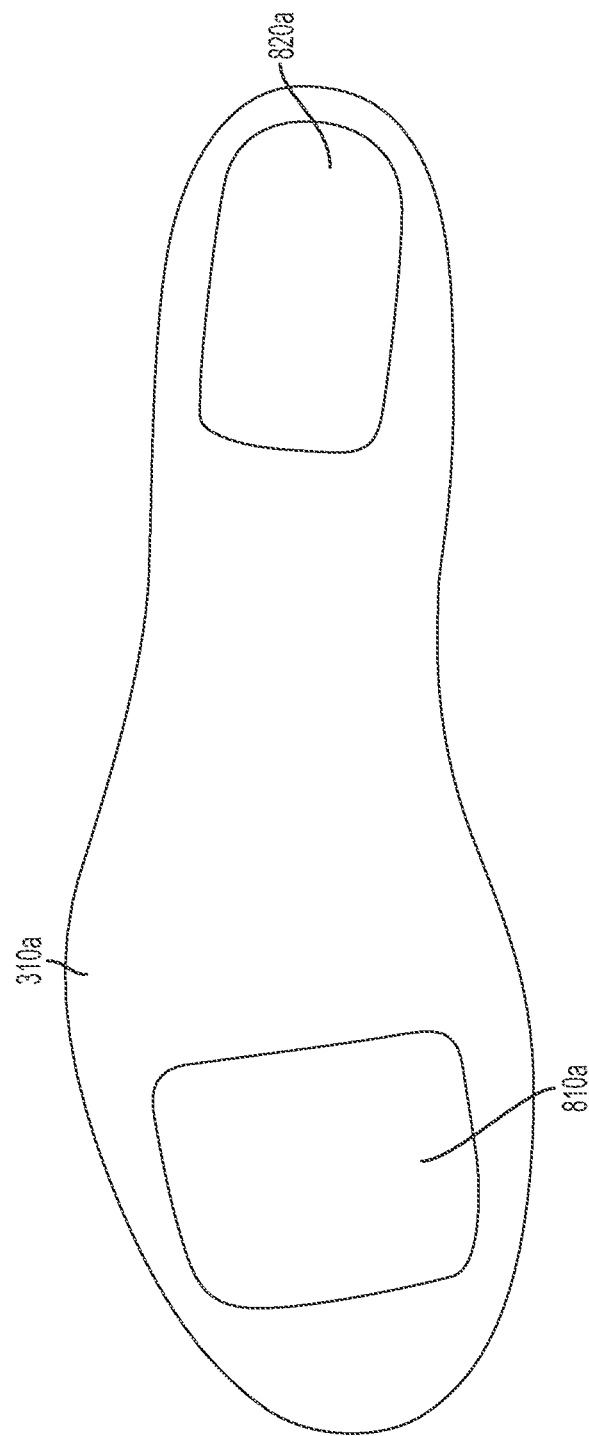
FIG. 17 shows a bottom view of a sockliner in accordance with an embodiment that includes a propulsion enhancement material and a heel shock absorber on a bottom surface of the sockliner.

FIG. 17 shows a bottom view of a sockliner 310a in accordance with an embodiment that is similar to the sockliner 310 of FIG. 16, and includes a propulsion enhancement material 810a and a heel shock absorber 820a on a bottom surface of the sockliner 310a. The propulsion enhancement material 810a is located at a forefoot portion of the sockliner 310a. The propulsion enhancement material 810a may be made of ESS (EVA-Solid-Sponge) material. The ESS material comprises ethylene vinyl acetate (EVA) solid sponge material that may include in some embodiments at least approximately 45% to at least appropriately 48% of ethlyne vinyl acetate, approximately 30% polyene elastomer, and approximately 20% synthetic rubber. In various embodiments, a thickness of the sockliner 310a in an area where the propulsion enhancement material 810a is attached may be recessed a distance such as, for example, by about 0.5 mm. Also in various embodiments, the propulsion enhancement material 810a may have a thickness, for example, of about 1.50 mm. Thus, in some embodiments the propulsion enhancement material 810a when attached to the sockliner 310a may protrude a certain distance past a surface of the sockliner 310a, such as, for example, by 1 mm.

The heel shock absorber 820a is located at a heel portion of the sockliner 310a and may be made of Poron®, thermoplastic material, or the like. Poron® is a shock absorption substance that comprises microcellular polyurethane and is available from Rogers Corp. The heel shock absorber 820a may be provided as a sheet under the heel of the sockliner 310a. The propulsion enhancement material 810a may be provided as a sheet under the forefoot of the sockliner 310a.

Figure 18:
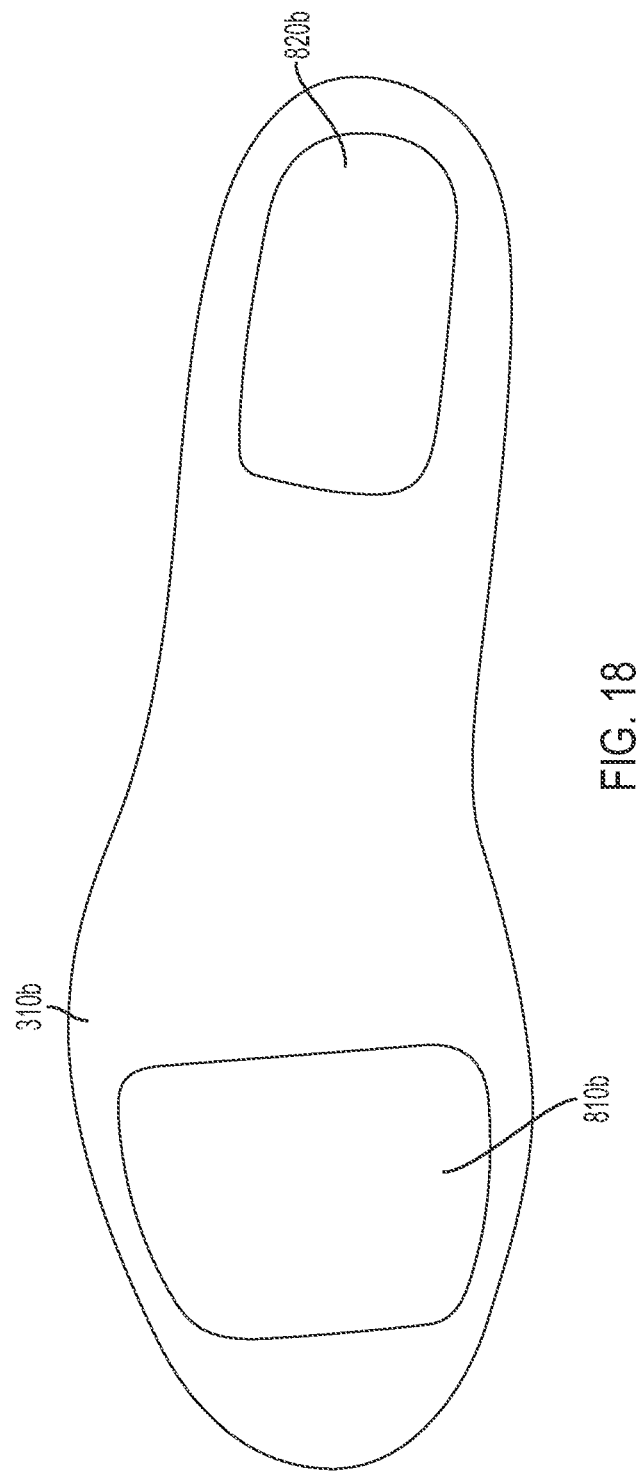
FIG. 18 shows another embodiment of a sockliner that includes a larger propulsion enhancement material in accordance with an embodiment.

FIG. 18 shows another embodiment of a sockliner 310b. With reference to FIGS. 16, 17, and 18, sockliner 310b is similar to the sockliner 310a, but a propulsion enhancement material 810b in this embodiment is wider than the propulsion enhancement material 810a. In particular, the propulsion enhancement material 810b occupies a greater surface area of the forefoot portion of the sockliner 310b as compared to the area occupied in sockliner 310a by the propulsion enhancement material 810a. The wider propulsion enhancement material 810b may help to prevent the formation of blisters and other wear on a foot wearing the shoe 100a according to an embodiment. The sockliner 310b may also include a heel shock absorber 820b that may comprise a Poron® cushioning pod, or the like, on the heel.

In various other embodiments, a sheet of Poron® or other cushioning material may be attached under the forefoot portion of the sockliner 310b rather than using the propulsion enhancement material 810b. Such embodiments with cushioning material under the forefoot portion of the sockliner 310b would provide more cushioning for a user. Also, in some embodiments, a sheet of Poron® or other cushioning material may cover a substantial portion of the entire bottom surface of the sockliner 310b or even the entire bottom surface of the sockliner 310b for added cushioning for a user. In some embodiments, a sockliner may be provided without the propulsion enhancement material 810b or the heel shock absorber 820b.

Figure 19:
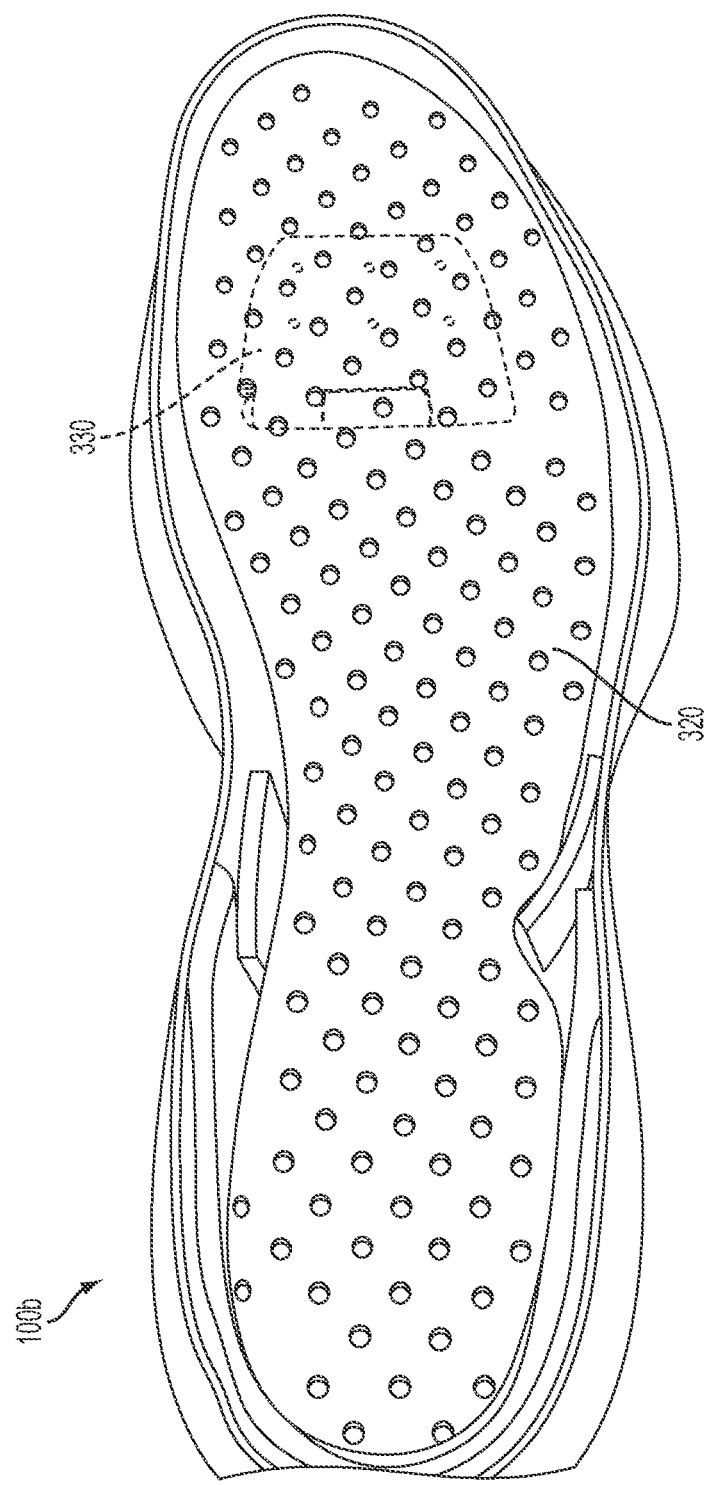
FIG. 19 shows an insole being exposed in a shoe with the outer boundaries of an area on a surface of the insole under which a device may be placed in accordance with an embodiment.

FIG. 19 shows a portion of a shoe 100b with the upper removed from the shoe 100b. The shoe 100b includes the insole 320 as described above with respect to the shoe 100a in FIG. 16. Also shown in FIG. 19 is the outer boundaries of an area 330 located on a surface of the insole 320 under which a device may be placed. The area 330 is located at a forefoot portion of the shoe 100b. In various embodiments as shown in FIG. 19, the insole 320 may have a plurality of holes. In various other embodiments, the insole 320 may be a single continuous member that does not have holes so as to help reduce wrinkles and increase cushioning.

Figure 20:
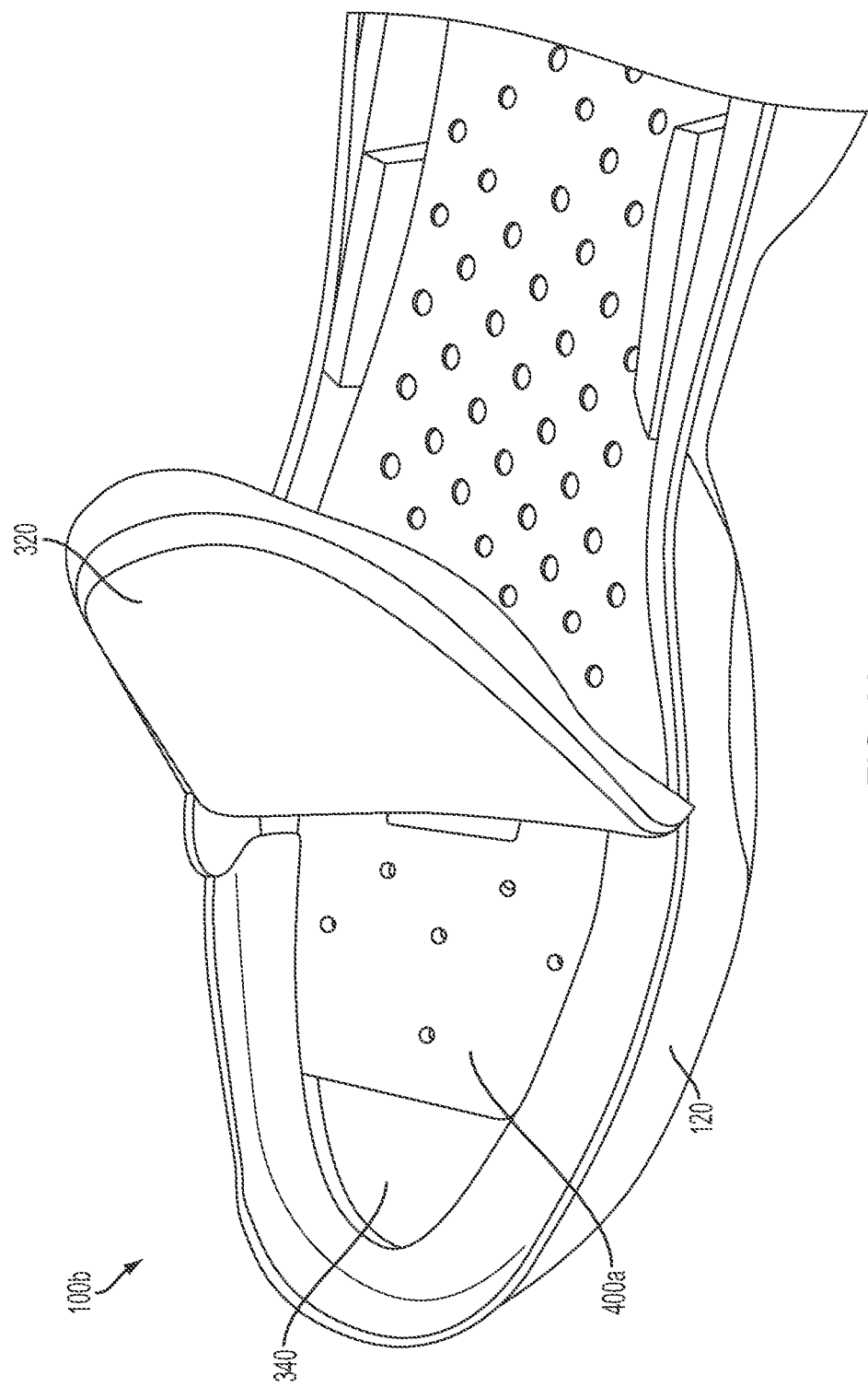
FIG. 20 shows an insole being partially pulled back to expose various parts of a shoe that includes a device in accordance with an embodiment.
Figure 21:
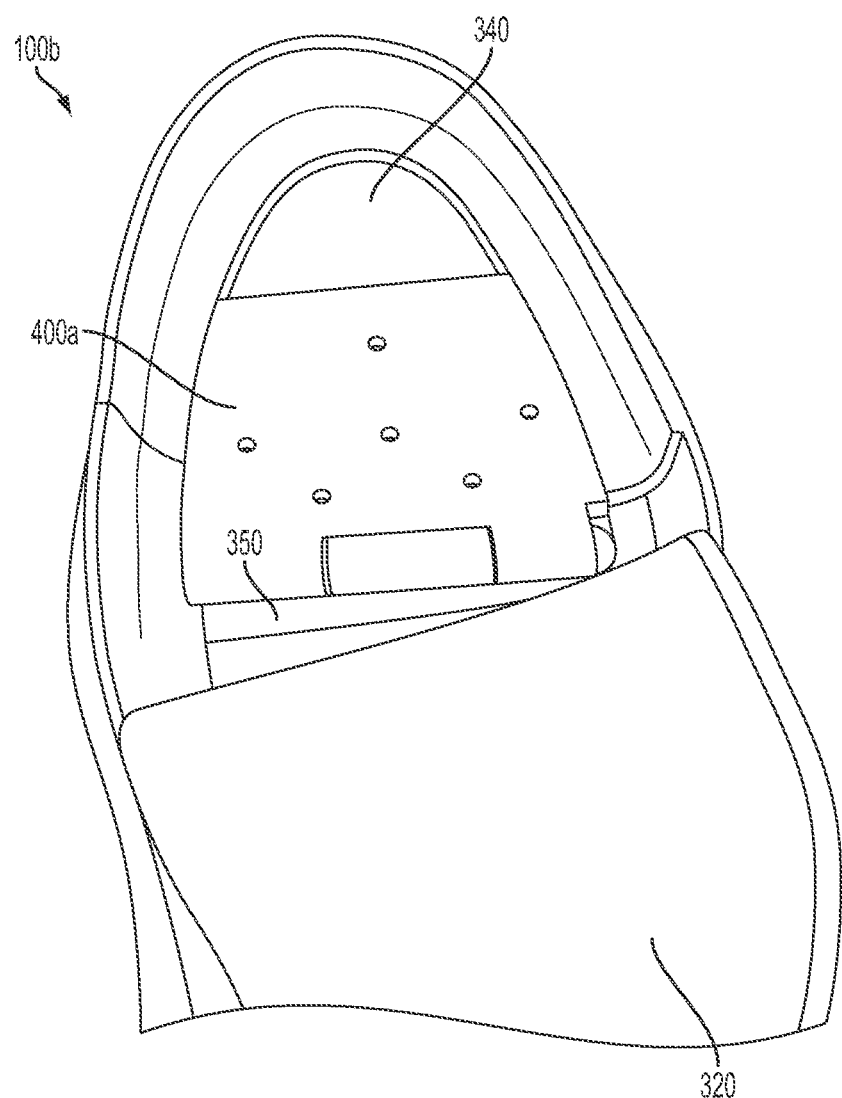
FIG. 21 shows a device being partially pulled out of a shoe to show a cavity in which the device sits.

FIG. 20 shows the insole 320 being partially pulled back to expose various parts of the shoe 100b in accordance with an embodiment. With reference to FIGS. 20 and 21, the shoe 100b includes a midsole 340 that has a cavity 350. The midsole 340 is located above the outsole 120 of the shoe 100b. The cavity 350 in the midsole 340 can be sized to retain a device 400a. The device 400a may be placed in the forefoot portion of the shoe 100b. Since the device 400a is placed in the cavity 350, a top plate of the device 400a may be flush with a top surface of the midsole 340 so as to create a smooth surface for the insole 320 to lay upon. In various embodiments, the device 400a includes a plurality of air openings at the top plate that allow air to be let out of the device 400a when the device 400a is compressed.

Figure 22:
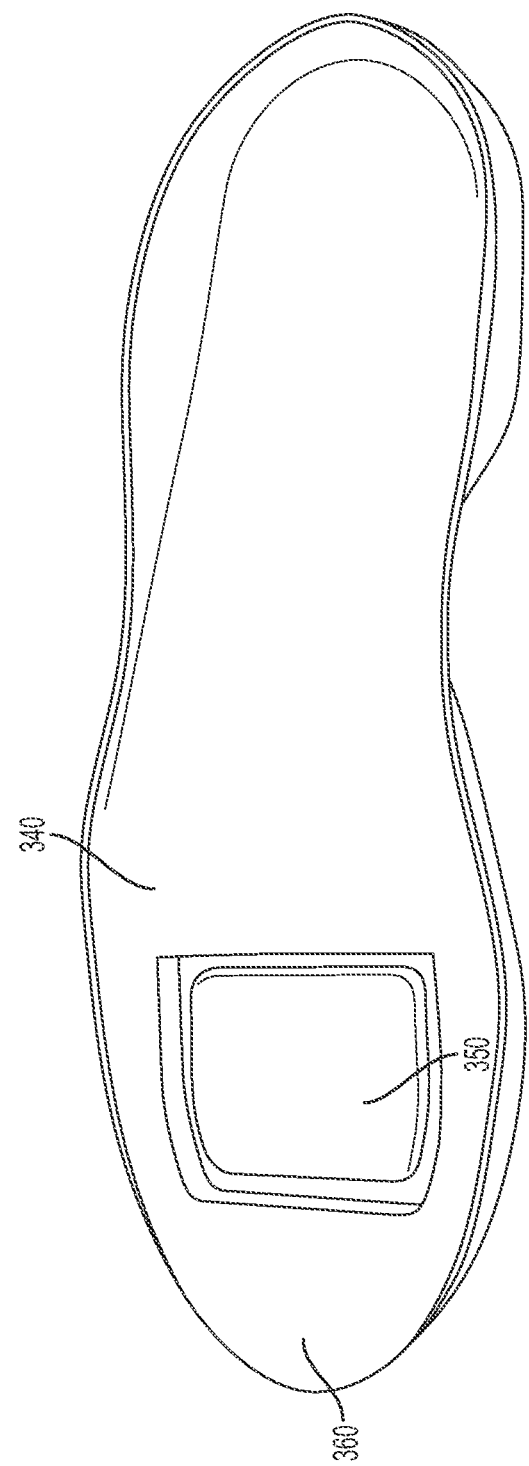
FIG. 22 shows a top of a midsole having a cavity for the placement of a device in accordance with an embodiment.

FIG. 21 shows the insole 320 partially pulled back from the shoe 100b. The device 400a being pulled out shows the cavity 350 in which the device 400a sits. FIG. 22 shows the top of the midsole 340 in accordance with an embodiment that includes the cavity 350. The midsole 340 also includes a regular height portion 360, and the cavity 350 is recessed from that regular height portion 360. With reference to FIGS. 21 and 22, the cavity 350 creates a volume that allows the device 400a to be placed inside the cavity 350. In alternative embodiments, the bottom of cavity 350 can be completely cut out or partially cut out to allow the device 400a to be visible through an outsole which may also include a cut out that is at least partially aligned with the cut out of cavity 350.

Figure 23:
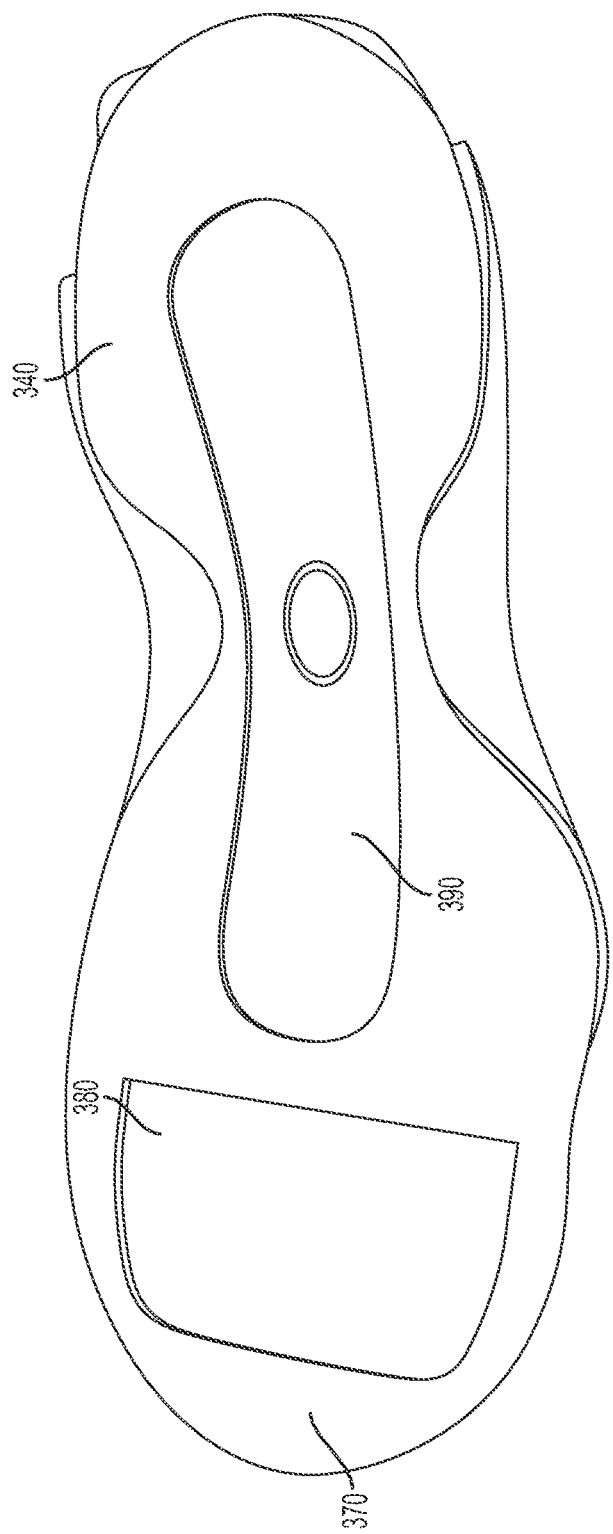
FIG. 23 shows a bottom of a midsole that includes various recessed portions in accordance with an embodiment.

FIG. 23 shows a bottom of the midsole 340 in accordance with an embodiment in which the midsole 340 includes recessed portions 380 and 390. Also shown in FIG. 23 is a regular height portion 370 of the bottom of the midsole 340. With reference to FIGS. 21, 22, and 23, the recessed portion 380 is on an opposite side of where the cavity 350 may be located on the top side of the midsole 340. The recessed portion 380 may be completely or partially cut out to allow the device 400a to be visible from the bottom of the shoe 100b. The recessed portion 390 is where a shank, such as a shank 700 of FIG. 41, meets the midsole 340. In various embodiments, the midsole 340 may comprise ethylene vinyl acetate (EVA), or the like.

Figure 24:
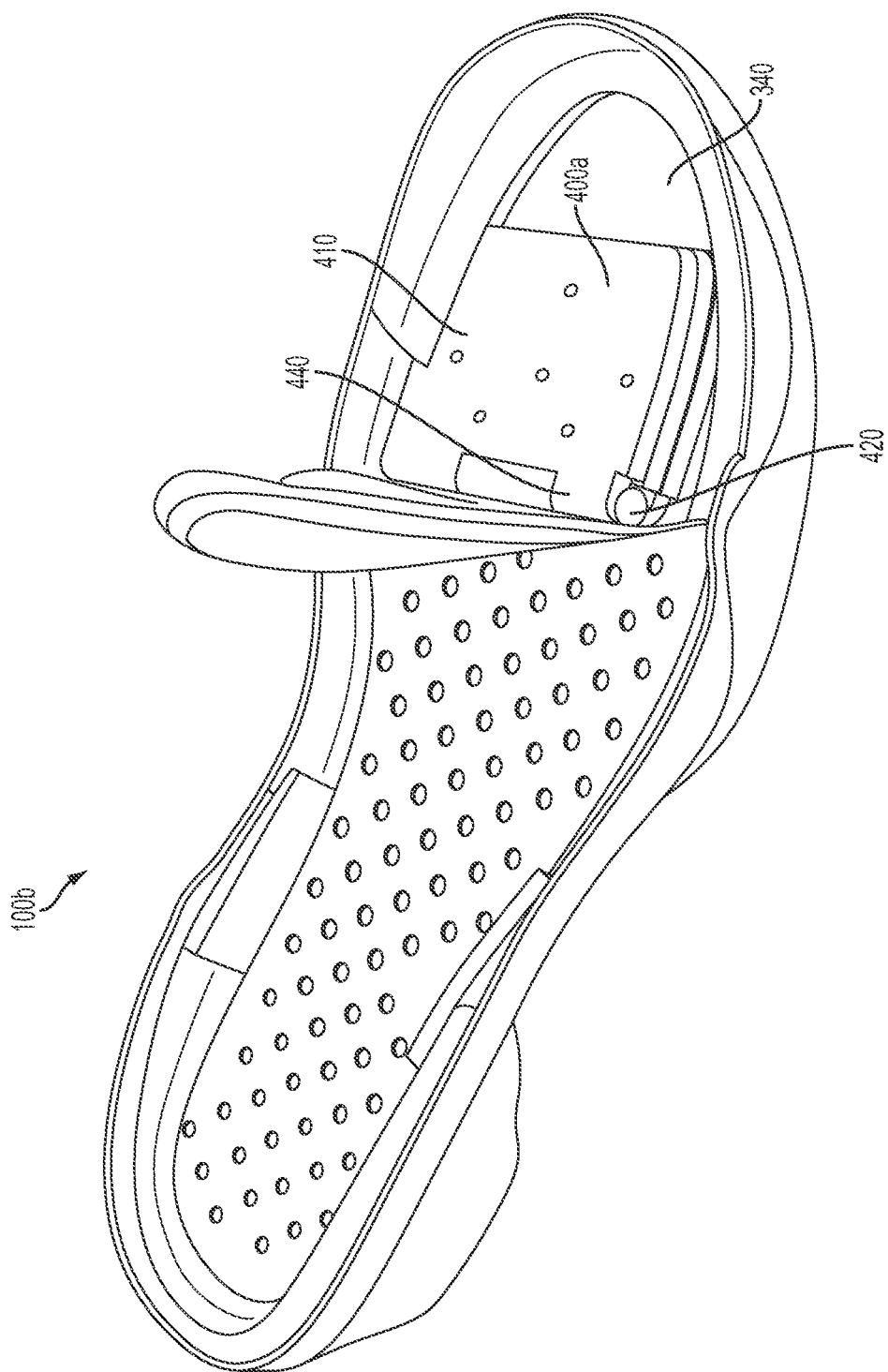
FIG. 24 shows a device in accordance with an embodiment being partially pulled out of a midsole of a shoe with an insole of the shoe being pulled back.

FIG. 24 shows the device 400a being pulled out of the midsole 340 of the shoe 100b. In various embodiments, the device 400a may include a top plate 410 that has a first hinge 440. In the embodiment shown in FIG. 24, the device 400a may be held together in part by a pin 420 passing through the first hinge 440.

Figure 25:
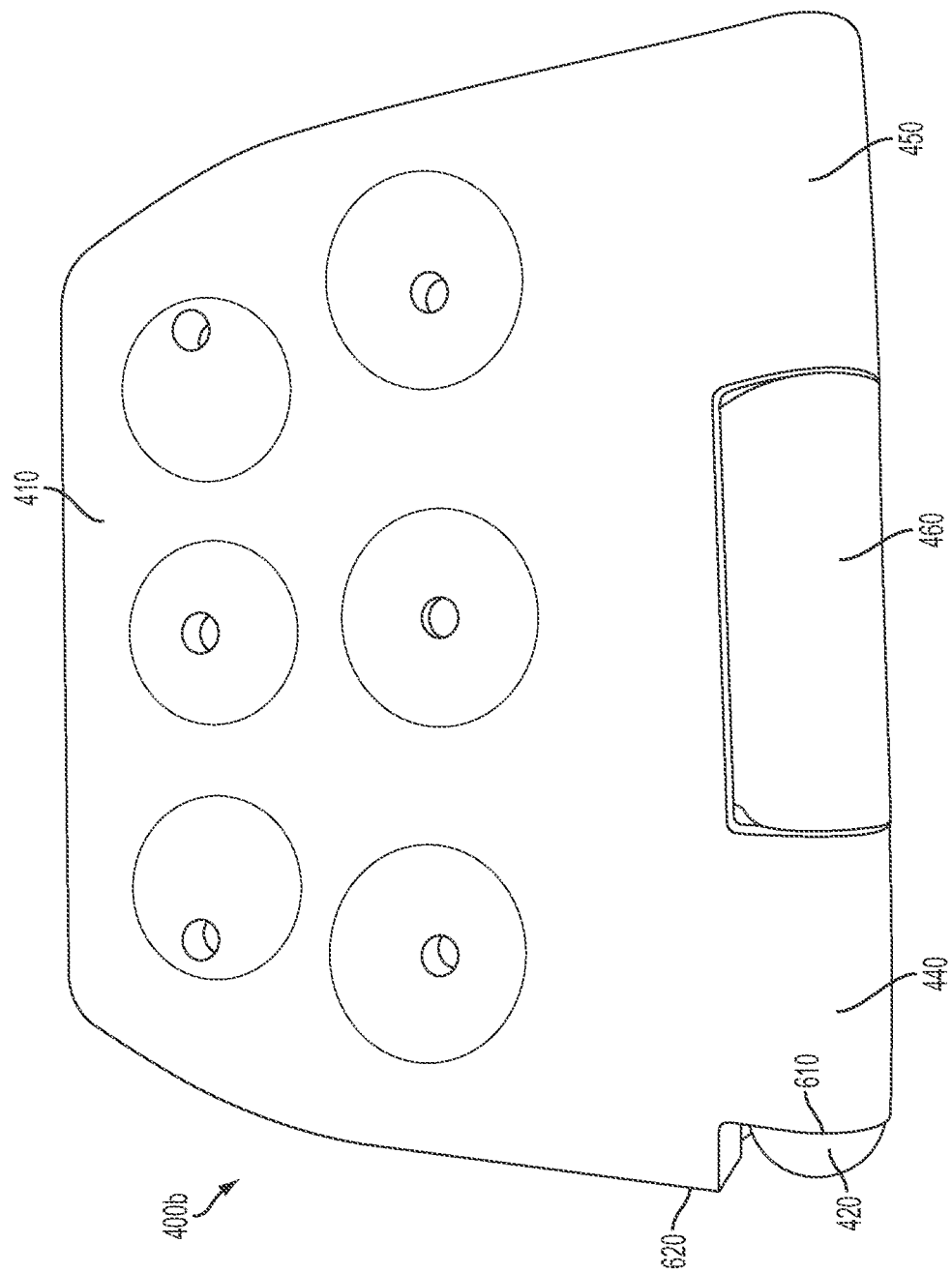
FIG. 25 shows another embodiment of a device for use in a shoe.

FIG. 25 shows another embodiment of the device 400b which may be used in a similar manner as the device 400a of FIG. 21. For example, with reference to FIGS. 21 and 25, the device 400*b* may be placed in the cavity 350 of the midsole 340, just like the device 400*a*. The device 400*b* may include a top plate 410, a pin 420, first and second hinges 440 and 450, a bottom plate hinge 460, an outer edge 610 of the first hinge 440, and an edge 620 of the top plate 410. In this embodiment, the first hinge 440 is shorter than the second hinge 450. In various embodiments, the outer edge 610 of the first hinge 440 is slightly recessed from the outer edge 620 of the top plate 410 in order to accommodate the pin 420 and make an end of the pin 420 flush with the outer edge 620.

Figure 26:
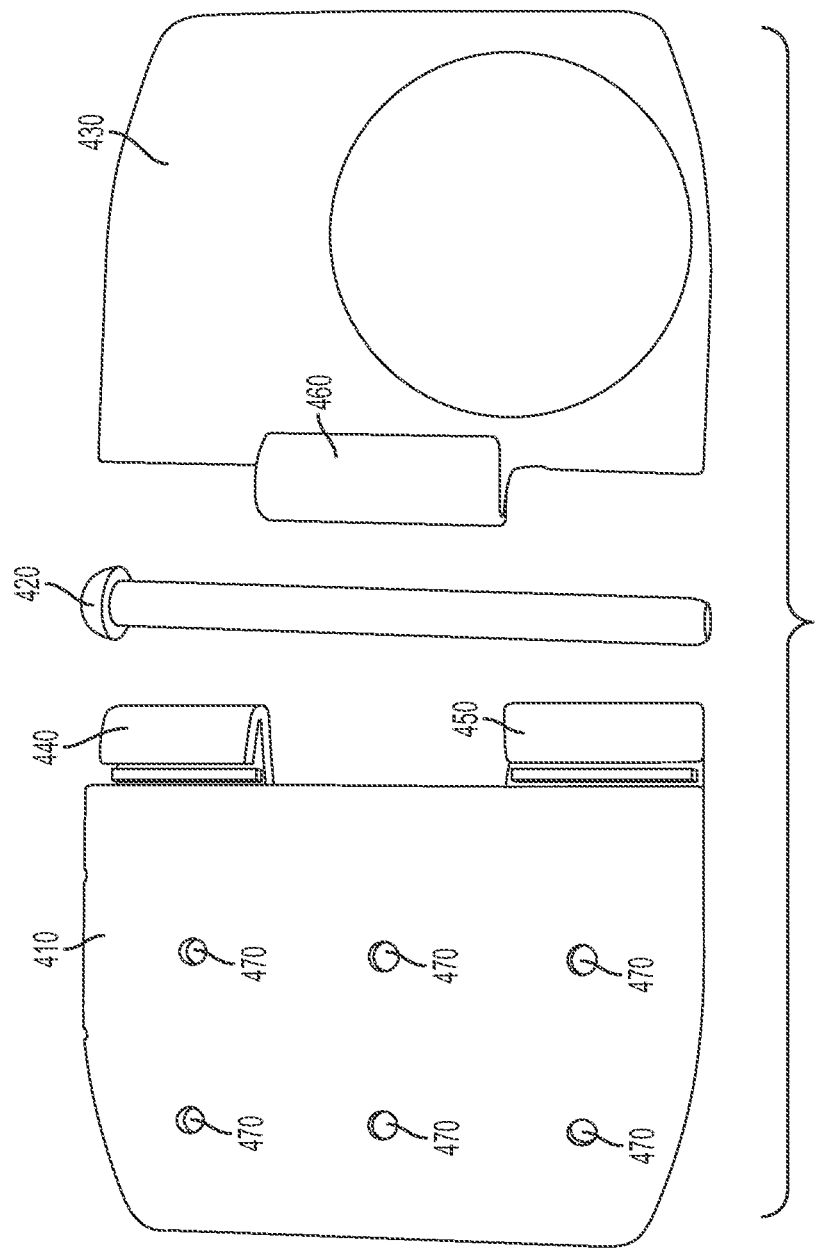
FIG. 26 shows an exploded view of part of a device in accordance with an embodiment.

FIG. 26 shows an exploded view of part of the device 400*b* of FIG. 25. With reference to FIGS. 25 and 26, the device 400*b* includes the top plate 410, a bottom plate 430, the first hinge 440, the second hinge 450, the bottom plate hinge 460, the pin 420, and air openings 470 in the top plate 410. In various embodiments, the top and bottom plates 410 and 430 may comprise a polyether block amide (PEBA) material, such as the PEBA material known as Pebax® that is manufactured by ARKEMA. In various other embodiments, the top and bottom plates 410 and 430 may comprise other materials, such as metals like titanium, or the like. The device 400*b* may be assembled by placing the hinges 440, 450, and 460 adjacent to one another and passing the pin 420 through the center portion of the hinges 440, 450, and 460. The air openings 470 allow air to pass though the top plate 410, such that when the device 400*b* is compressed, air pressure is easily released.

Figure 27:
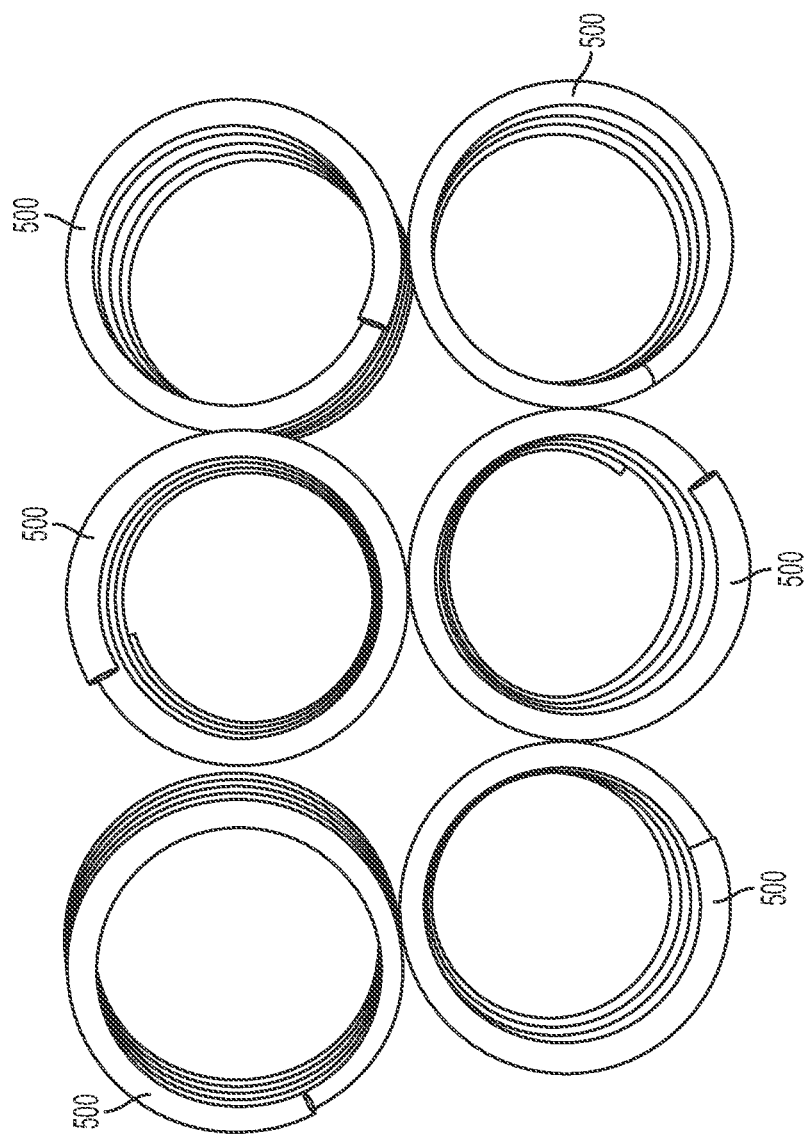
FIG. 27 shows example springs that may be used in a device in accordance with an embodiment.

FIG. 27 shows example springs 500 that may be used in various embodiments. With reference to FIGS. 26 and 27, in various embodiments the springs 500 may be placed between the top plate 410 and the bottom plate 430 to provide a bias force that separates the top plate 410 and bottom plate 430 and that can be compressed when the top plate 410 is stepped on by a user. In this embodiment, six springs 500 are shown. However, in other embodiments, the number of springs may vary. For example, the device may have 1, 2, 3, 4, 5, 6, 7, 8 or more springs of varying sizes. The springs 500 act as energy return members to store energy when compressed and then release the energy to launch a foot of a user.

Figure 28:
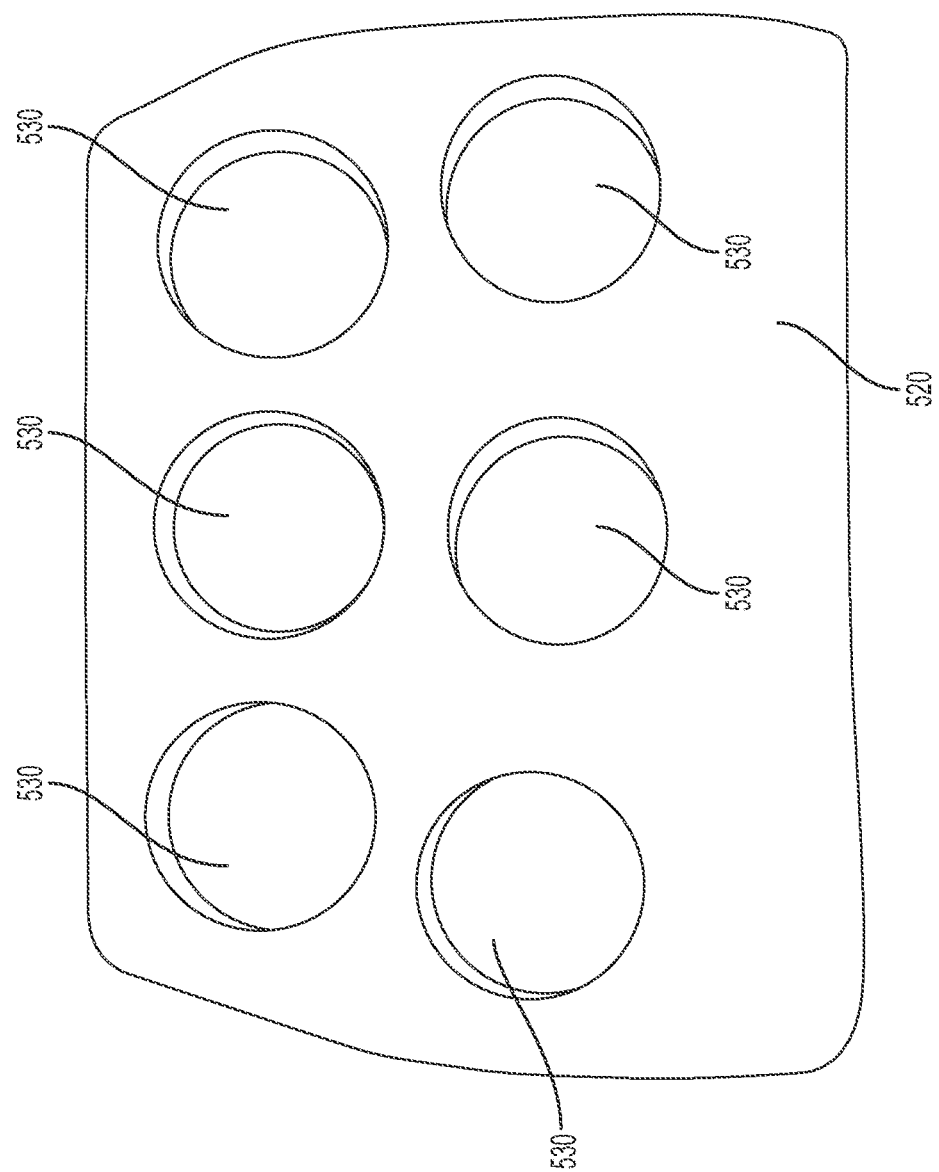
FIG. 28 shows a filler material that has various openings that may house springs in accordance with an embodiment.

FIG. 28 shows a filler material 520 that has various openings 530 in accordance with an embodiment. With reference to FIGS. 26, 27, and 28, the filler material 520 may be placed between the top plate 410 and the bottom plate 430, and the openings 530 in the filler material 520 allow the springs 500 to be placed between the top plate 410 and the bottom plate 430 in the openings 530. In this embodiment, two rows of three openings each are shown. However, in other embodiments, there may be less than two or more than two rows of openings for springs. In another embodiment, the openings 530 may be arranged in a circular pattern. In yet another embodiment, the diameters of the openings 530 may individually vary in size depending on the diameters of springs to be placed in the openings 530. In various embodiments, the filler material 520 may comprise ethylene vinyl acetate (EVA), or the like. In some embodiments, the openings 530 may be die-cut holes in the filler material 520.

Figure 29:
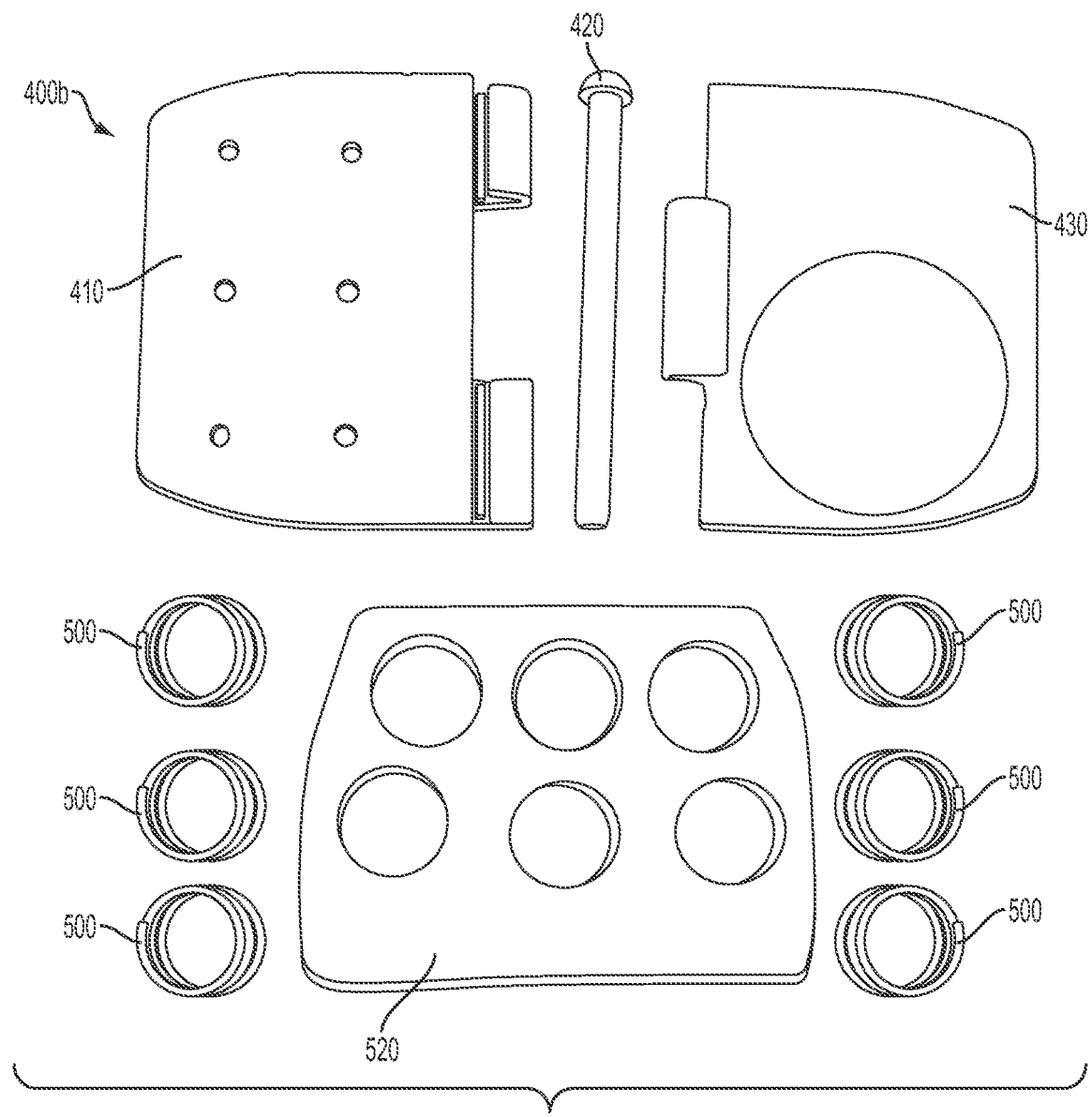
FIG. 29 shows an exploded view of an example embodiment of a device.
Figure 30:
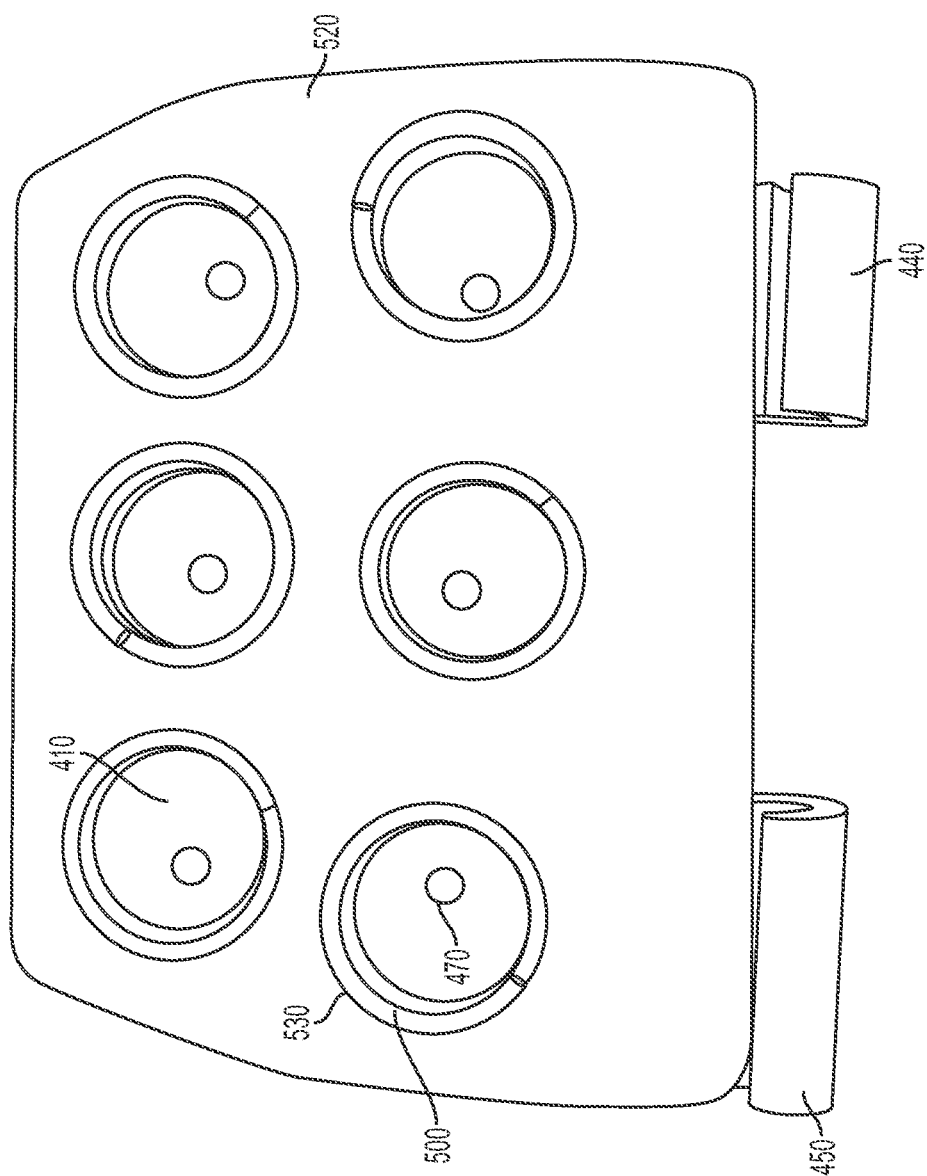
FIG. 30 shows portions of a top plate that may be exposed through the openings in a filler material in accordance with an embodiment.

FIG. 29 shows an exploded view of the device 400*b* in accordance with an embodiment. Various components of the device 400*b* are shown. For example, the top plate 410, the bottom plate 430, the pin 420, the springs 500, and the filler material 520 are shown in a disassembled manner. With reference to FIGS. 25, 29, and 30, the device 400*b* is shown in FIG. 30 with the bottom plate 430 removed from the device 400*b*.

In particular, FIG. 30 shows portions of the top plate 410 that are exposed through the openings 530 of the filler material 520. Also shown in FIG. 30 are two rows of three springs 500 that may be placed in the openings 530 of the filler material 520. A diameter of the openings 530 may be slightly larger than a diameter of the springs 500 to allow the springs 500 to be placed in the corresponding openings 530. The air openings 470 in the top plate 410 are aligned to be located within an area of the openings 530 and open areas of the springs 500.

Figure 31:
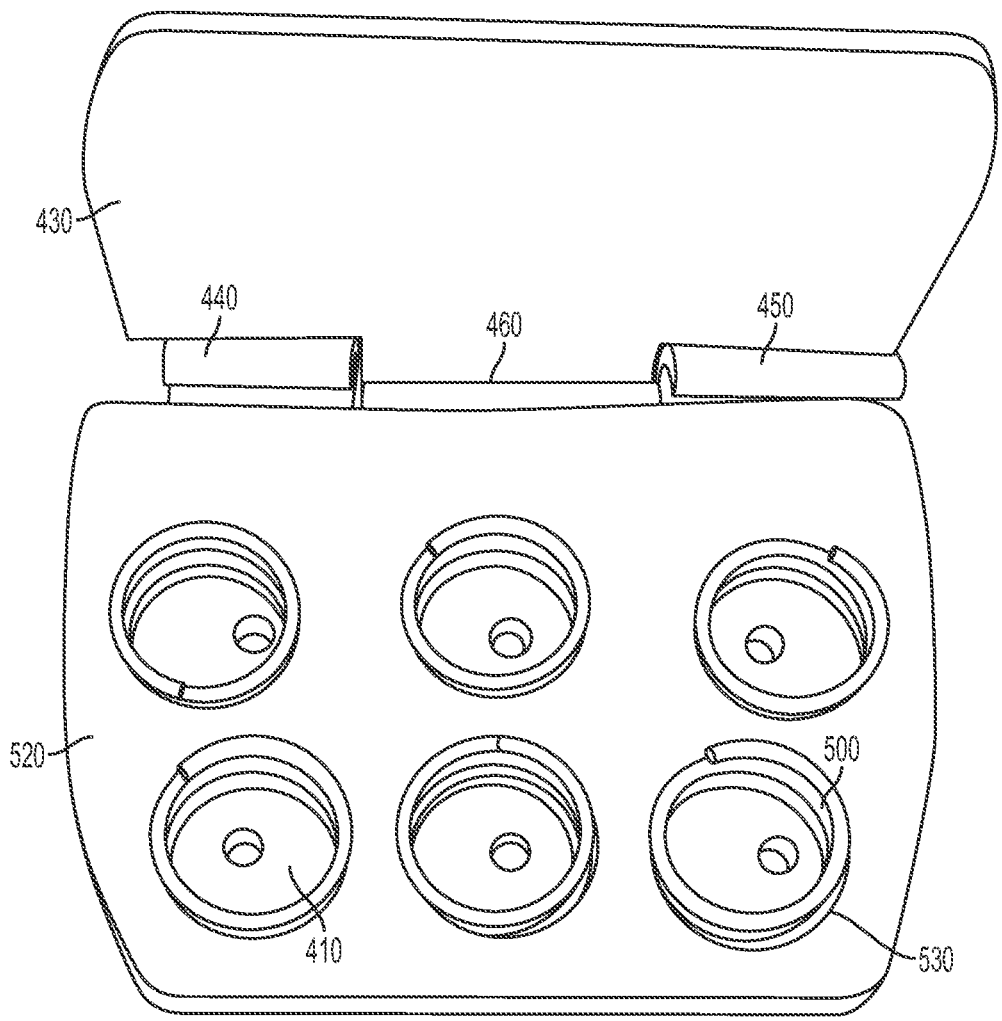
FIG. 31 shows a portion of a device in accordance with an embodiment in which a hinge of a bottom plate has been placed between a first and a second hinge of a top plate.

FIG. 31 shows a portion of the device 400*b* (FIG. 29) in which the bottom plate hinge 460 of the bottom plate 430 has been placed between the first and second hinges 440 and 450. With reference to FIGS. 29 and 31, the device 400*b* may be assembled together by placing the pin 420 into the hinges 440, 450, and 460 once they have been aligned as in FIG. 31.

Figure 32:
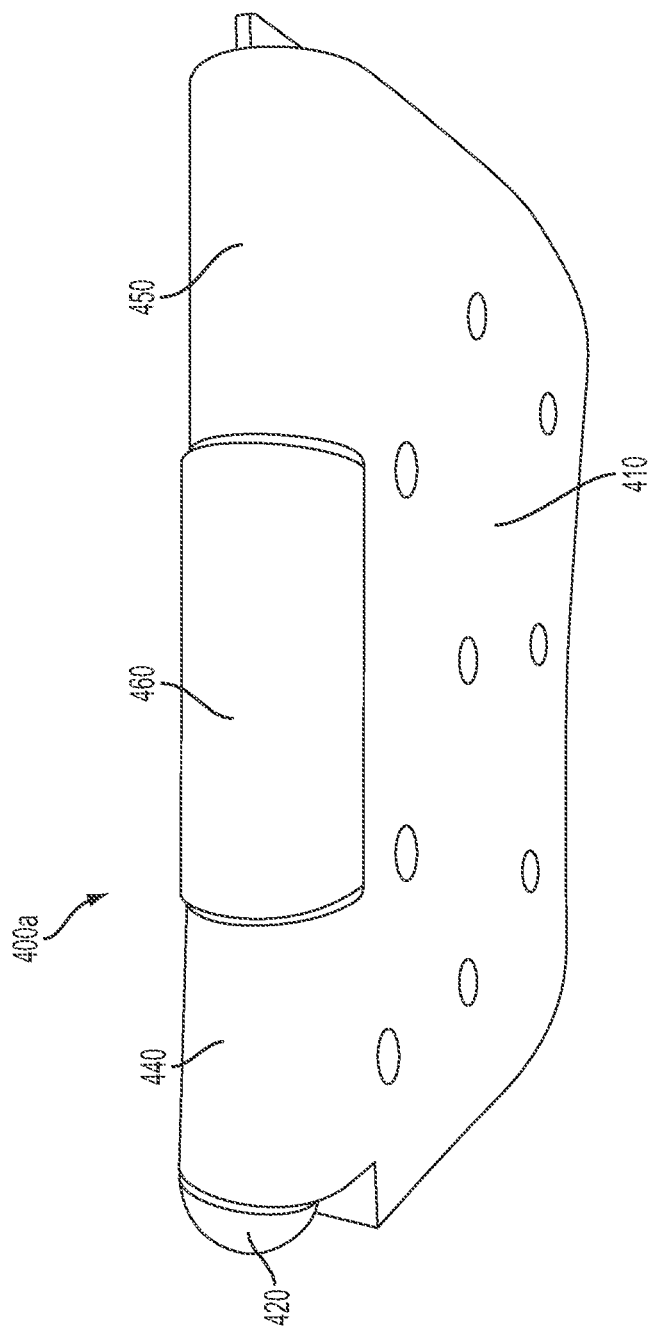
FIG. 32 shows a device in accordance with an embodiment.

FIG. 32 shows the device 400*a*, which is similar to the device 400*b* of FIG. 25, except the shorter hinge 440 is on an opposite side of where it was in the device 400*b*.

Figure 33:
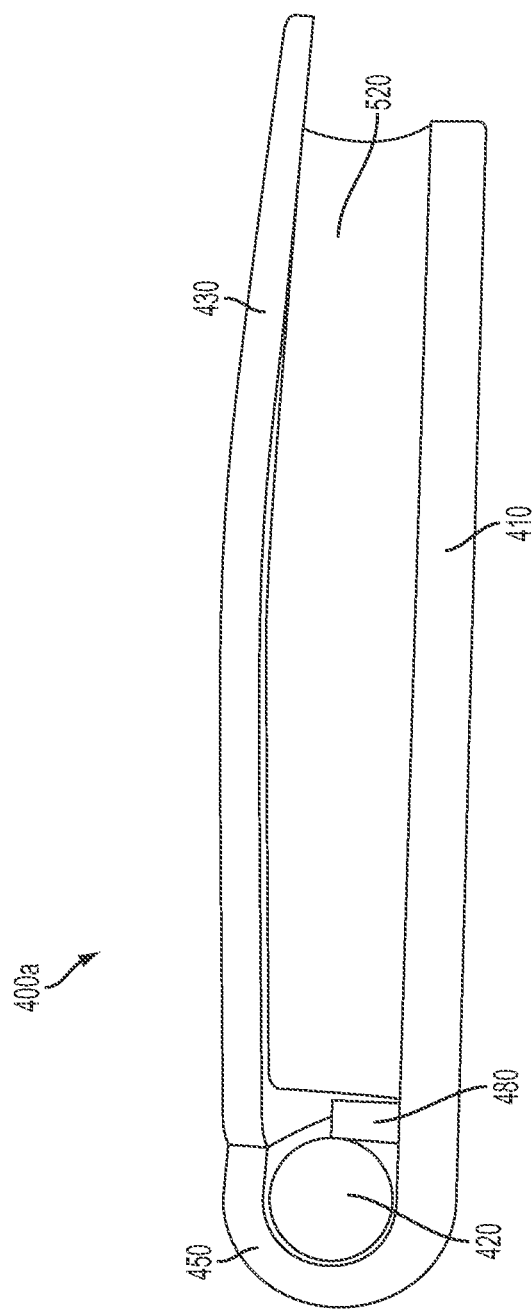
FIG. 33 shows a side view of a device in accordance with an embodiment.

FIG. 33 shows the device 400*a* from a side view in accordance with an embodiment. The top plate 410 may have a projection 480 that extends toward the bottom plate 430. The projection 480 may act as a stop member for the pin 420. The projection 480 may be located between the filler material 520 and the pin 420. In various embodiments, the filler material 520 can be made of foam, or the like. As shown in FIG. 33, the bottom plate 430 can extend beyond an edge of the top plate 410. In other embodiments, the top plate 410 may extend past the bottom plate 430, or may be of equal length with the bottom plate 430.

Figure 34:
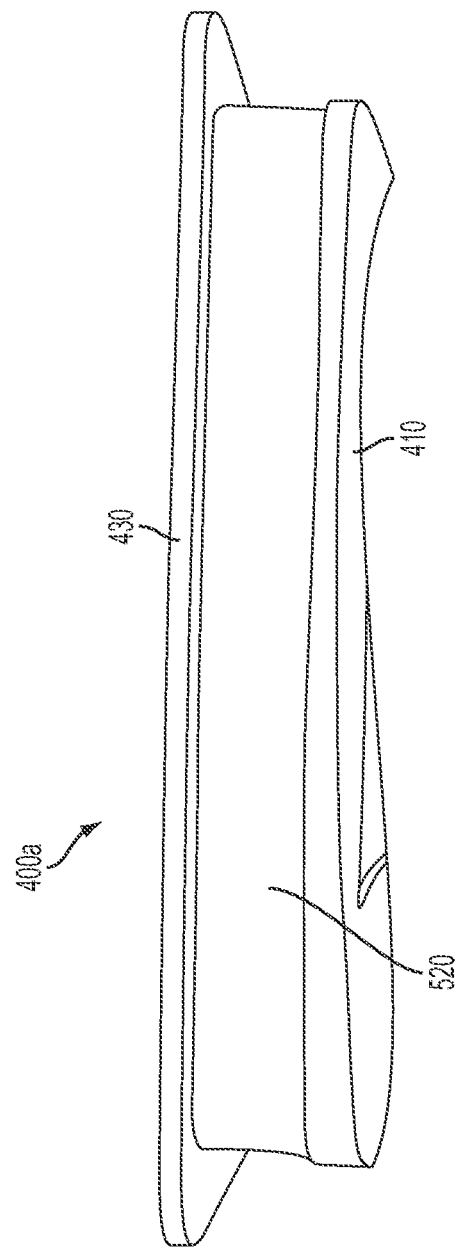
FIG. 34 shows a front view of a device in accordance with an embodiment having a filler material placed between a top plate and a bottom plate.

FIG. 34 shows a front view of the device 400*a* showing the filler material 520 placed between the top plate 410 and the bottom plate 430. In this embodiment, the bottom plate 430 may extend past the edges of the top plate 410. In particular, the extended portion of the bottom plate 430 may be used to attach the device 400*a* within a shoe according to an embodiment.

Figure 35:
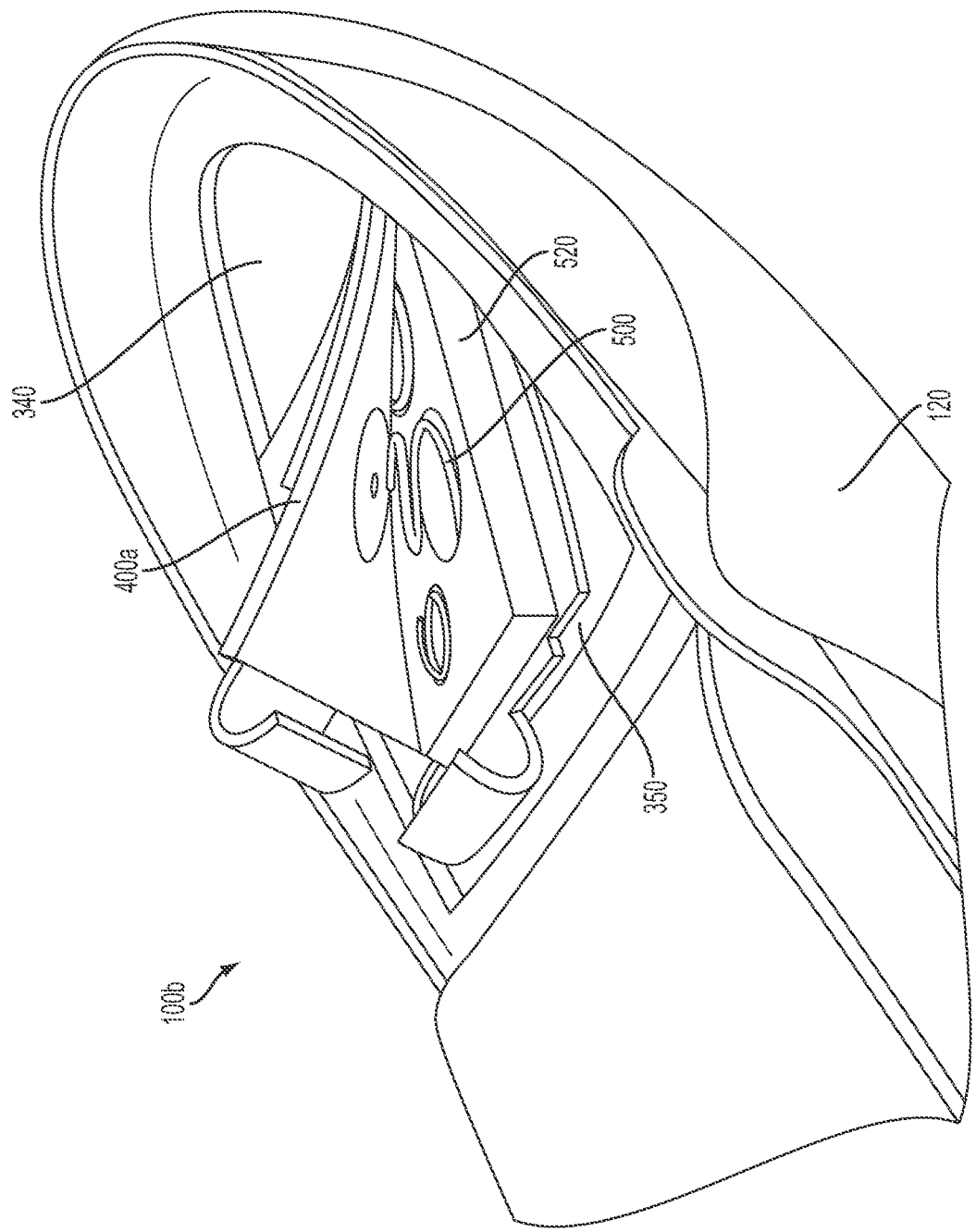
FIG. 35 shows a partially disassembled view of a device in accordance with an embodiment as it is placed into a cavity in a shoe.
Figure 36:
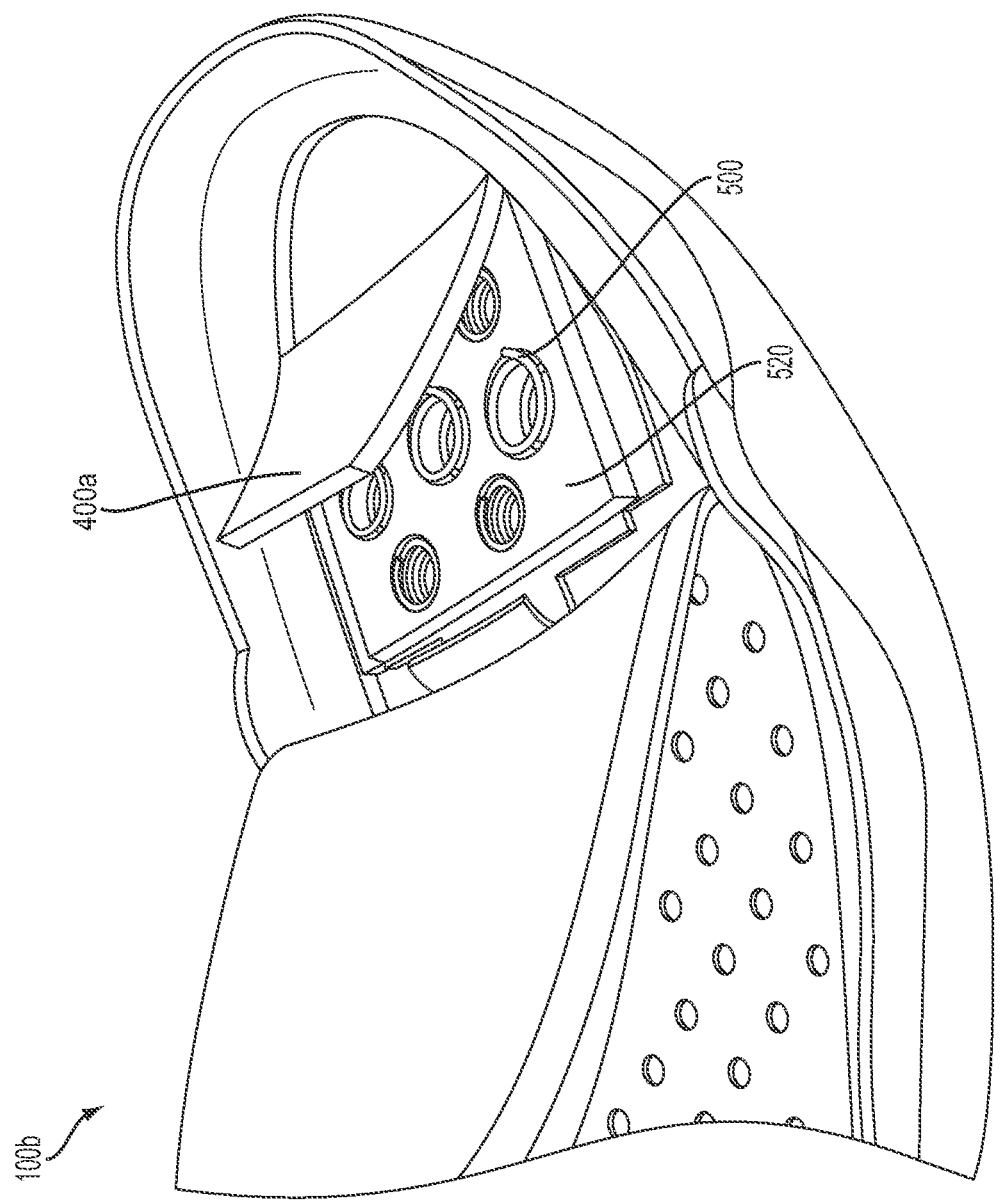
FIG. 36 shows another partially disassembled view of a device in accordance with an embodiment as it is placed into a cavity in a shoe.

FIG. 35 shows a partially disassembled view of the device 400*a* as it is placed into the cavity 350 of the shoe 100*b*. In this embodiment, the device 400*a* sits in the shoe above the outsole 120 in the midsole 340 in the forefoot portion 210 (see FIG. 15). FIG. 35 shows the filler material 520 and springs 500 of the device 400*a*. In various embodiments, some springs in the device 400*a* may have a larger diameter than other springs in the device 400*a*. Similar to FIG. 35, FIG. 36 shows a partially disassembled view of the device 400*a* as it is placed into the shoe 100*b*.

Figure 37:
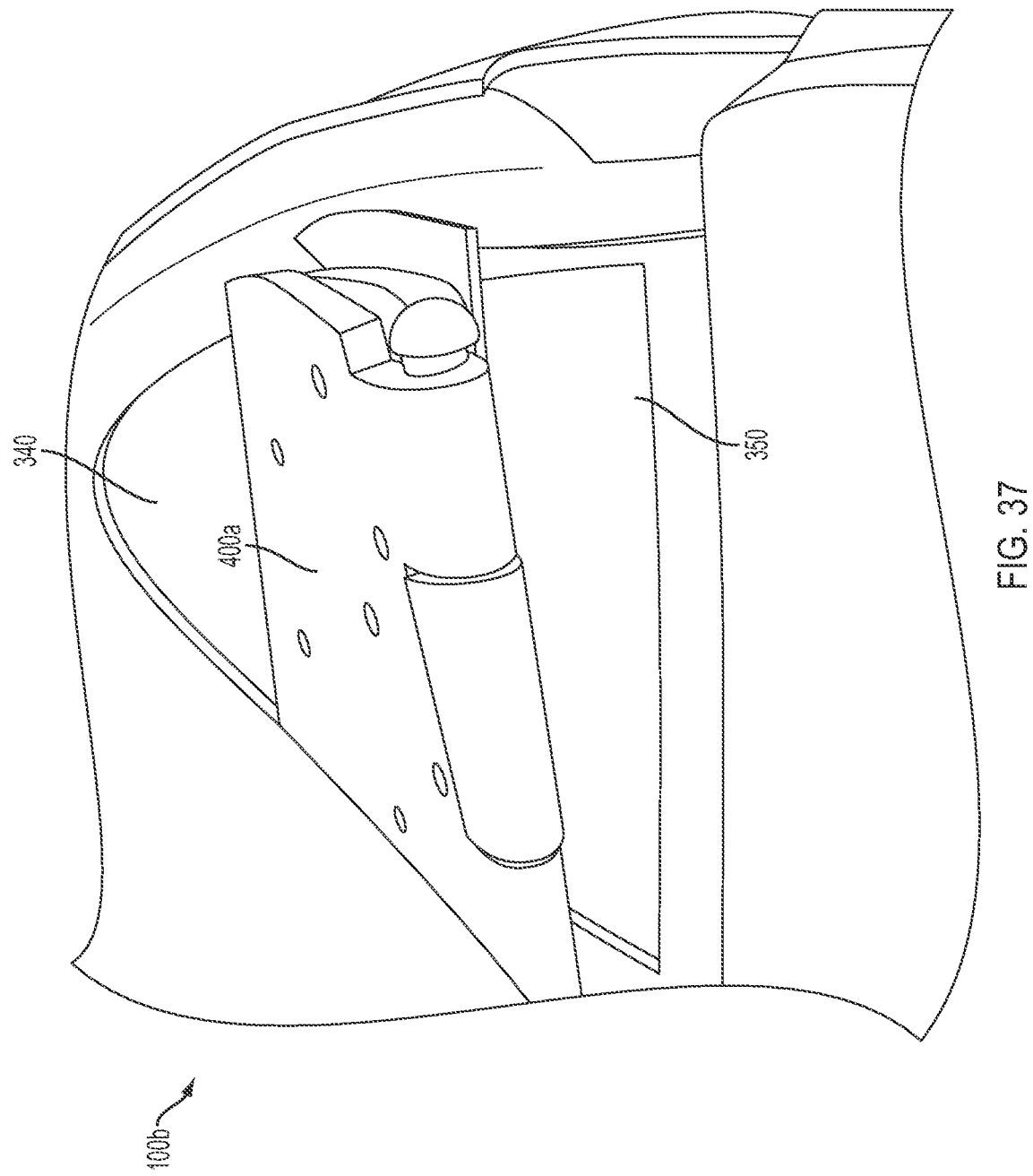
FIG. 37 shows an assembled device in accordance with an embodiment being placed into a cavity in a midsole of a shoe.

FIG. 37 shows the device 400*a* being placed into the cavity 350 in the midsole 340 of the shoe 100*b*. With reference to FIGS. 34 and 37, the portion of the bottom plate 430 that extends past the top plate 410 may be used to attach the device 400*a* to the shoe 100*b*. In various embodiments, an adhesive may be used on the extended portion of the bottom plate 430, such as a glue, or the like. In some embodiments, the glue may be used on an entire bottom surface of the bottom plate 430 to attach the device 400*a* to the midsole 340. In other embodiments, the midsole 340 may have tracks, projections, guides, or the like, that allow for snap fitting the device 400*a* into the shoe 100*b*. Such features may allow an individual to easily remove the device 400*a* and replace it with another device.

Figure 38:
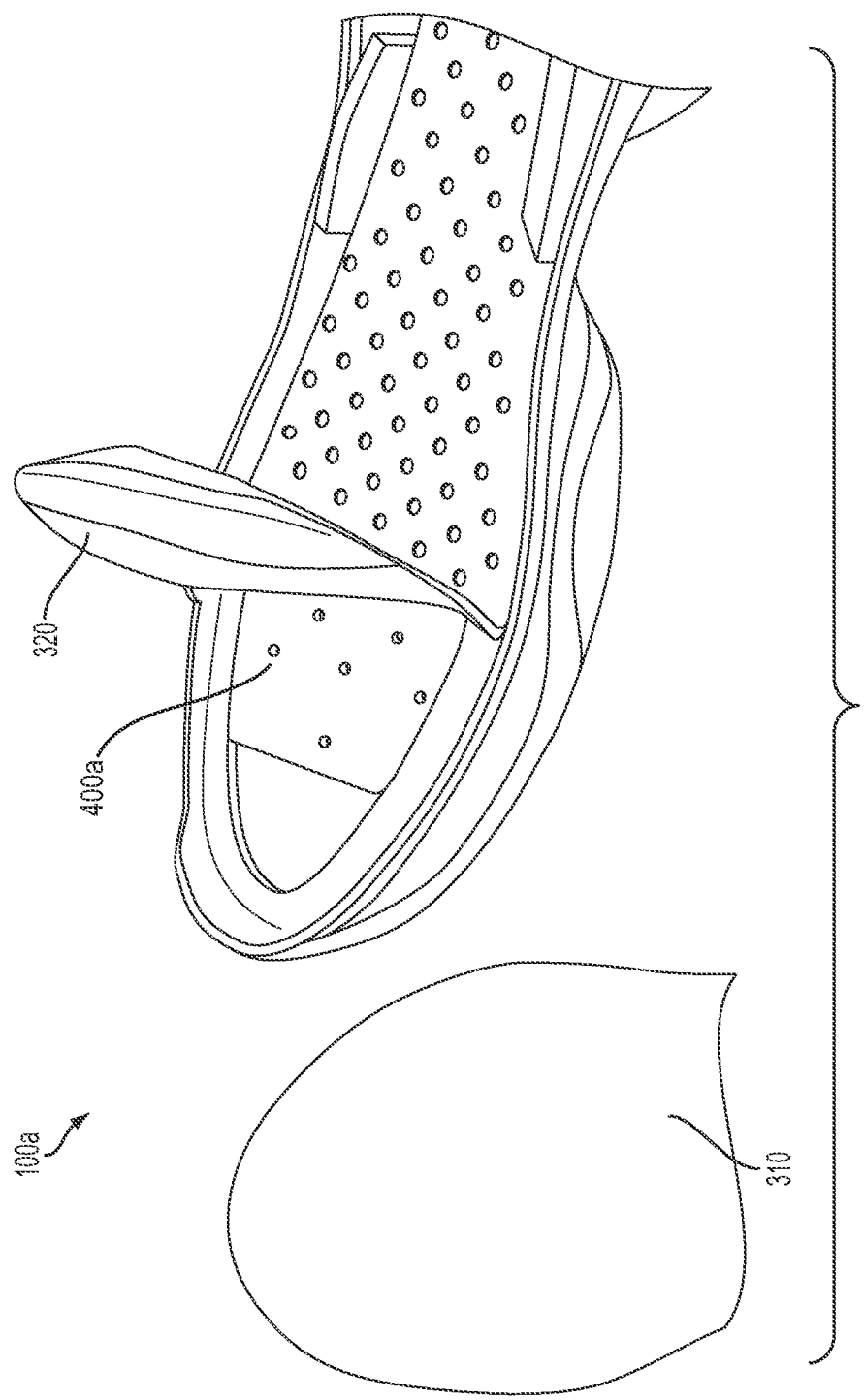
FIG. 38 shows a portion of a shoe in accordance with an embodiment with an insole that is partially pulled back having a large cushioning portion located at a forefoot portion of the insole.

FIG. 38 shows the shoe 100*a* in accordance with an embodiment with the insole 320 partially pulled back. In various embodiments, various materials can be placed into the insole 320. The insole 320, the sockliner 310, and the device 400*a* may operate together to create a force to lift a foot of a user when the foot is being raised after having compressed the device 400a. In various embodiments, the insole 320 may comprise EVA material, or the like.

Figure 39:
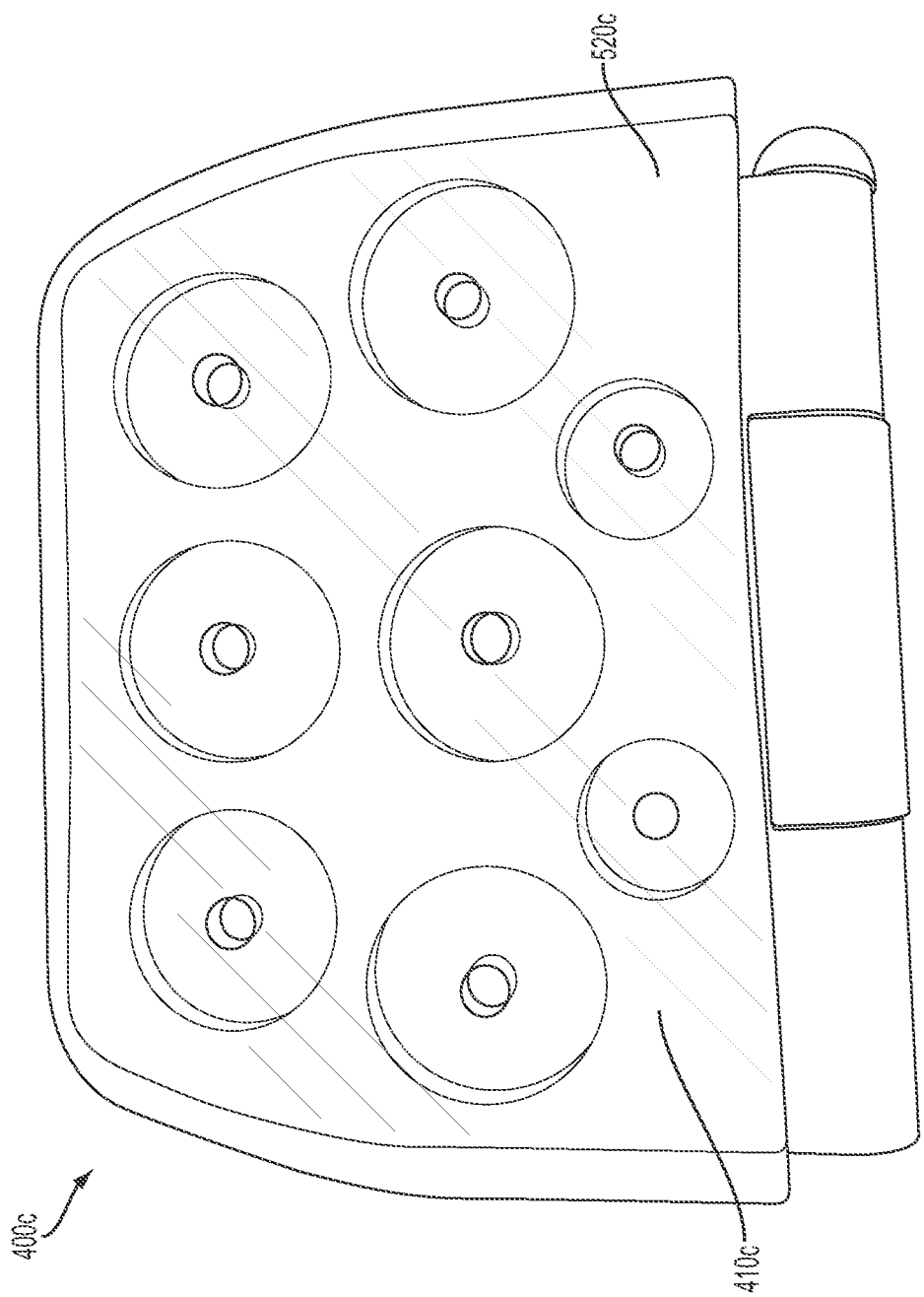
FIG. 39 shows a top view of another embodiment of a device with an at least partially transparent top plate.
Figure 40:
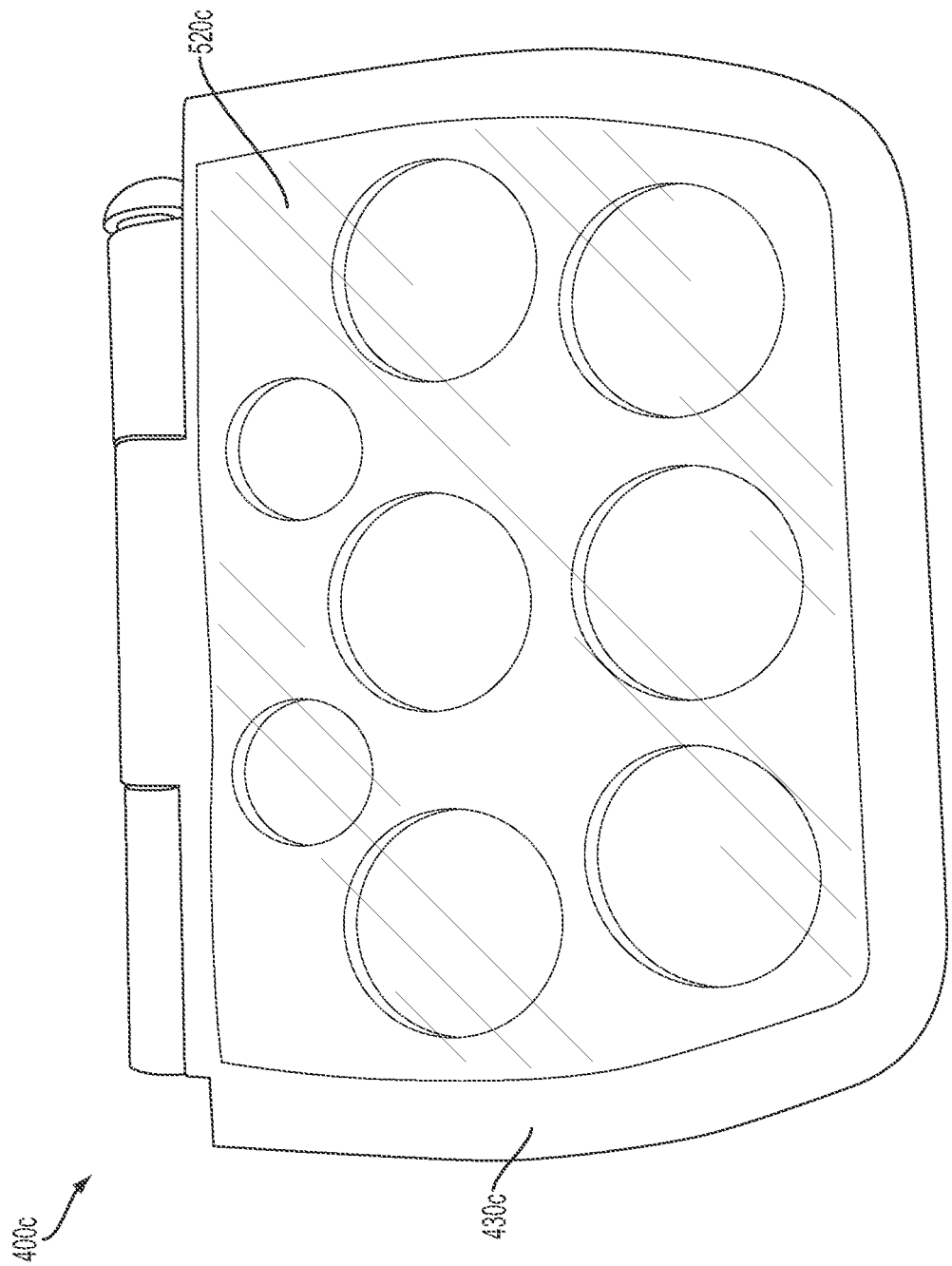
FIG. 40 shows a bottom view of the device shown in FIG. 39 with an at least partially transparent bottom plate.

FIG. 39 shows a top view of another embodiment of a device 400c with a top plate 410c. The top plate 410c may comprise a material 520c that is at least partially transparent. FIG. 40 shows a bottom view of the device 400c in which the bottom plate 430c comprises the material 520c that is at least partially transparent. The material 520c allows a user to view the springs and filler material of the device 400c. In an assembled shoe, the device 400c may be visible from an outsole of the shoe.

Figure 41:
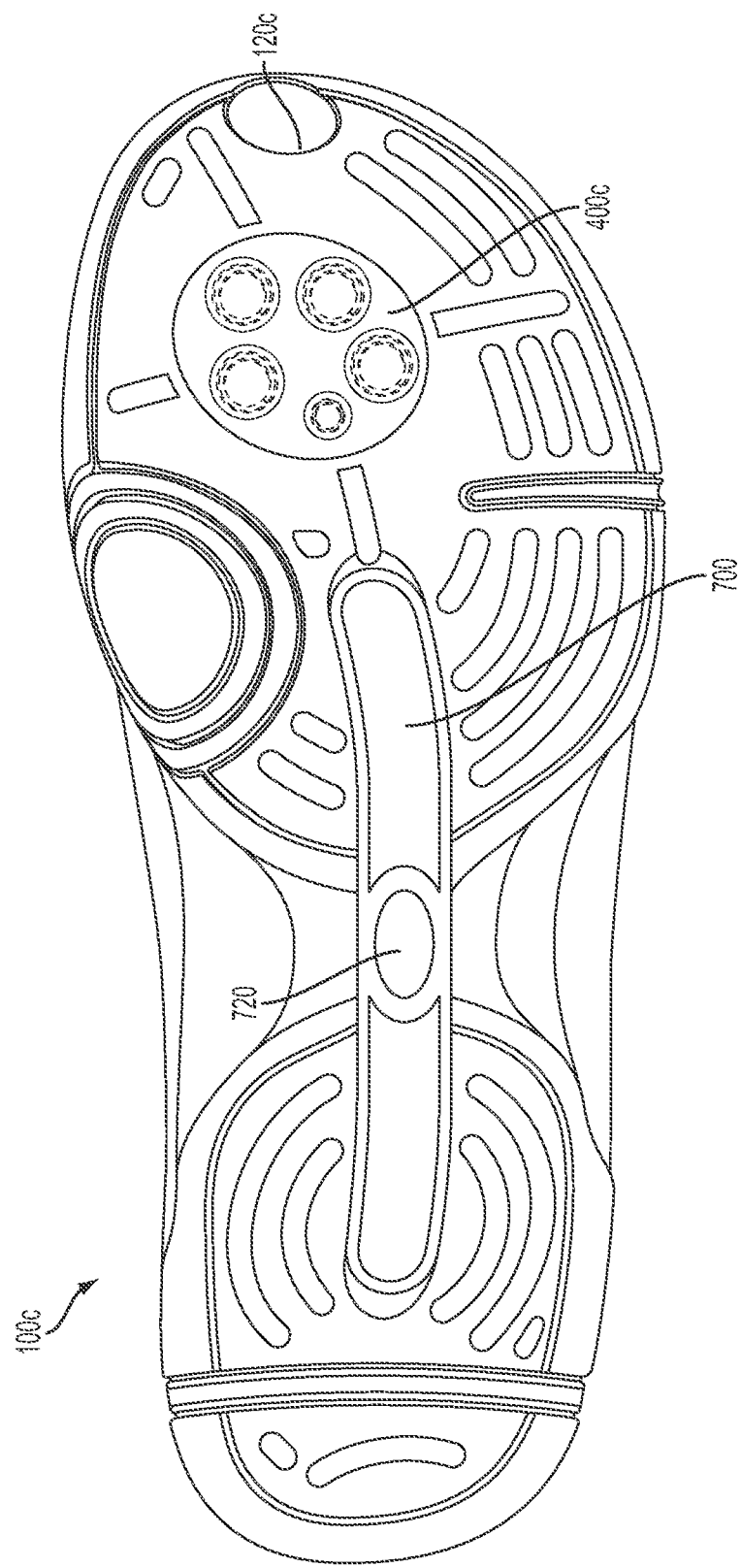
FIG. 41 shows another embodiment of a shoe in which a portion of a device is visible from a bottom of the shoe.

FIG. 41 shows another embodiment of a shoe 100c. In this embodiment, the device 400c is visible from the bottom of the shoe 100c. The outsole 120c of the shoes 100c has an opening or window, and the midsole has an opening that allows a user to see the device 400c. In this embodiment, the shoe 100c includes a shank 700. The shank 700 may direct a force generated by a user into the device 400c. The shank 700 may be formed of a thermoplastic material, Pebax® material, or the like. Pebax® material is a polyether block amide material. A soft pod 720 made of, for example, EVA or the like may be located at a center portion of the shank 700. In various embodiments, the shank 700 may be, for example, about 740 durometers in hardness.

Figure 42:
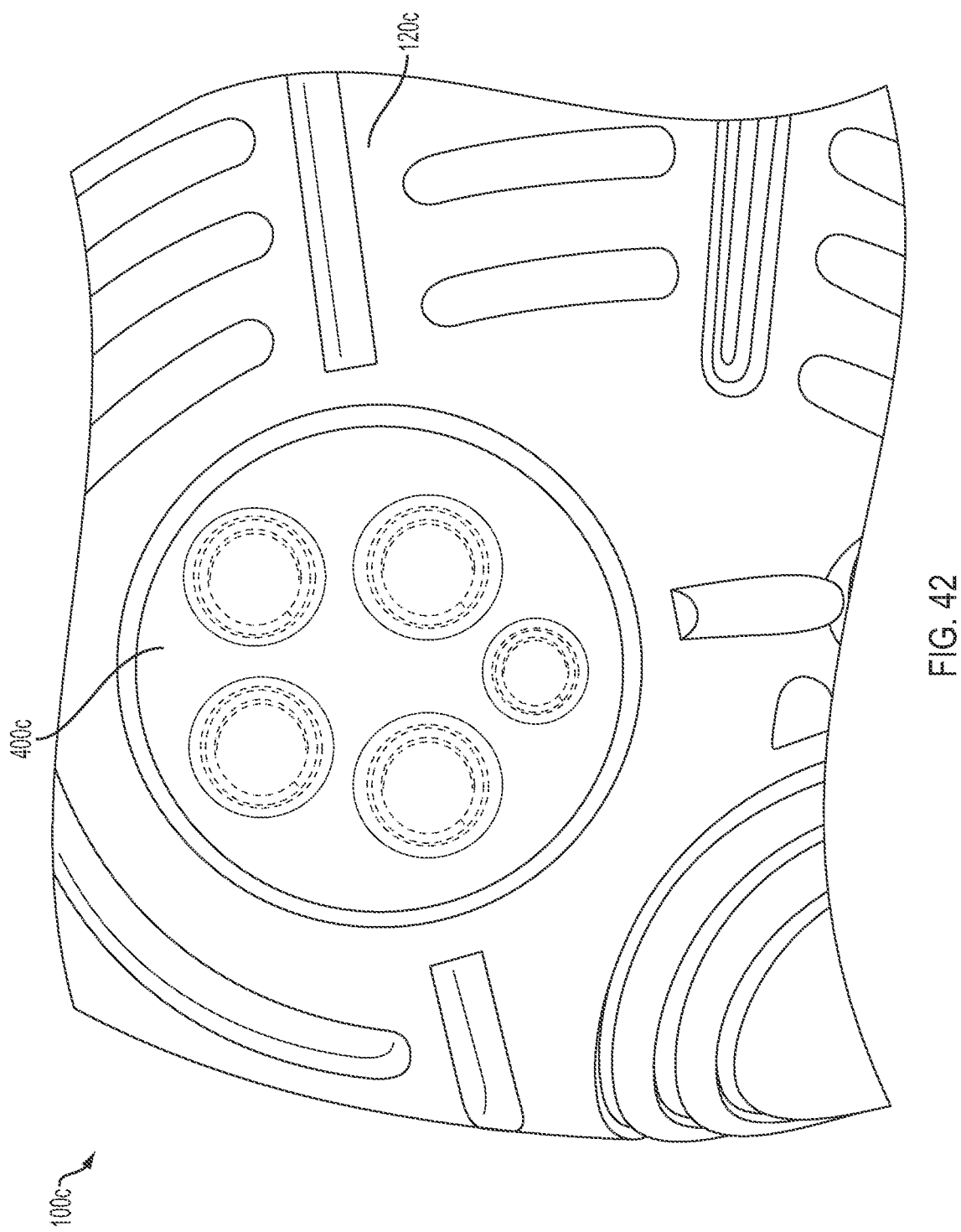
FIG. 42 shows a close up of a bottom of a shoe in accordance with an embodiment that has an opening in the outsole that allows a device in the shoe to be visible.
Figure 43:
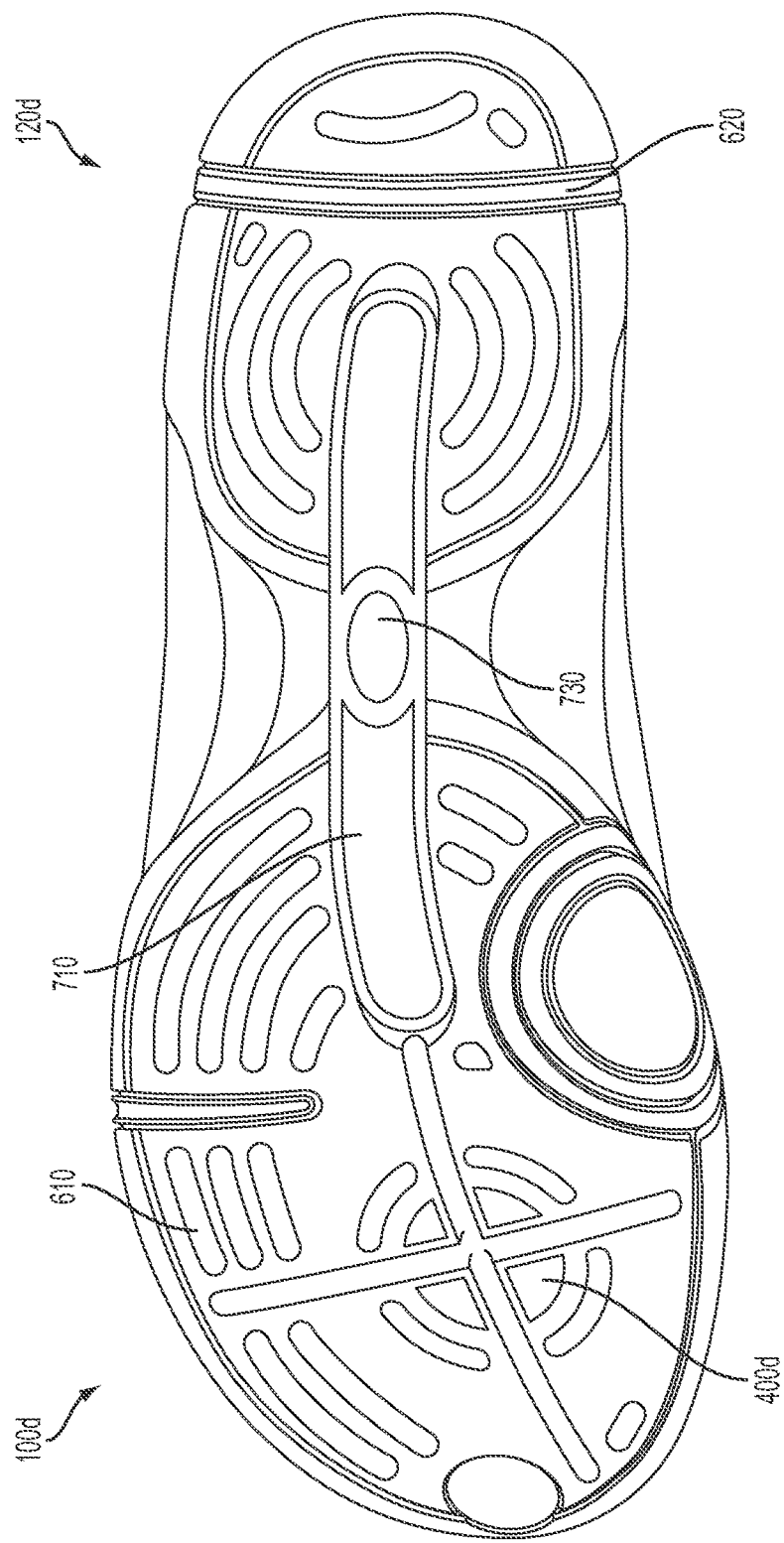
FIG. 43 shows a bottom of a shoe in accordance with an embodiment that includes a shank.

FIG. 42 shows a close up of a bottom of the shoe 400c which has an opening in the outsole 120c that allows the device 400c to be visible. FIG. 43 shows a bottom of a shoe 100d in accordance with an embodiment, which includes a shank 710. The shank 710 may provide added support by extending between a heel 620 and a ball portion 610 of the shoe 100d. In this embodiment, the outsole 120d has an opening through which the device 400d is visible, and in this embodiment a plate of the device 400d may be made of titanium. The opening in the outsole 120d may be in four portions as shown in FIG. 43.

FIG. 44a shows a possible arrangement of springs on a plate for a device 400e in accordance with an embodiment. In this embodiment, three rows of springs are arranged to be located between top and bottom plates. The top row has large springs 1010a with a diameter of about 15.0 mm. A second row of large springs 1010b is shown with each having a diameter of about 15.0 mm. A third row of smaller springs 1020 may be located closest to a hinge and may each have a diameter of about 10.0 mm. The wires of the springs 1010a and 1010b may have a thickness of about 1.2 mm. FIG. 44b is a cross section of the device 400e along the line 44b-44b shown in FIG. 44a. In particular, a thickness of the device 400e in the embodiment shown in FIGS. 44a and 44b is about 5.0 mm. A distance between the top and bottom plate of the device 400e may be less than an extended length of the springs 1010a, 1010b, and 1020, such that the springs 1010a, 1010b, and 1020 are arranged to exert a force against the plates.

Figure 45A:
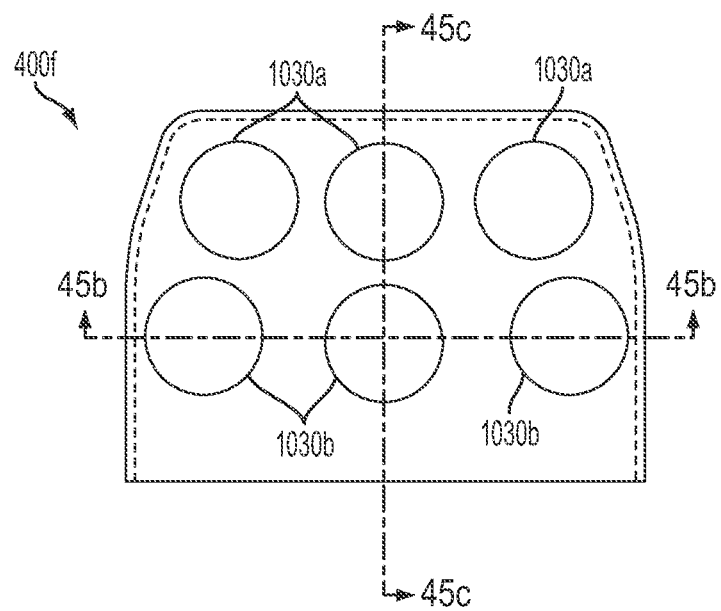
FIG. 45a shows another embodiment of a device according to an embodiment.
Figure 45B:
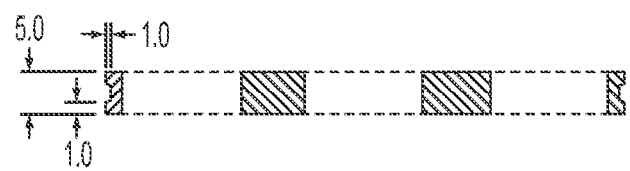
FIG. 45b shows a cross section of the device in FIG. 45a at line 45b-45b.
Figure 45C:
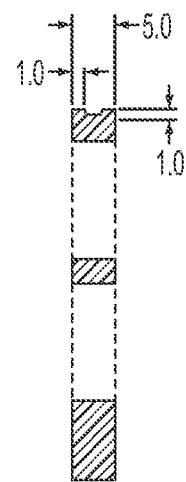
FIG. 45c shows a cross section of the device in FIG. 45a at line 45c-45c.

FIG. 45a shows another embodiment of a device 400f FIG. 45a shows two rows of three springs 1030a and 1030b. The cross section at line 45b-45b of FIG. 45a is shown in FIG. 45b. The cross section at line 45c-45c of FIG. 45a is shown in FIG. 45c. The thickness of the device 400f is shown as being about 5.0 mm in both FIGS. 45b and 45c.

Figure 46:
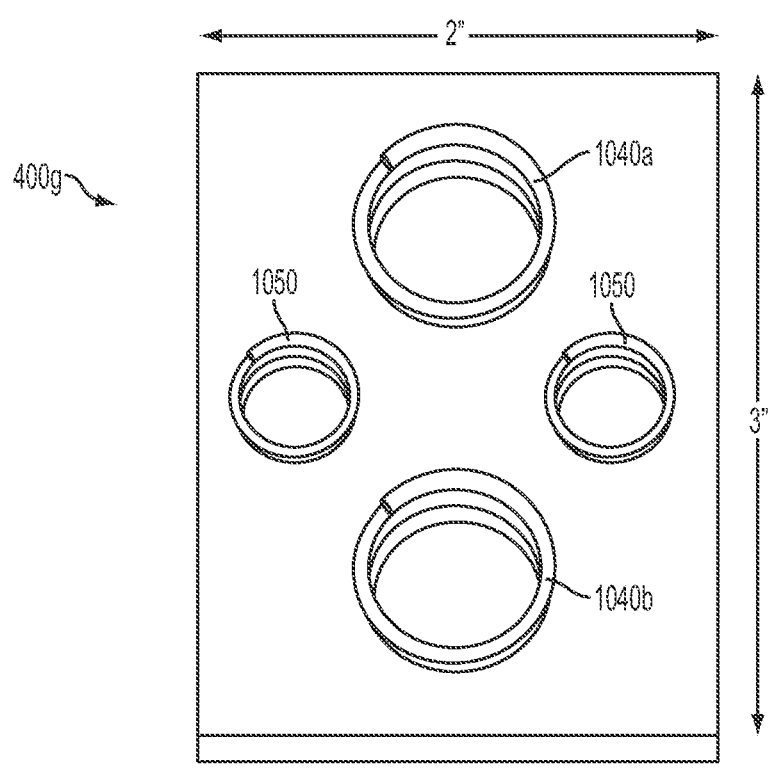
FIG. 46 shows another embodiment of a spring arrangement for a device in accordance with an embodiment.
Figure 47:
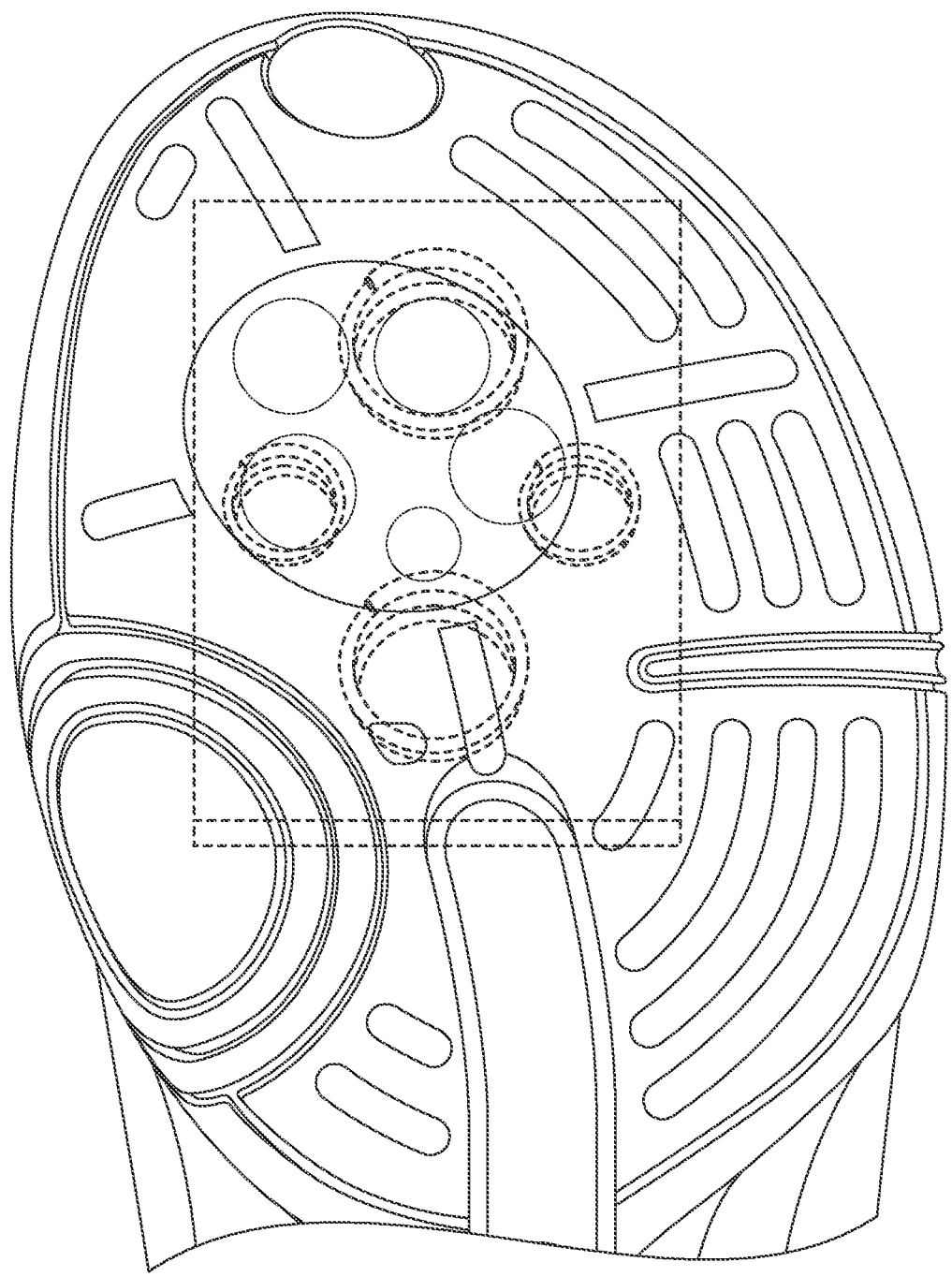
FIG. 47 shows the device of FIG. 46 placed in a forefoot portion of a shoe.

FIG. 46 shows an arrangement of springs for a device 400g in accordance with another embodiment. In the device 400g, large springs 1040a and 1040b are located at the longitudinal ends of the device 400g and smaller springs 1050 are located at the center of the device 400g between the large springs 1040a and 1040b. The device 400g may be, for example, about 2 inches in width by about 3 inches in length. FIG. 47 shows an example placement in a shoe of the device 400g shown in FIG. 46.

Figure 48A:
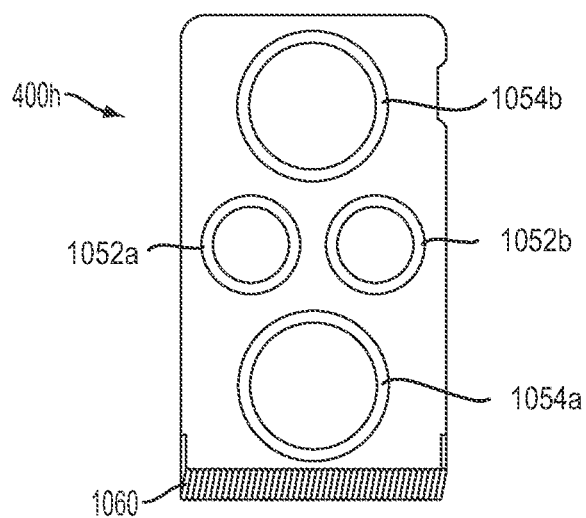
FIG. 48a shows another embodiment of a spring arrangement for a device that also includes a coil spring hinge in accordance with an embodiment.
Figure 48B:
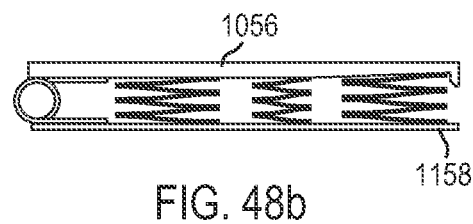
FIG. 48b shows a side view of a device in accordance with an embodiment.

FIGS. 48a and 48b show embodiments of a device 400h. In these embodiments, the springs 1054a, 1054b, 1052a, and 1052b are wave springs that are arranged to be in a similar arrangement as the springs in device 400g of FIG. 46. FIGS. 48a and 48b shows that the top and bottom plates 1056 and 1158 of the device 400h can be connected at one end with a torsion spring 1060 to bias the plates apart.

Figure 49A:
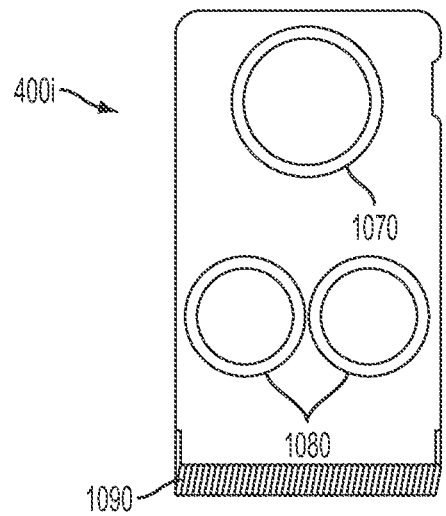
FIG. 49a shows another embodiment of a spring arrangement for a device that also includes a coil spring hinge in accordance with an embodiment.
Figure 49B:
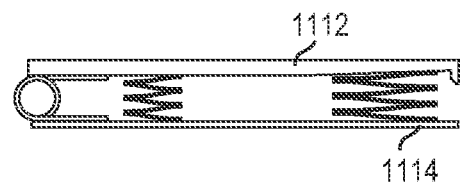
FIG. 49b shows a side view of a device in accordance with an embodiment.

FIGS. 49a and 49b show embodiments of a device 400i. In these embodiments, a large spring 1070 may be located away from a hinge 1090, and two smaller springs 1080 may be located closer to the hinge 1090. The springs 1070 and 1080 may be wave springs. The hinge 1090 may be formed by a torsion spring that applies torque on the top and bottom plates 1112 and 1114.

Figure 50A:
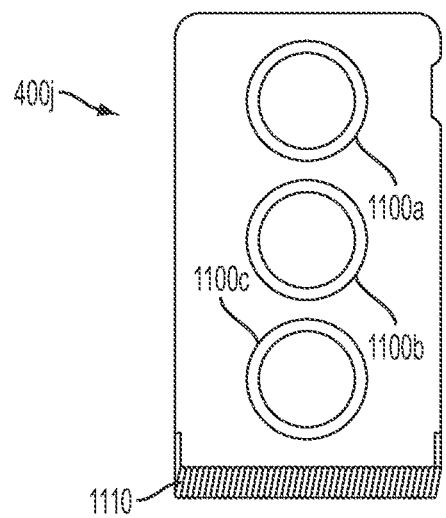
FIG. 50a shows another embodiment of a spring arrangement for a device that also includes a coil spring hinge in accordance with an embodiment.
Figure 50B:
FIG. 50b shows a side view of a device in accordance with an embodiment.

FIGS. 50a and 50b show another example spring arrangement for a device 400j. FIG. 50a shows springs 1100a, 1100b, and 1100c for the device 400j that may be arranged in a row lengthwise. In these embodiments, the springs would be attached to the top and bottom plates. FIG. 50a also shows a torsion spring 1110 attached at a hinge location of the device 400j.

Figure 51A:
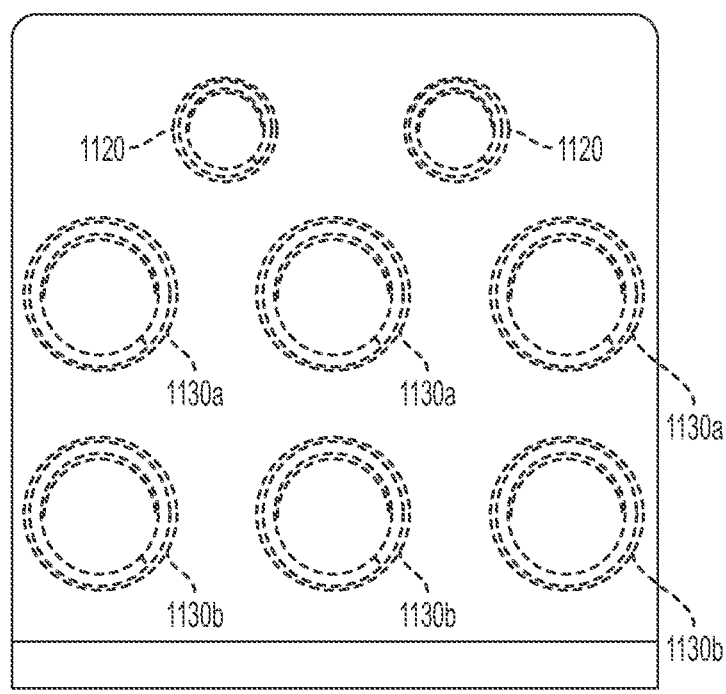
FIG. 51a shows another embodiment of a device with yet another spring arrangement in accordance with an embodiment.
Figure 51B:
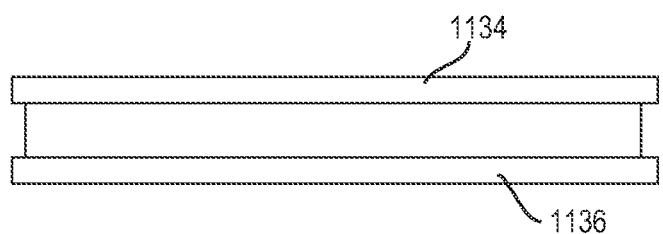
FIG. 51b shows a front view of a device in accordance with an embodiment.

FIGS. 51a and 51b show another embodiment of a device 400k. In this embodiment, springs 1120, 1130a, and 1130b are arranged in three rows. The row furthest from a hinge has two small diameter springs 1120. The two rows closest to the hinge have larger diameter springs 1130a and 1130b. The springs 1120, 1130a, and 1130b exert force against top and bottom plates 1134 and 1136.

Figure 52:
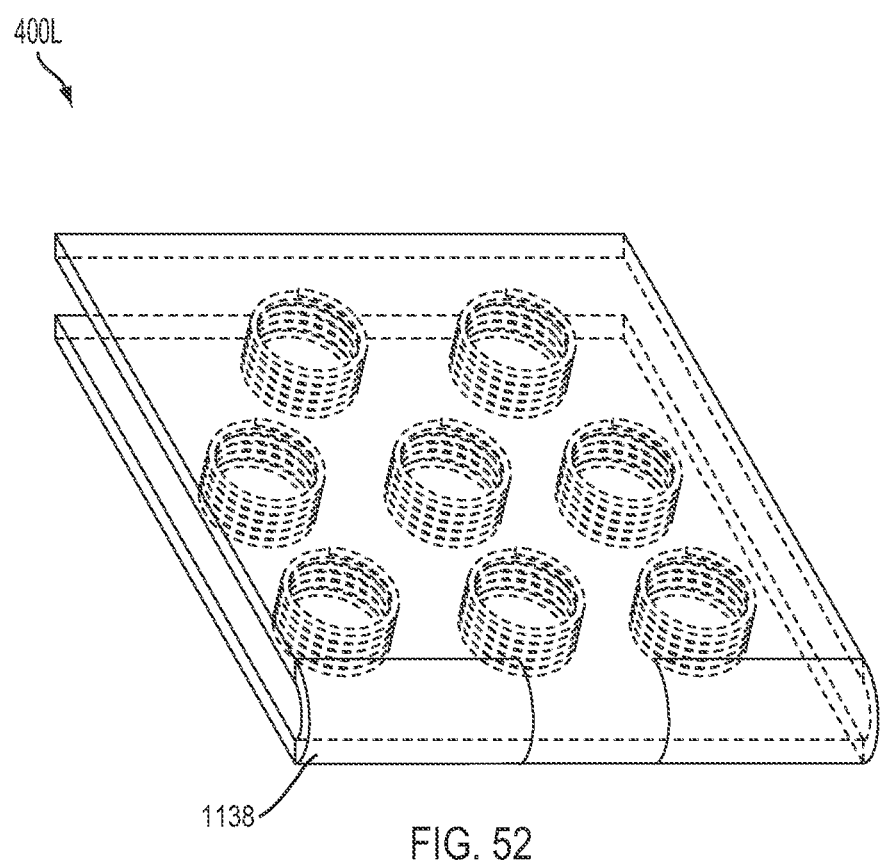
FIG. 52 shows another embodiment of a device with eight springs arranged in three rows in accordance with an embodiment.

FIG. 52 shows a device 400L with 8 springs arranged in three rows, with three springs in a back row closest to a hinge 1138, three in a middle row, and two in a front row farthest from the hinge 1138. In various embodiments, the springs are compression springs, or the like.

FIG. 53a shows another embodiment of a device 400m, and FIG. 53b shows an example position of the device 400m in a forefoot portion 1160 of a shoe 100m. With reference to FIGS. 53a and 53b, the device 400m extends an entire length of the forefoot portion 1160 of the shoe 100m all way to a front edge of the shoe 100m. Springs 1140 are arranged to be in a circular pattern around an outer perimeter of a top surface of a bottom plate 1162. Springs 1150 may be arranged to be in two rows in a middle of an area defined by the springs 1140. FIG. 53b also shows the device 400m starting from a flex point of the shoe 100m and extending all the way to the front of the shoe 100m.

Figure 54:
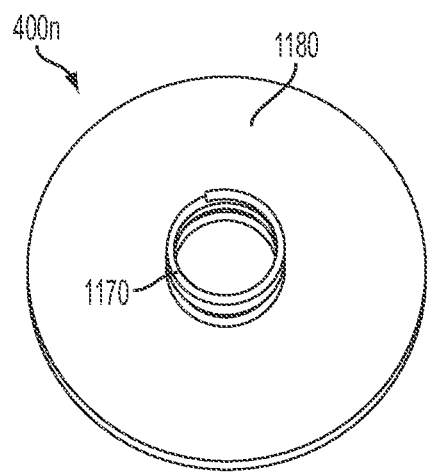
FIG. 54 shows another embodiment of a portion of a device that uses one or more circular plates.

FIG. 54 shows another embodiment of a device 400n that uses one or more circular plates. In this embodiment, one large spring 1170 is arranged on a bottom plate 1180. In some embodiments the device 400n further includes a circular shaped top plate (not shown in FIG. 54). In various other embodiments, the plates can have other shapes, such as, oval, square, or the like.

Figure 55A:
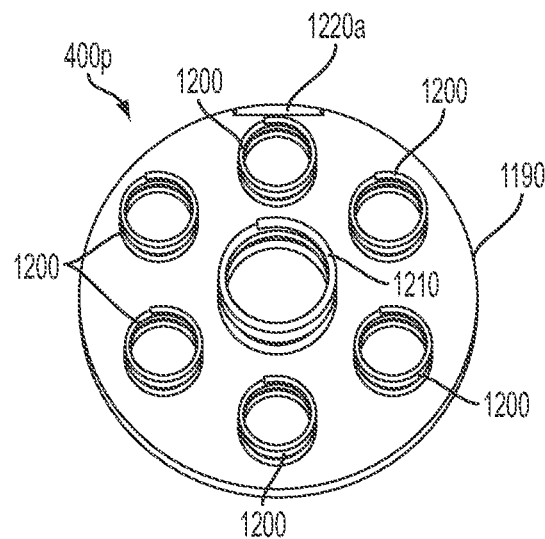
FIG. 55a shows another embodiment of a portion of a device that uses one or more circular plates with a hinge for connecting two plates.
Figure 55B:
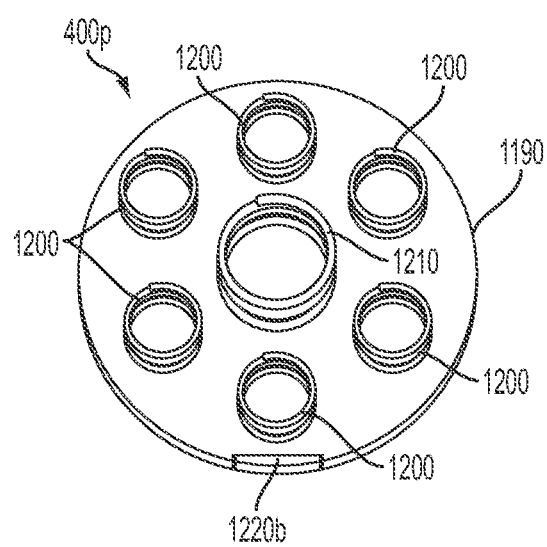
FIG. 55b shows another embodiment of a portion of a device that uses one or more circular plates with a hinge for connecting two plates.

FIG. 55a shows another embodiment of a device 400p that uses one or more circular plates. In this embodiment, a large spring 1210 may be located on the center of a plate 1190. Also, smaller springs 1200 may be located in a circular pattern surrounding the large spring 1210. A hinge 1220a is shown in FIG. 55a, located at a portion of an outer perimeter of the plate 1190 for connection to another plate (not shown in FIG. 55a) that would be on top of the springs 1210 and 1200. In yet another embodiment, the plate 1190 may be removed, and the springs 1210 and 1200 may be placed in a cavity of a midsole of a shoe and held in place by an insole. In another embodiment, a continuous material could be used to form both the top and the bottom plates. The continuous material may have a bend at a center to form a fold between the top and bottom plates. In other embodiments, plates may not be necessary and, for example, an insole and a cavity of a midsole could be lined with hard materials that prevent springs from popping out of place. FIG. 55b shows another embodiment of the device 400p in which the hinge 1220b is located on another portion of the outer diameter of the plate 1190.

Figure 56:
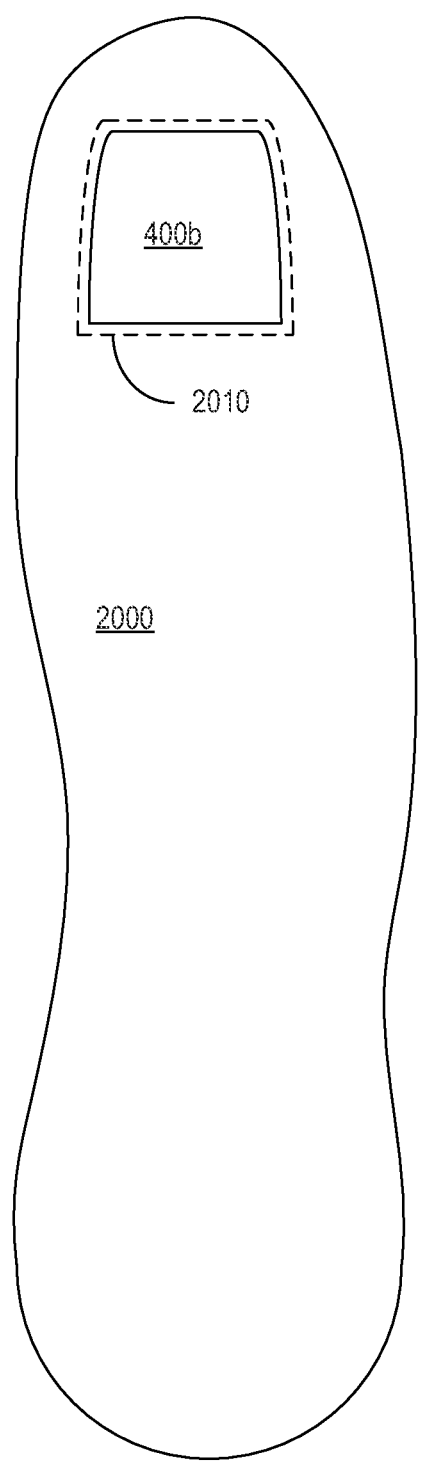
FIG. 56 shows a location for a device that may be placed in a cavity in a forefoot portion of a shoe in accordance with an embodiment.
Figure 57:
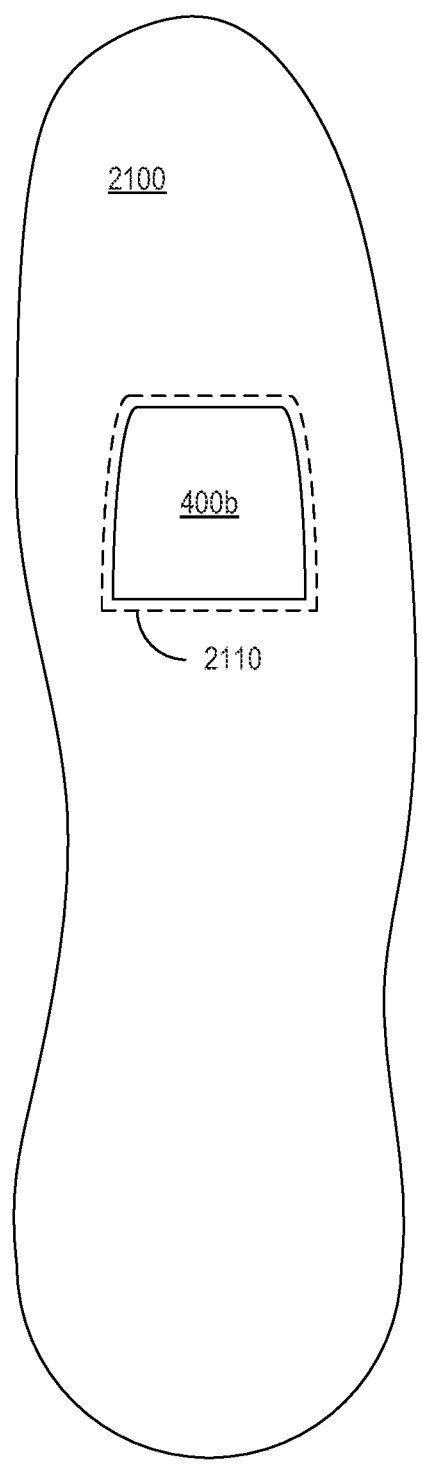
FIG. 57 shows another location for a device that may be placed in a cavity located in a ball portion of a shoe in accordance with an embodiment.
Figure 58:
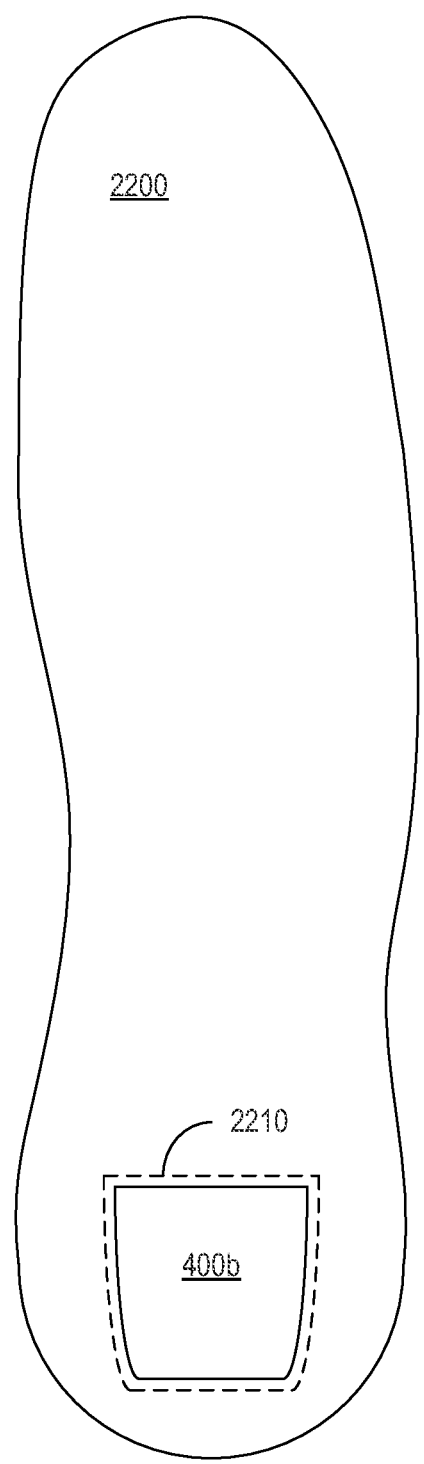
FIG. 58 shows an example placement of a device in a cavity in a heel portion of a shoe in accordance with an embodiment.
Figure 59:
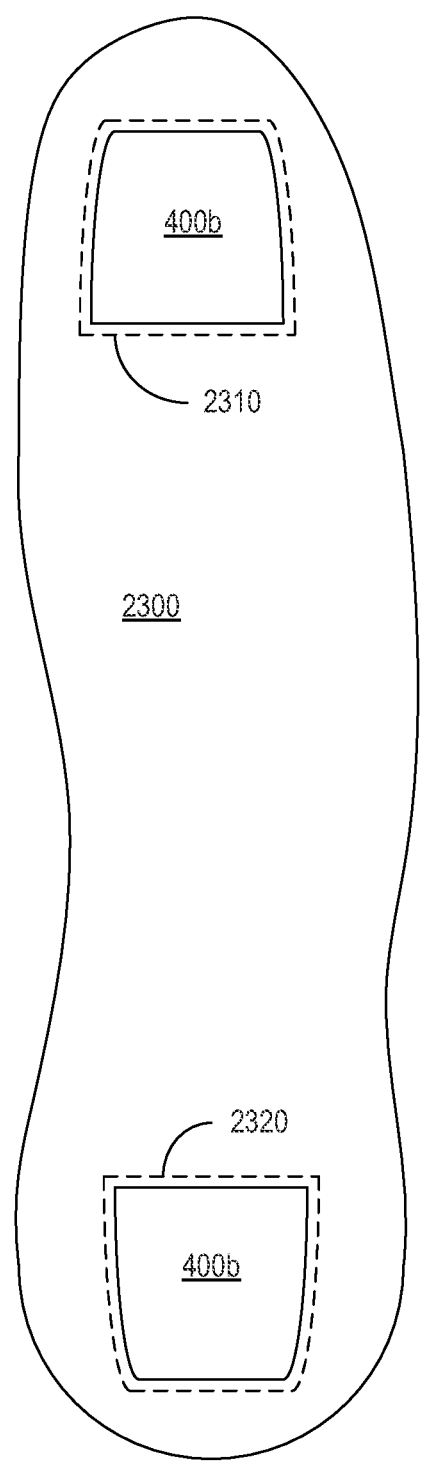
FIG. 59 shows an example embodiment of a shoe that uses multiple devices.
Figure 60A:
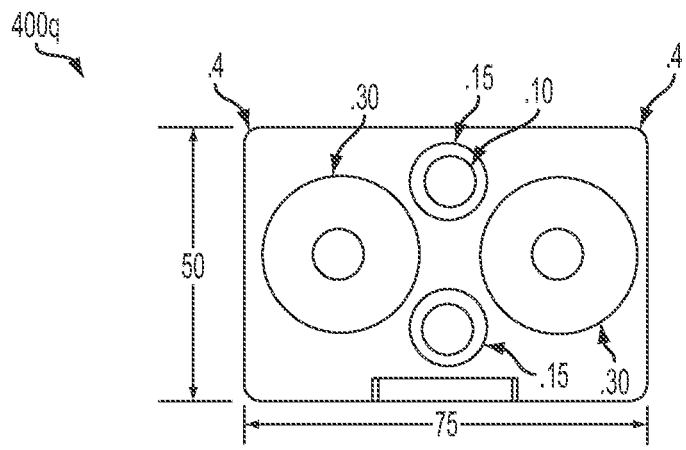
FIG. 60a shows an example of an embodiment of a device that may include metal top and bottom plates.
Figure 60B:
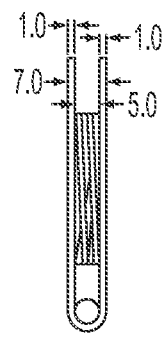
Figure 60C:
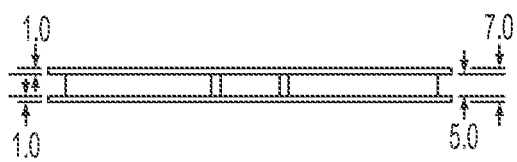
Figure 60D:
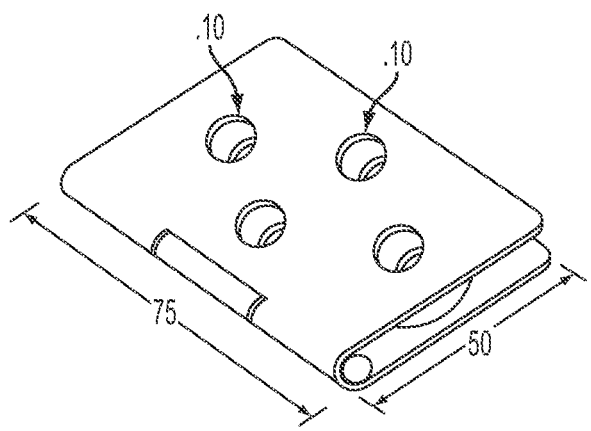

FIG. 56 shows a location for the device 400b in a cavity 2010 in a forefoot portion of a shoe 2000. FIG. 57 shows a different location for the device 400b in a cavity 2110 located in a ball portion of a shoe 2100. FIG. 58 shows an example placement of the device 400b in a cavity 2210 in a heel portion of a shoe 2200. In this embodiment, a hinge of the device 400b would be located closer to the inside of the shoe 2200. FIG. 59 shows an example embodiment of a shoe 2300 that uses multiple devices 400b. In this embodiment, embodiments of the device 400b may be located both at a forefoot portion of the shoe 2300 in a cavity 2310 and at a heel portion of the shoe 2300 in a cavity 2320. Various other arrangements of the device 400b are possible, such as placing the device 400b in an arch portion of a shoe.

Figure 61:
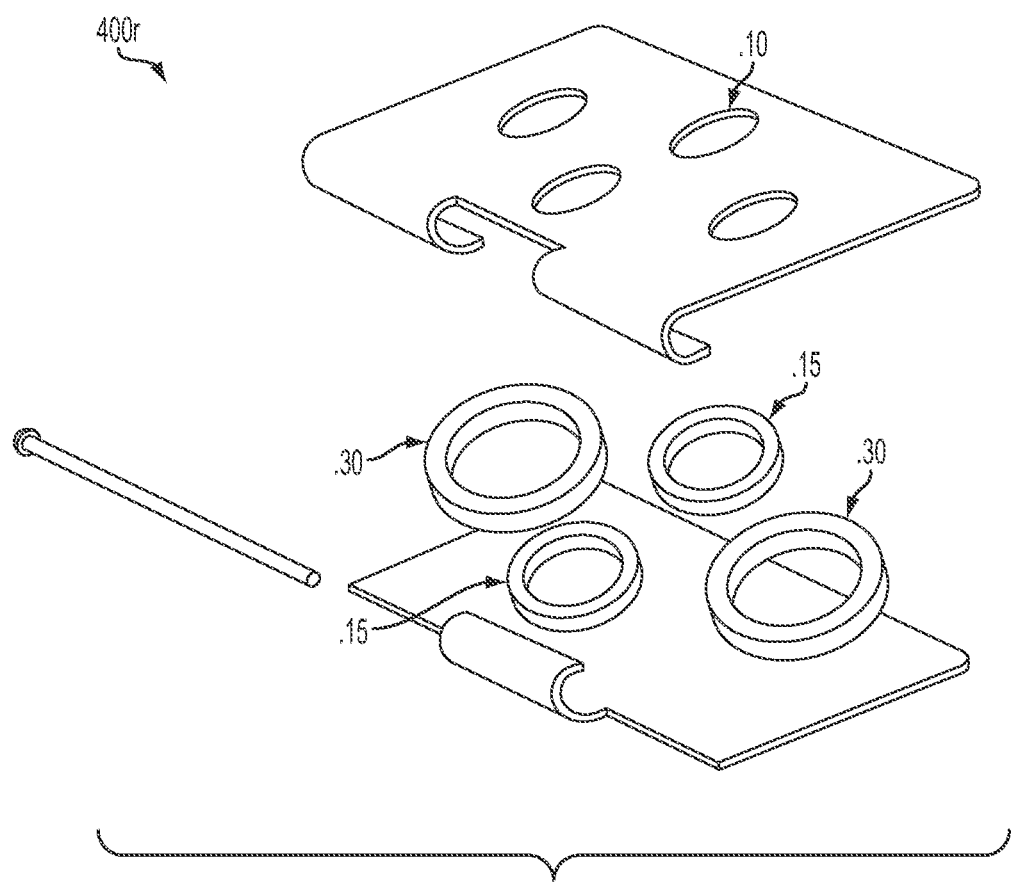
FIG. 61 shows an example of an embodiment of a device with both large and smaller springs located between top and bottom plates.

FIGS. 60a, 60b, 60c, and 60d show different views of an example of an embodiment of a device 400q with metal top and bottom plates. FIG. 61 shows an exploded view of an example of an embodiment of a device 400r with both large and smaller springs located between two plates.

Figure 62:
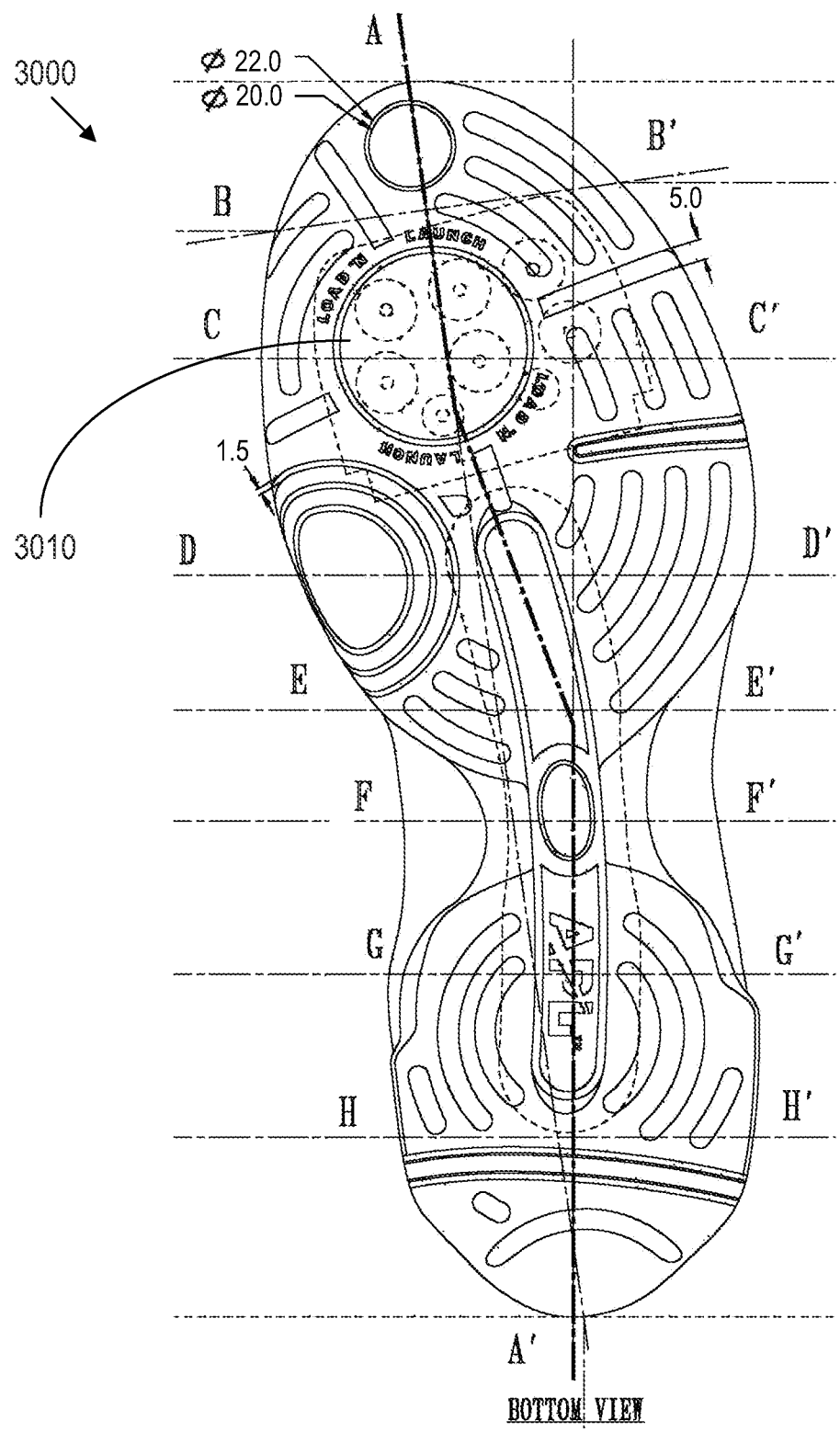
FIG. 62 shows a schematic diagram of a bottom view of an embodiment of a shoe, and a location of a device with respect to the bottom of the shoe.
Figure 63:
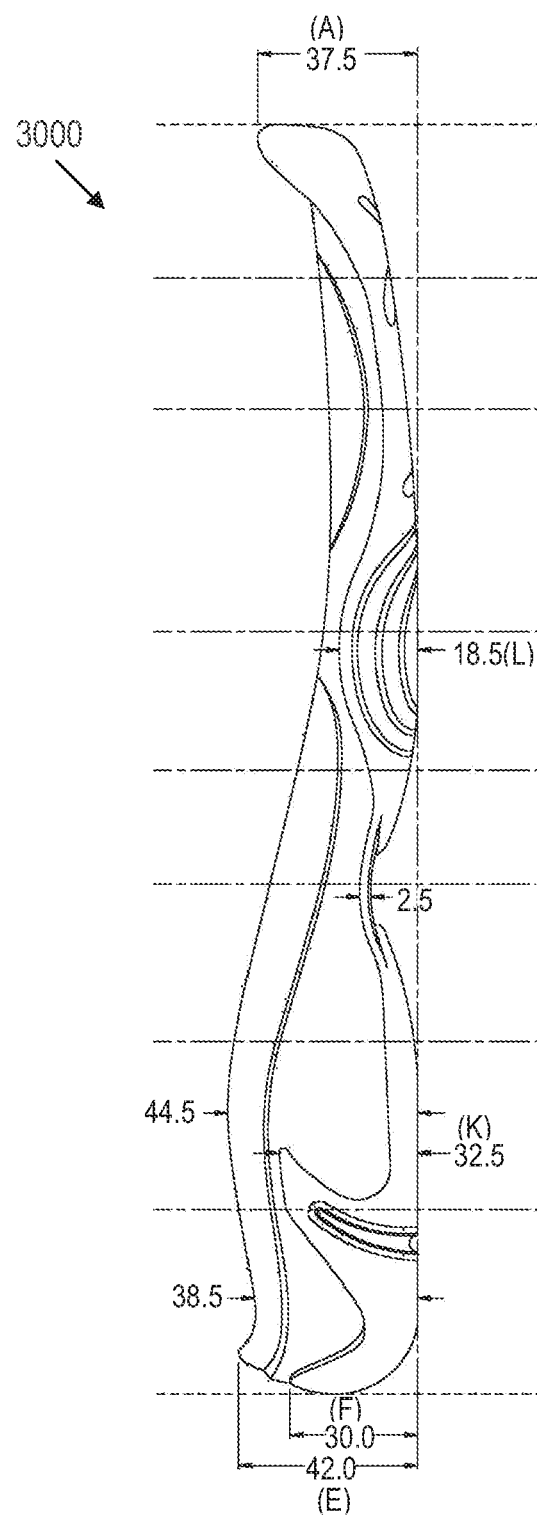
FIG. 63 shows a medial view of the shoe of FIG. 62.
Figure 64:
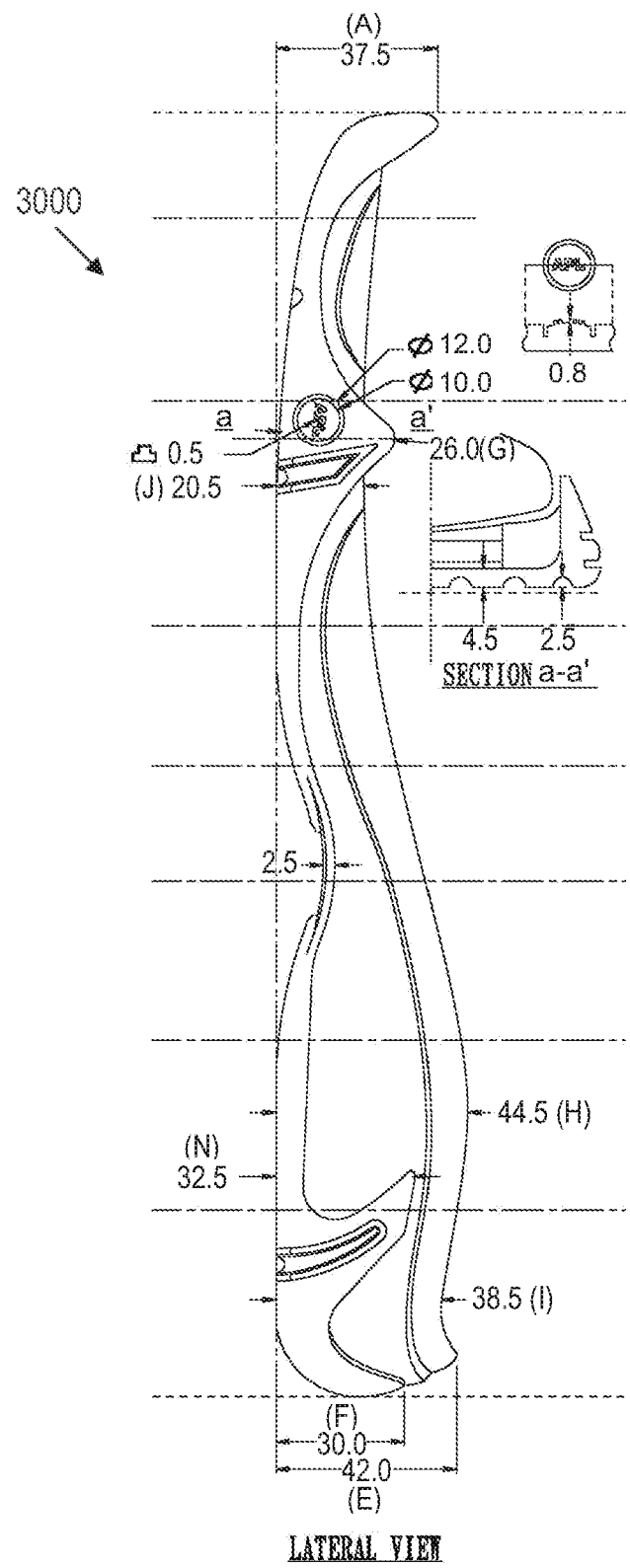
FIG. 64 shows a lateral view of the shoe of FIG. 62.
Figure 65:
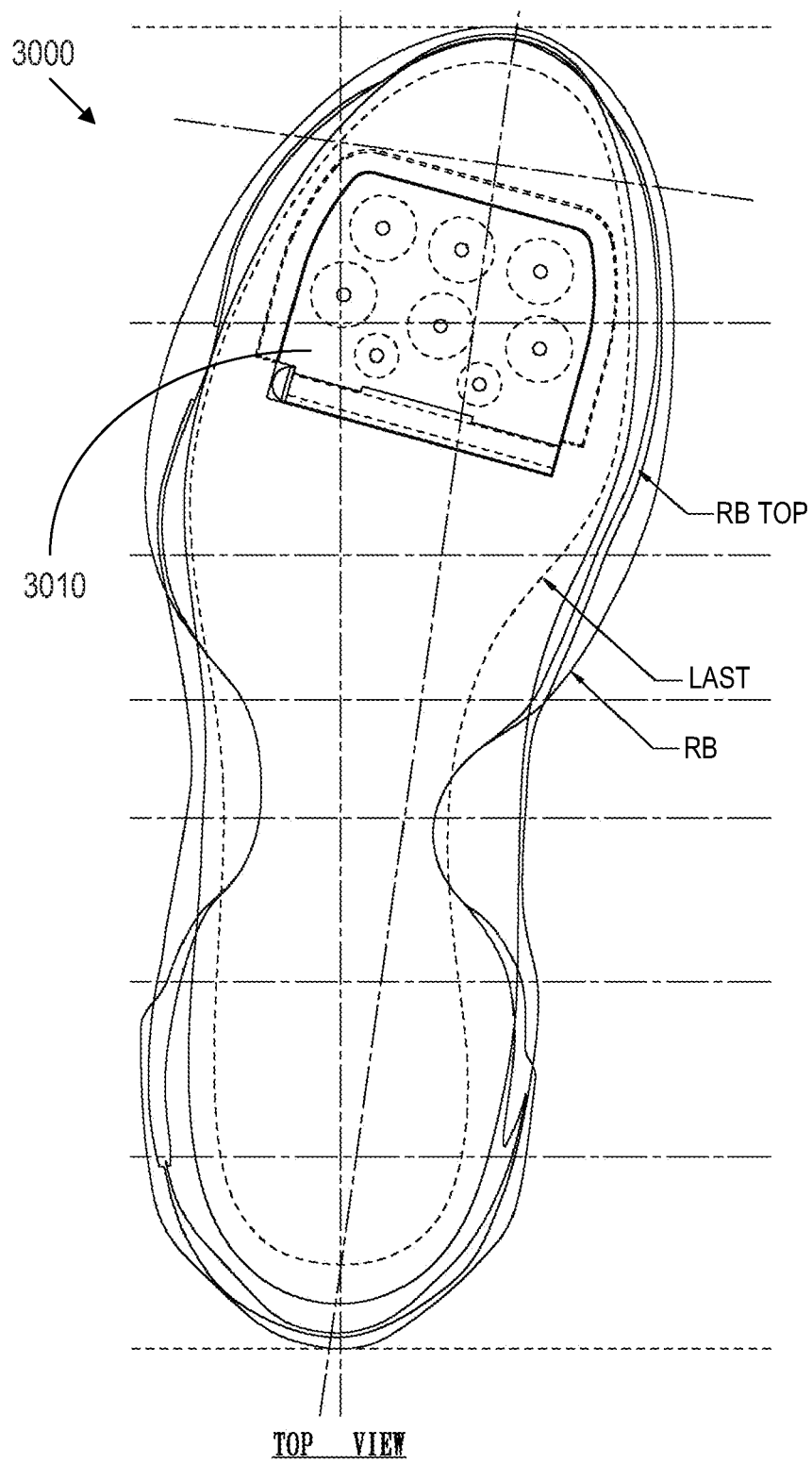
FIG. 65 shows a top view of the shoe of FIG. 62, and a location of the device in the shoe.
Figure 66:
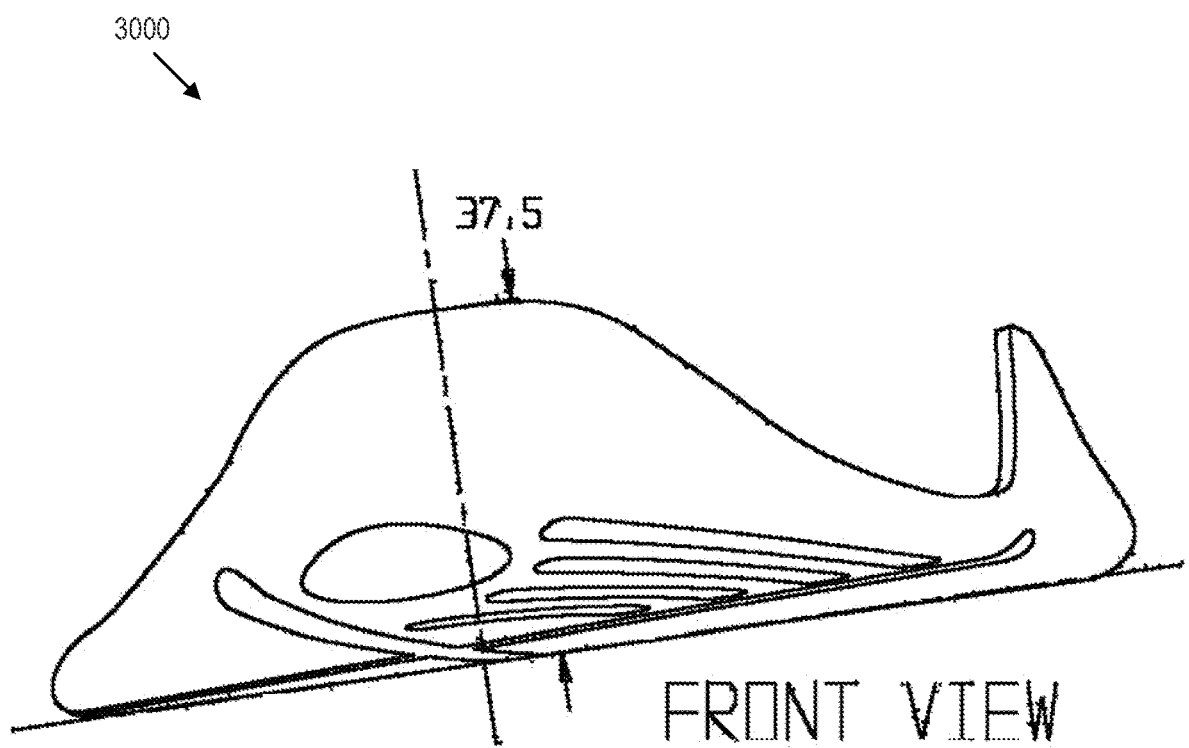
FIG. 66 shows a front view of the shoe of FIG. 62.
Figure 67:
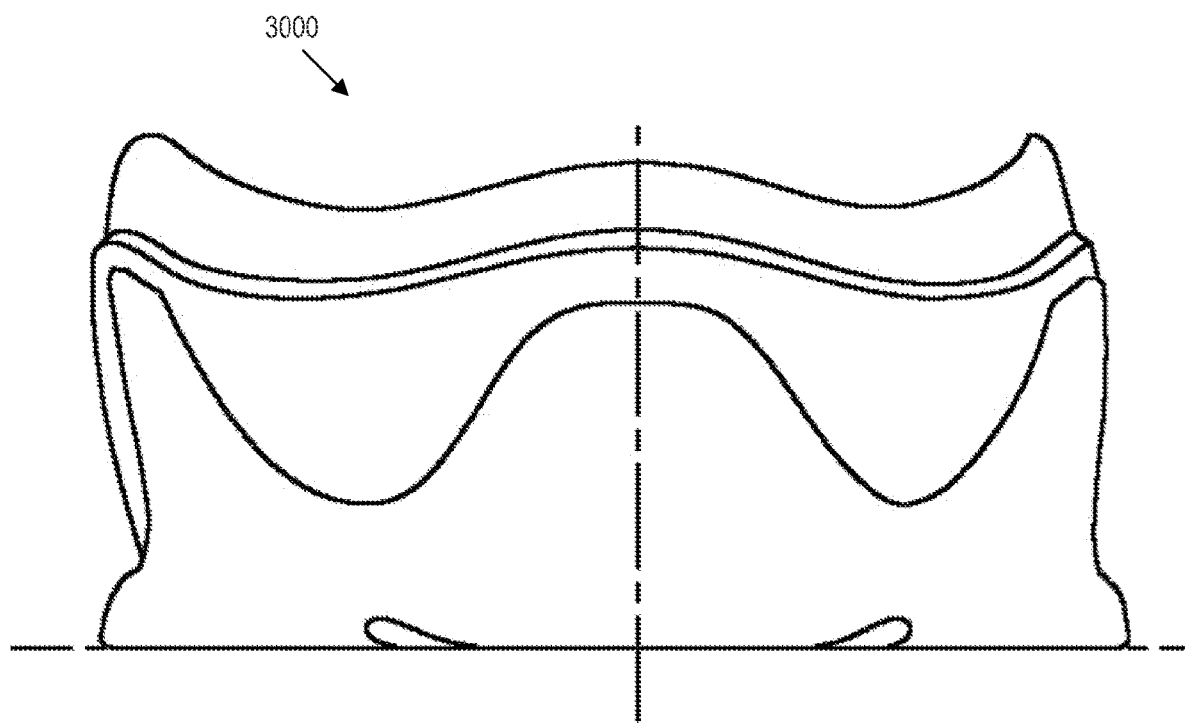
FIG. 67 shows a heel view of the shoe of FIG. 62.
Figure 68:
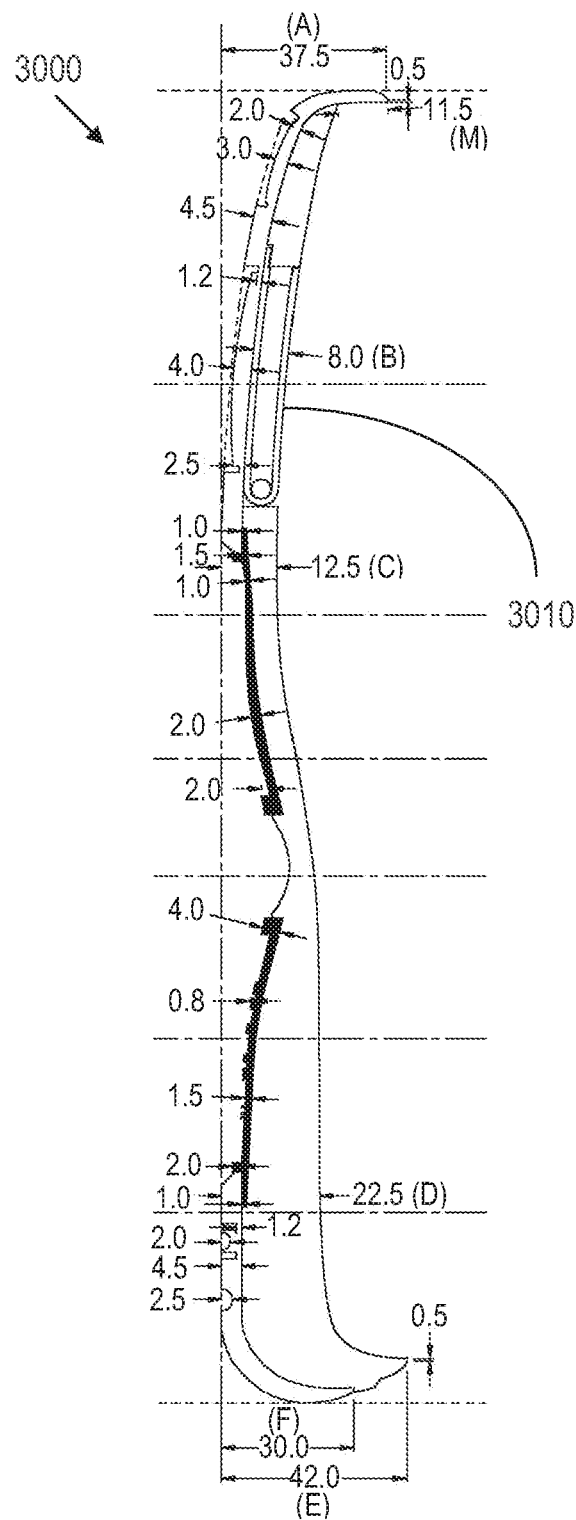
FIG. 68 shows a cross sectional view of the shoe of FIG. 62 along the line A-A' from FIG. 62.
Figure 69:
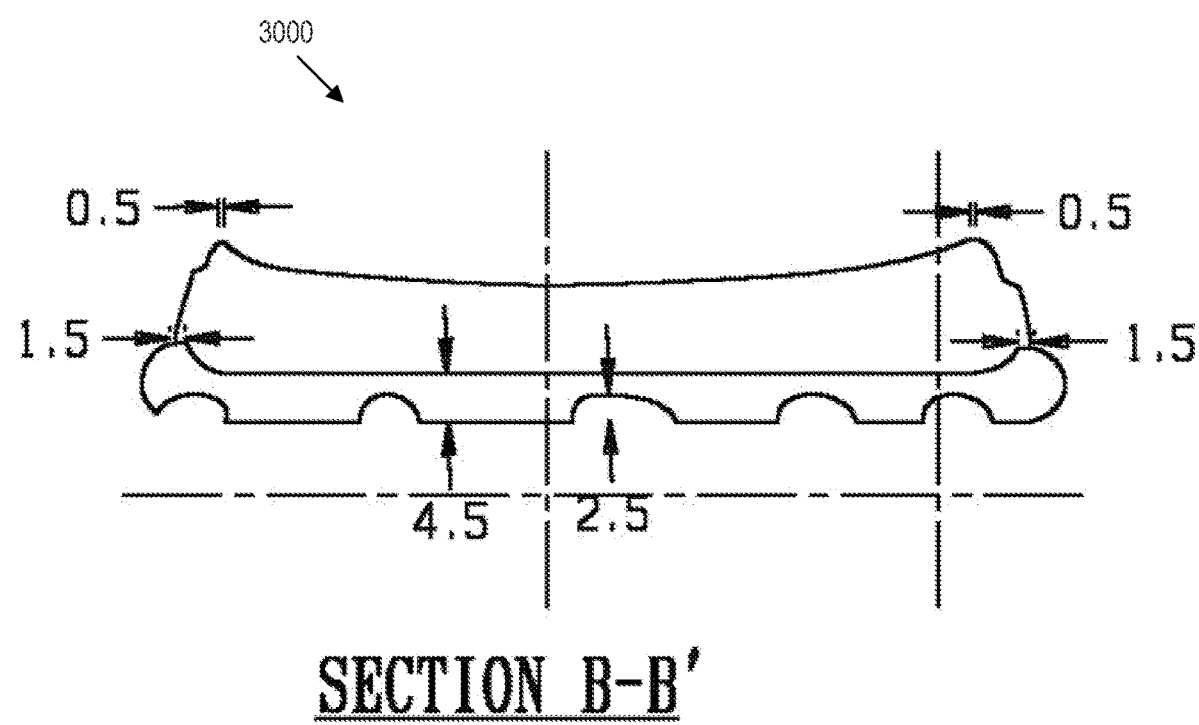
FIG. 69 shows a cross sectional view of the shoe of FIG. 62 along the line B-B' from FIG. 62.
Figure 70:
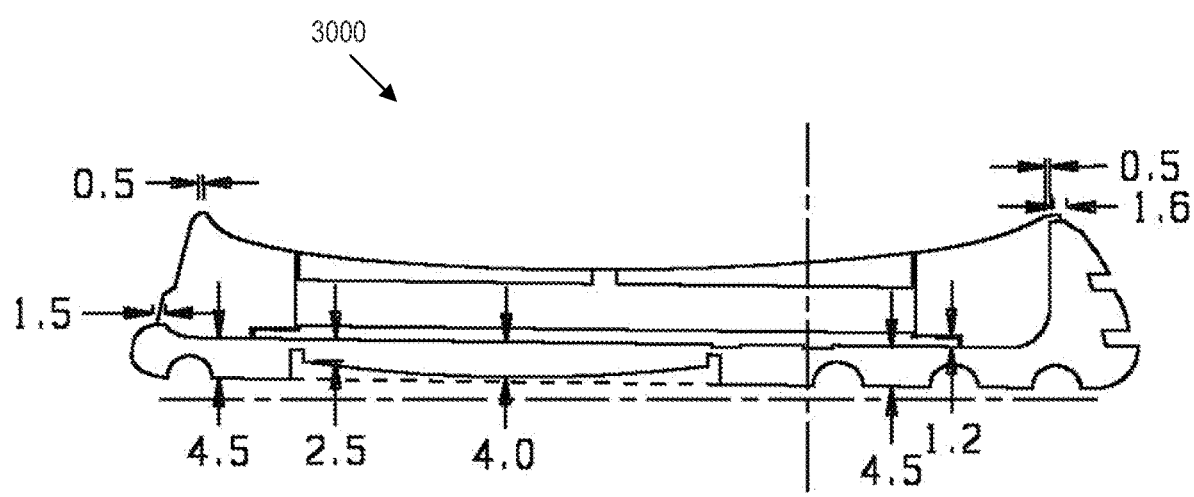
FIG. 70 shows a cross sectional view of the shoe of FIG. 62 along the line C-C' from FIG. 62.
Figure 71:
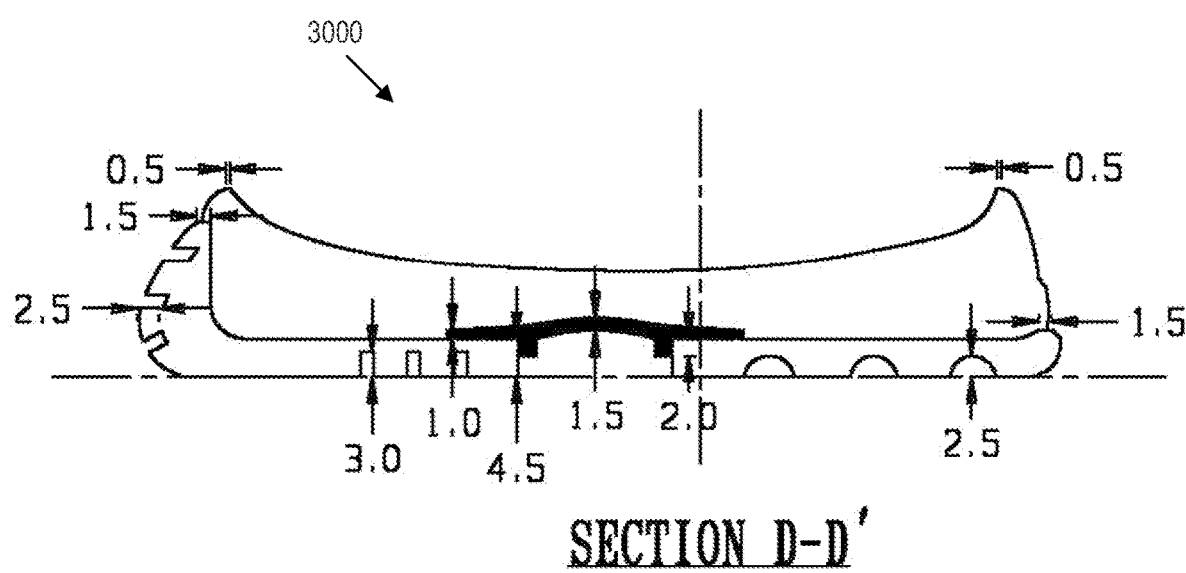
FIG. 71 shows a cross sectional view of the shoe of FIG. 62 along the line D-D' from FIG. 62.
Figure 72:
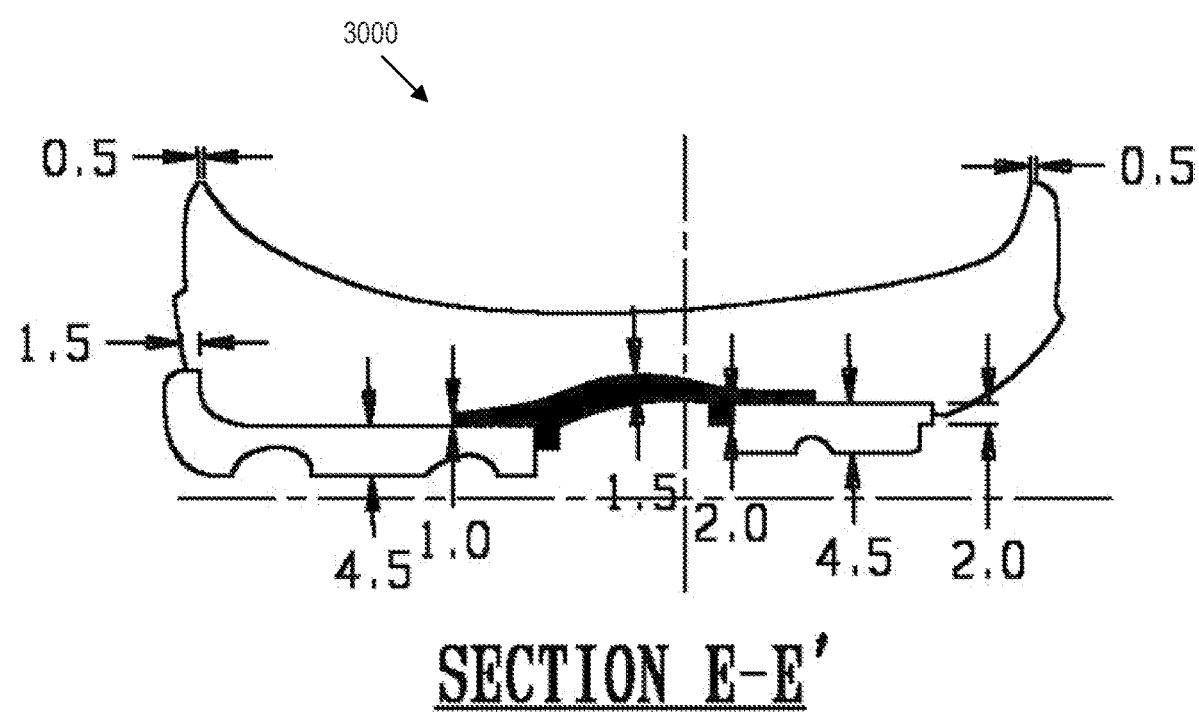
FIG. 72 shows a cross sectional view of the shoe of FIG. 62 along the line E-E' from FIG. 62.
Figure 73:
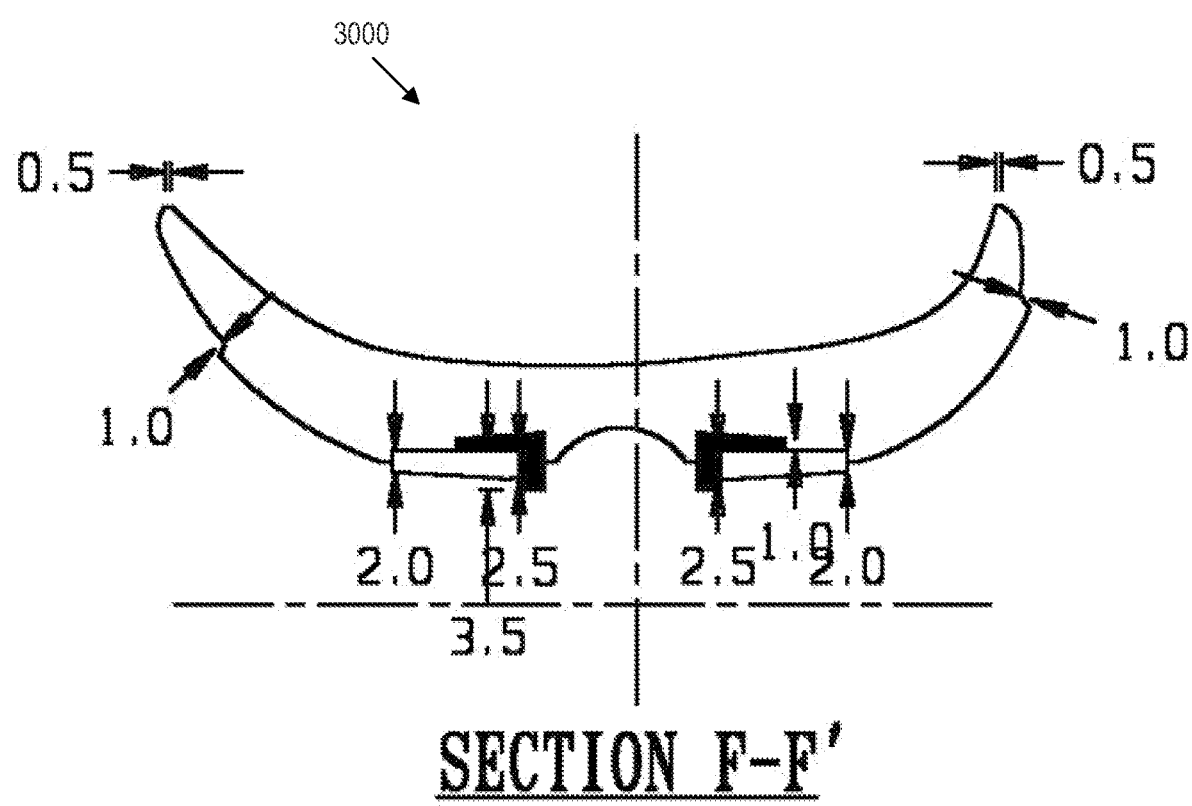
FIG. 73 shows a cross sectional view of the shoe of FIG. 62 along the line F-F' from FIG. 62.
Figure 74:
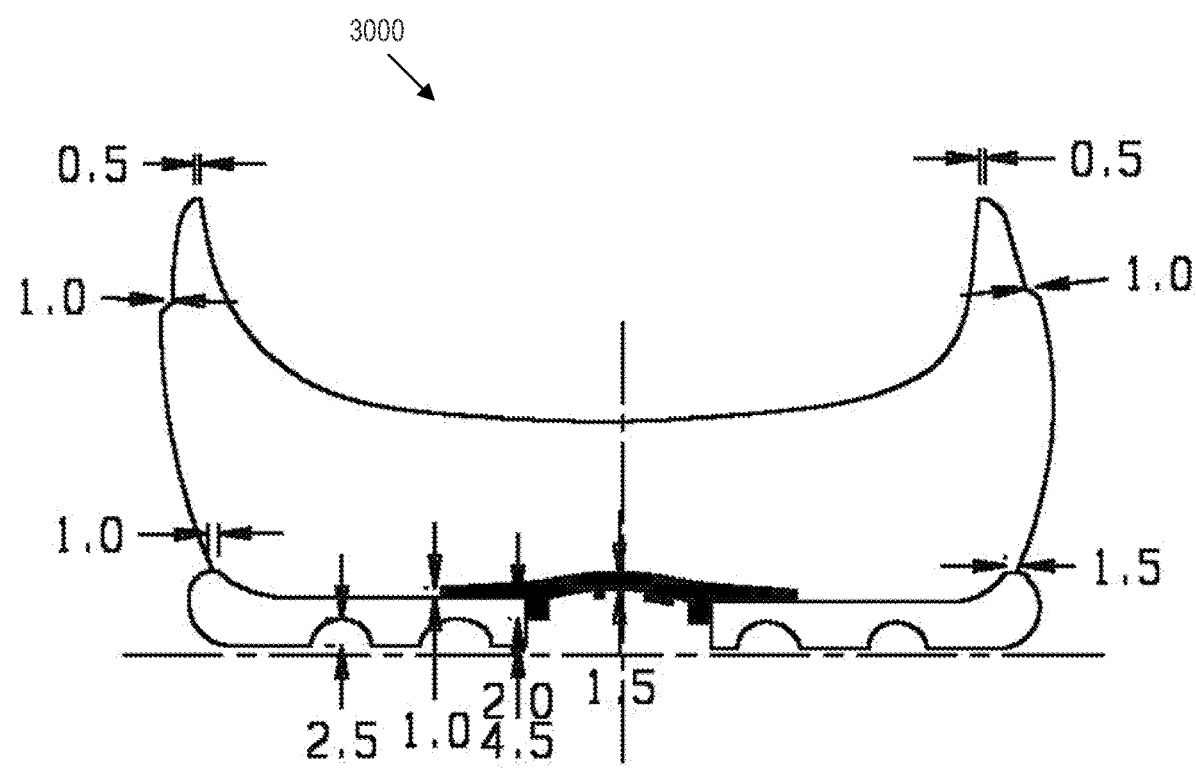
FIG. 74 shows a cross sectional view of the shoe of FIG. 62 along the line G-G' from FIG. 62.
Figure 75:
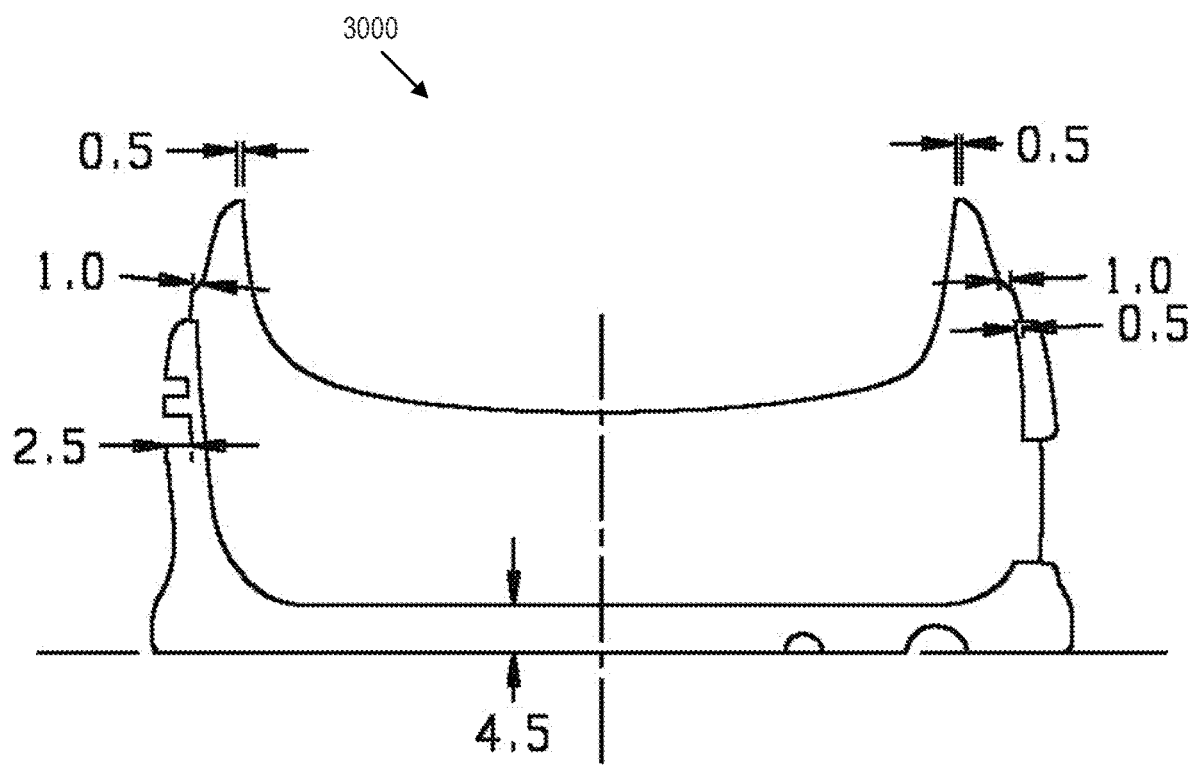
FIG. 75 shows a cross sectional view of the shoe of FIG. 62 along the line H-H' from FIG. 62.

FIG. 62 shows a bottom view of an embodiment of a shoe 3000, and a location of a device 3010 with respect to the bottom of the shoe 3000. FIG. 63 shows a medial view of the shoe 3000. FIG. 64 shows a lateral view of the shoe 3000. FIG. 65 shows a top view of the shoe 3000, and a location of the device 3010 with respect to the top of the shoe 3000. FIG. 66 shows a front view of the shoe 3000. FIG. 67 shows a heel view of the shoe 3000. FIG. 68 shows a cross sectional view of the shoe 3000 along the line A-A' from FIG. 62 with the device 3010 located in a midsole of the shoe 3000. FIG. 69 shows a cross sectional view of the shoe 3000 along the line B-B' from FIG. 62. FIG. 70 shows a cross sectional view of the shoe 3000 along the line C-C' from FIG. 62. FIG. 71 shows a cross sectional view of the shoe 3000 along the line D-D' from FIG. 62. FIG. 72 shows a cross sectional view of the shoe 3000 along the line E-E' from FIG. 62. FIG. 73 shows a cross sectional view of the shoe 3000 along the line F-F' from FIG. 62. FIG. 74 shows a cross sectional view of the shoe 3000 along the line G-G' from FIG. 62. FIG. 75 shows a cross sectional view of the shoe 3000 along the line H-H' from FIG. 62.

Figure 76:
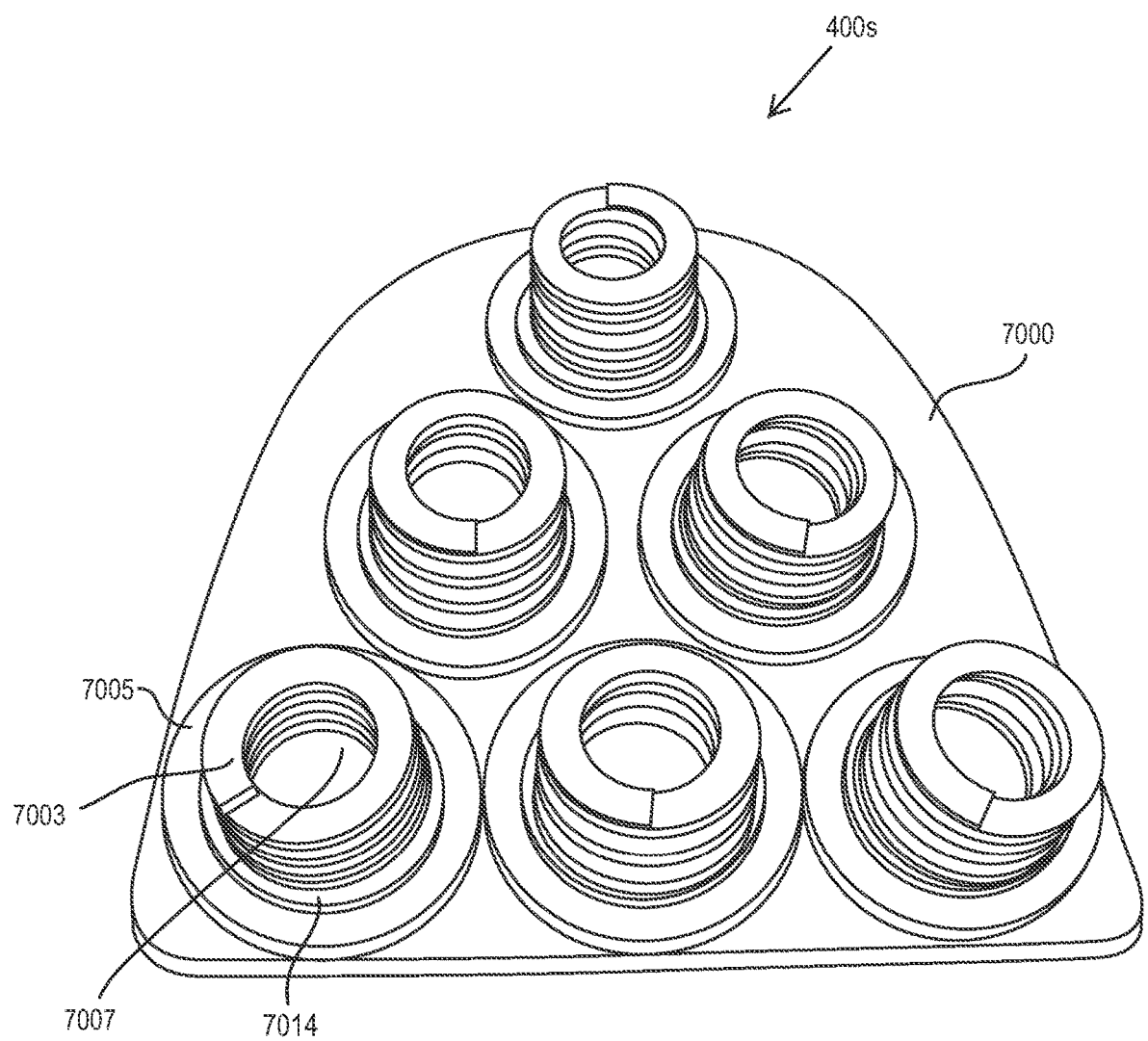
FIG. 76 shows a device that may be used in a shoe in accordance with an embodiment.

FIG. 76 shows a device 400s that may be used in any of the shoes described above. The device 400s includes a bottom plate 7000 and a plurality of springs 7003. A plurality of pads 7005 may be positioned on the bottom plate 7000. In various embodiments, the pads 7005 may be made of a same material as the bottom plate 7000. For example, a material used to form the pads 7005 and the bottom plate 7000 may be injected nylon, or the like. In other embodiments, other suitable materials, such as but not limited to, plastic, rubber, resin, or the like may form the bottom plate 7000 and/or the pads 7005. In various embodiments, the pads 7005 and the plate 7000 may be molded or injected to be formed as a single unit. In other embodiments, the pads 7005 and the bottom plate 7000 may be made of different materials and attached or bonded to each other by an adhesive, or the like. The adhesive may be, for example, a type of adhesive that is capable of withstanding large pressures and stresses from forces that may be exerted by a user.

The springs 7003 shown in FIG. 76 are coil springs. In various embodiments, the spring 7003 may be wave springs, or the like. In yet other embodiments, a combination of wave and coil springs may be used in the device 400s. Each pad 7005 may include a cylindrical protrusion 7007 around which a corresponding spring 7003 is positioned, and the cylindrical protrusion 7007 may prevent the spring 7003 from being compressed beyond exhaustion. Such cylindrical protrusions 7007 with springs 7003 may act as energy return members. In various other embodiments, a protrusion of a different shape than cylindrical may be used.

Figure 77:
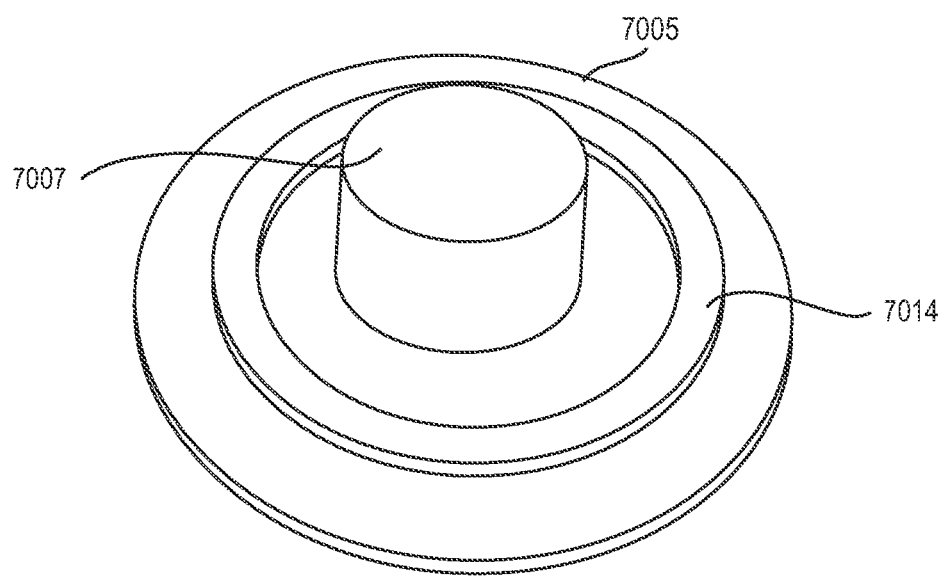
FIG. 77 shows a perspective view of a pad for use in a device in accordance with an embodiment.

FIG. 77 shows a prospective view of a pad 7005 in accordance with an embodiment. The pad 7005 includes the cylindrical protrusion 7007. In various embodiments, the cylindrical protrusion 7007 may be compressible and may return energy of compressive forces exerted upon the cylindrical protrusion 7007. With reference to FIGS. 76 and 77, the cylindrical protrusion 7007 may also retain the position of the corresponding spring 7003, thereby preventing the spring 7003 from being dislodged during compression. The pad 7005 may include a raised step 7014 that may be sized to have an inner diameter that is slightly greater than an outer diameter of the spring 7003. The difference in diameter size would allow the pad 7005 to maintain the central axis of the corresponding spring 7003 and the pad 7005 in alignment. In various embodiments, the raised step 7014 creates a channel for the corresponding spring 7003 to sit in.

Figure 78:
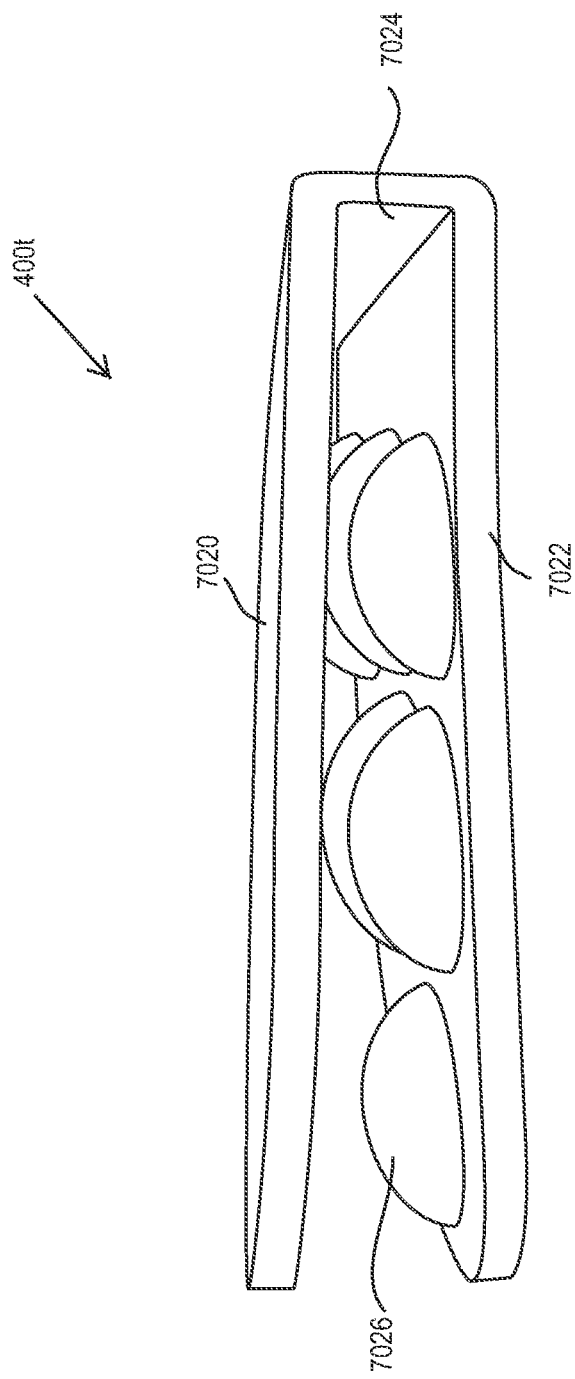
FIG. 78 shows a device that may be used in a shoe in accordance with an embodiment.
Figure 79:
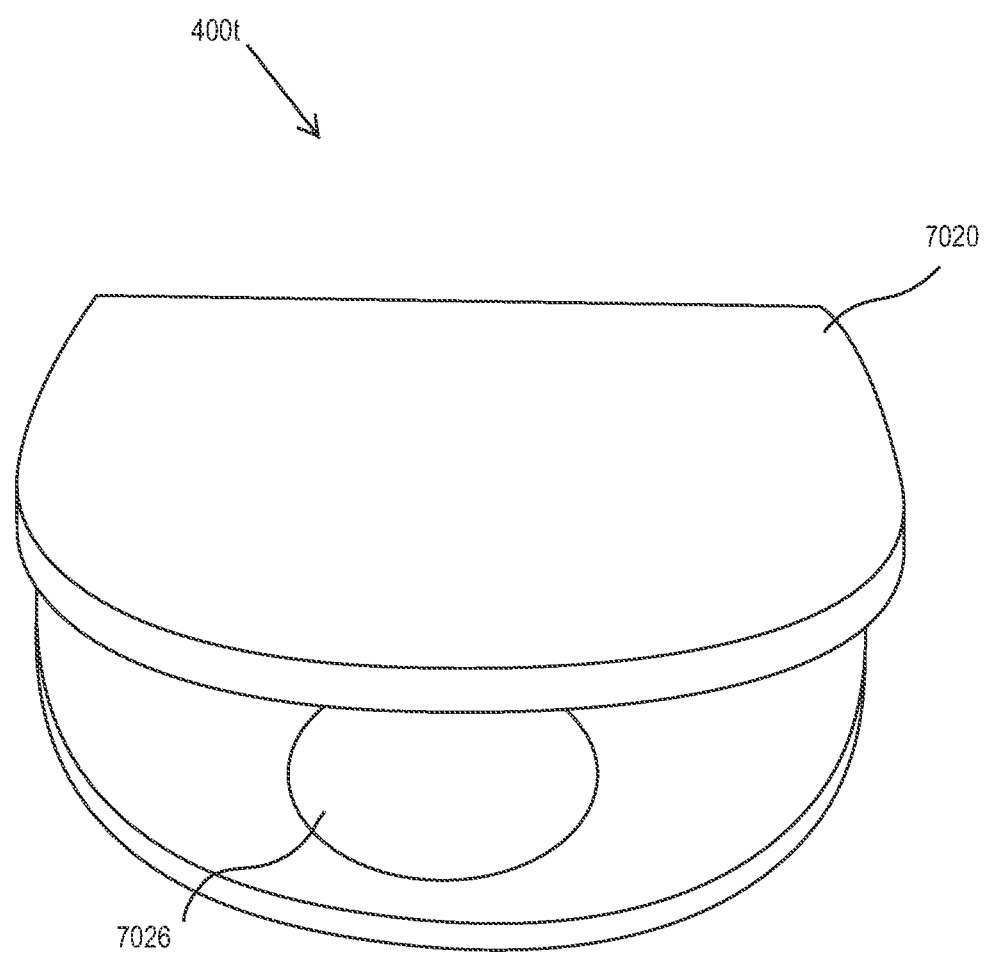
FIG. 79 shows a front view of the device of FIG. 78.

FIG. 78 shows a device 400t that may be used in a shoe in accordance with an embodiment. The device 400t may include a top plate 7020, a bottom plate 7022, a hinge portion 7024, and one or more protrusions 7026. In various embodiments, the top plate 7020, the bottom plate 7022, and the hinge portion 7024 may be formed of a same material and may be made as a single continuous member. In some embodiments, the top plate 7020, the bottom plate 7022, and the hinge portion 7024 may be parts of a single continuous member in the shape of a clamshell. In various embodiments, the one or more protrusions 7026 are attached to the bottom plate 7022. The top plate 7020, bottom plate 7022 and hinge portion 7024 may be formed out of a single sheet of material that may be molded. The top plate 7020 and the bottom plate 7022 may be connected by a hinge portion 7024 such that the top plate 7020 may be positioned to be parallel to the bottom plate 7022 when the device 400t is at rest. The one or more protrusions 7026 may be dome shaped protrusions or half-ball shaped protrusions that exert force on the top plate 7020 when the top plate 7020 is depressed. Such half-ball shaped protrusions 7026 may thus act as energy return members. In various other embodiments, the device 400t may include a plurality of protrusions that may be configured to be of different sizes and shapes. In various embodiments, the top plate 7020, the bottom plate 7022, the hinge portion 7024, and the one or more protrusions 7026 are made of rubber, or the like. FIG. 79 shows a front view of the device 400t shown in FIG. 78.

Figure 80:
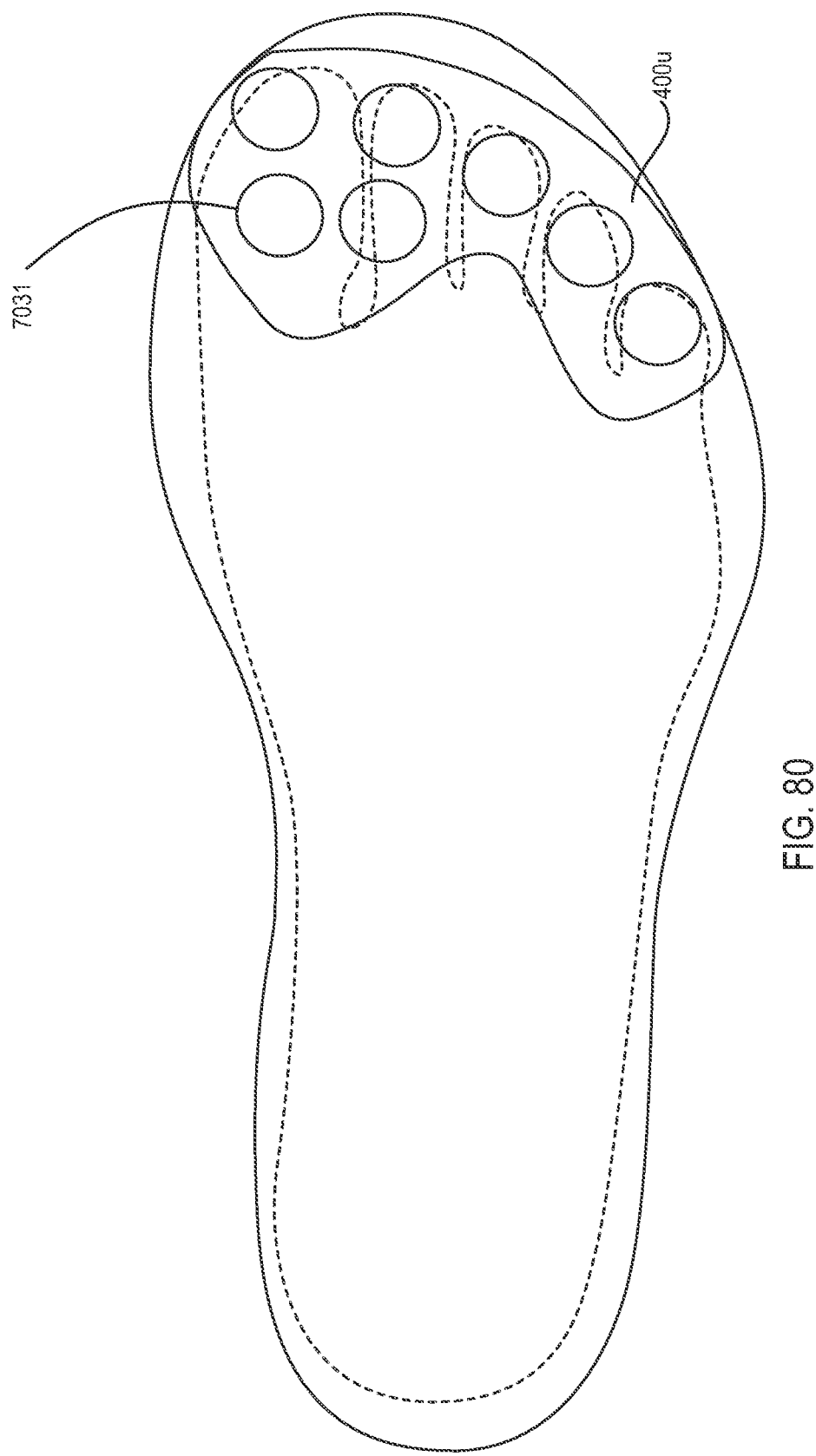
FIG. 80 shows a device that may be located in a forefoot portion of a shoe in accordance with an embodiment.

FIG. 80 shows a device 400u that may be located in the forefoot portion of a shoe in accordance with an embodiment. The device 400u may be configured to be shaped similar to a forefoot portion of a foot. The device 400u may include one or more springs 7031 that are sandwiched between top and bottom plates of the device 400u. In various embodiments, there may be at least one spring 7031 for each toe of the foot. The device 400u may be positioned in the shoe such that there is at least one spring 7031 under each toe. As shown in FIG. 80, there may be two springs 7031 under some of the toes of the foot.

Various embodiments provide a method of manufacturing a shoe. The method includes providing a midsole with a cavity in a forefoot portion of the midsole, assembling a device with a filler material and springs located between top and bottom plates, with the springs located in openings in the filler material. The method may include putting a pin through hinges of the top and bottom plates. The method may further include placing the device in the cavity in the midsole, placing an insole over the device and the midsole, and placing a sockliner over the insole. In various embodiments, the method includes attaching a propulsion enhancement material to a bottom side of a forefoot portion of the sockliner, and attaching a heel shock absorber to a bottom side of a heel portion of the sockliner. In some embodiments, the method includes attaching a shank to the midsole. In some embodiments, the method includes providing a window in an outsole and attaching the midsole to the outsole in a location such that the device is at least partially visible through the window in the outsole.

Embodiments include shoes that may increase the vertical leap of an individual. Embodiments may include a device placed in a cavity in a shoe. The device may be located under the forefoot in front of a ball of the foot and a flex zone of the shoe.

An embodiment of the device may include two plates made of a strong light weight rigid material. In an example embodiment, the rigid material may be high-durometer Pebax®, or thermoplastic materials such as TPU® or TPX®. Pebax® is a high performance elastomer which offers outstanding compression properties while providing excellent durability which increases fatigue resistance. The two plates of the device may be joined at a hinge. In an example embodiment, the hinge may be seamless to provide strength and support.

An embodiment of the device may include a nest that includes a filler material such as high-rebound EVA. The filler material may be located between the top and the bottom Pebax® plates. One embodiment of the filler material may include up to 8 circular die-cut holes. The holes may be configured to house vertical compression springs with a high bias force pushing the plates apart with a high amount of torque and energy return.

A high density shank may be located behind the device on the outsole of the shoe. The shank provides another level of engagement in a compression-propulsion-liftoff response method. The shank may be made of high durometer Pebax® and provides a level of stability between the forefoot and the heel portions of the shoe. The shank also absorbs shock and enhances the transfer of energy to the device to increase a vertical leap of an individual.

The combination of the three separate energy return substances: Pebax®, rebound EVA, and compression springs of the device working in concert increases the vertical leap of an individual. Since in various embodiments the device is inserted in the midsole of a shoe, the individual wearing the shoe according to embodiments does not feel the device against their foot.

In an example embodiment, utilizing extremely high rebound EVA in the midsole of the shoe as well as in the insole that lies underneath the sockliner of the shoe provides cushioning, comfort, and the return of energy to the foot during a jumping or liftoff phase. The sockliner may include highly advanced materials designed to provide shock absorption under the heel and additional energy return under the forefoot to further propel the user upward during the liftoff phase of the jump. In one example embodiment, the material under the heel may be made of Poron®, a shock absorption substance, and under the forefoot portion of the sockliner may lie a sheet of ESS, which is a propulsion enhancement material. In various other embodiments, a shock absorption material, such as Poron® or other cushioning material, may be attached under both the heel and forefoot portion of the sockliner, or even cover an entire bottom surface of the sockliner, to provide added cushioning.

According to various embodiments, when an athlete applies force to the front of the foot in preparation for liftoff, the shank, sockliner, insole, midsole, device, and the outsole all compress to generate a huge amount of energy exerted downward into the device. As the athlete begins to release the massive force that has been exerted downward, the energy is transferred in reverse order up through the device to provide a dramatic lift that increases the vertical leap of the athlete wearing the shoe. In various embodiments, providing the sockliner with the propulsion enhancement material, such as ESS attached to a forefoot portion of the bottom of the sockliner, would provide for an enhanced return of energy and added lift during a jump. In various embodiments where the sockliner is provided with cushioning material under the forefoot portion of the sockliner rather than the propulsion enhancement material, lift would still be provided by the shank, insole, midsole, device, and outsole working together.

Embodiments of a top and bottom plate for a device may be shaped to be oval, round, elliptical, rectangular, or even irregular shapes. Embodiments may include smaller compression springs assembled around an interior perimeter inside an EVA nest and a larger compression spring in a die-cut hole located at a center of the EVA nest. Embodiments of the top and bottom plates with Pebax may have two levels of hardness of about 40° or 63°. In yet other embodiments, the hardness of high elasticity EVA inserted around springs may be 35°.

Various embodiments include springs with a wire having a thickness of about 1.2 mm and an inner diameter of the spring coil of about 15 mm. In various embodiments, the height of each spring may be about 5 mm or about 7 mm. One advantage of using high elasticity EVA can be that it keeps springs firmly in place and prevents sideways movement of the springs during compression. Embodiments of the filler material may have hardness of about 35°, which may be less than the hardness of the springs. Any desirable hardness of the filler material may be used.

In an embodiment, a thickness for a midsole at the forefront may be from about 8 to 12 mm. In yet another embodiment, the plates may be made of rigid materials like Delrin (Acetal or POM) and the plates may be about 3 mm thick. In yet another embodiment, a device in a shoe may be visible to a user of the shoe through a lateral or a medial side wall of the shoe. In yet another embodiment of a device, top and bottom plates for the device may remain parallel throughout the compression and the expansion of the device. Various embodiments may be described as creating a spring sandwich of the two plates holding the filler materials and the springs, and can be used as a cassette to be dropped into a cavity in a midsole of a shoe.

Figure 81:
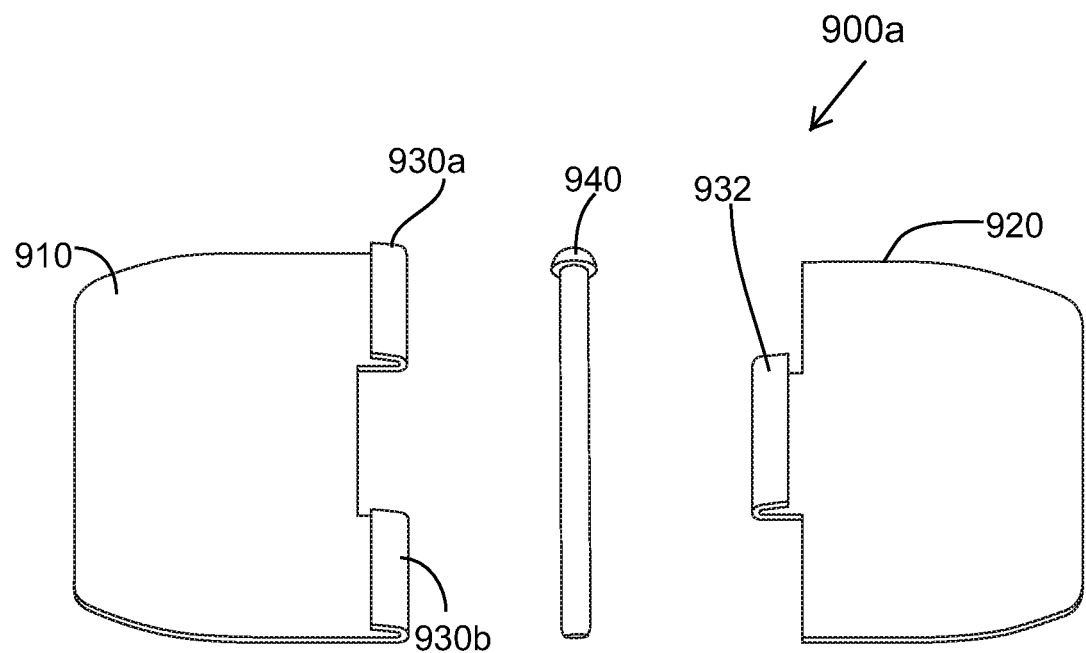
FIG. 81 shows an exploded view of part of a device in accordance with an embodiment.

FIG. 81 shows an exploded view of parts of a device 900a that may be used in any of the shoes described above. The portion of the device 900a includes a bottom plate 910, a top plate 920, a first hinge 930a, a second hinge 930b, a top plate hinge 932, and a pin 940. Embodiments of the top and bottom plates 920 and 910 can be made of a polyether block amide (PEBA) material, such as the PEBA material known as Pebax® that is manufactured by ARKEMA. In various other embodiments, the top and bottom plates 920 and 910 may be made of strong yet light weight materials, such as metals alloys, titanium, carbon graphite, or the like. The device 900*a* may be assembled by placing the hinges 930*a*, 930*b*, and 932 adjacent to one another and passing the pin 940 through a hollow opening created by the hinges 930*a*, 930*b*, and 932. When assembled as described above the two plates 910 and 920 create a cavity that allows the placement of a nest capable of retaining springs or other items capable of generating repulsive force.

Figure 82:
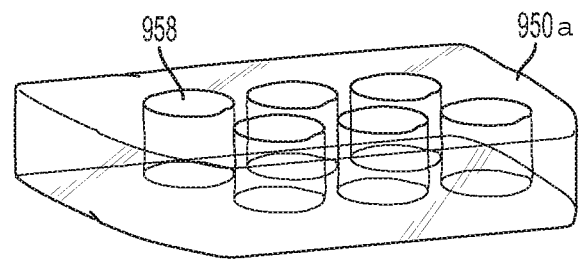
FIG. 82 shows a nest in accordance with an embodiment that is filled with gas and has cavities.

FIG. 82 shows a nest 950*a* that is filled with one or more gases. The nest 950*b* can have cavities 958 with sealed edges. In various embodiments the nest 950*a* may be placed between the top and bottom plates 920 and 910 shown in FIG. 81. The nest 950*a* may be a bag that has a space within to retain gases. Thus, in various embodiments, the nest 950*a* is a gas filled bag. In various example embodiments, the nest 950*a* may be made of polyurethane or another flexible material. In some embodiments, the nest 950*a* is made of plastic. In various embodiments, the nest 950*a* may be filled with a gas that is lighter than the molecular weight of air. In various embodiments, the nest 950*a* may be filled with helium, neon, methane, ammonia, hydrogen, nitrogen, or the like. Some embodiments of the nest 950*a* may also be filled with compressed air and/or compressed nitrogen in combination with other gases. In various embodiments, the nest 950*a* may be filled with compressed air in combination with one or more other gasses, such as helium. As shown in FIG. 82, the nest 950*a* may have sealed die-cut holes with circular openings 958 to serve as a nest for springs. In various other embodiments, the nest 950*a* may hold one or more of gasses, liquids, or gels.

Figure 83A:
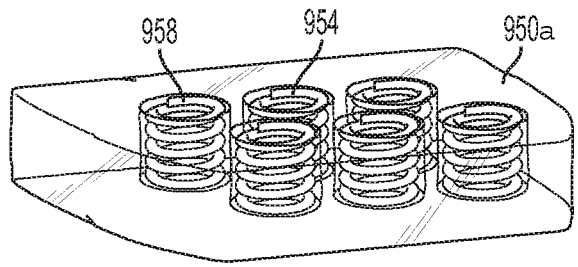
FIG. 83A shows the nest from FIG. 82 with springs inserted within the cavities.
Figure 83B:
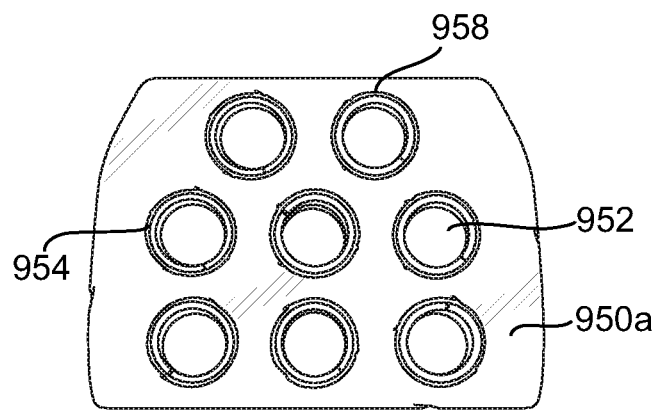
FIG. 83B shows cavities created by openings in a nest, with springs in the cavities.
Figure 83C:
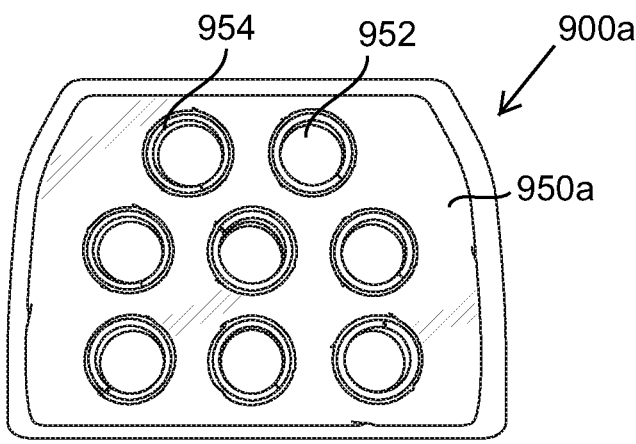
FIG. 83C shows a device in accordance with an embodiment with a nest filled with gas.
Figure 83D:
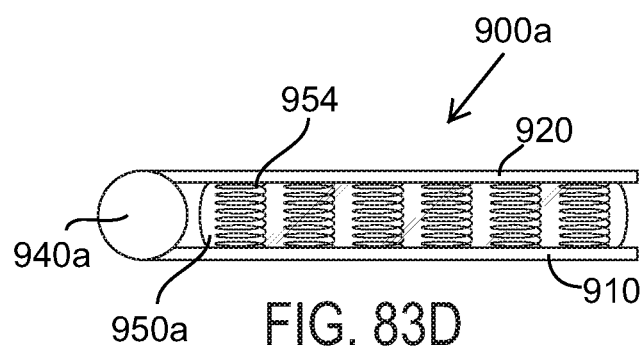
FIG. 83D shows a side view of a device in accordance with an embodiment with a top plate and a bottom plate and a gas filled nest between the top plate and the bottom plate.

FIG. 83A shows the nest 950*a* filled with one or more gasses and having cavities 958. Springs 954 may be inserted into the cavities 958 of the nest 950*a*. The nest 950*a* in conjunction with the top and bottom plates 920 and 910 (refer to FIG. 81) may retain the springs 954. FIG. 83B shows a top view of the nest 950*a* shown in FIG. 83A. The cavities 958 allow cylindrical springs 954 to be inserted into the cavities in the nest 950*a* with openings 952 inside the springs 954. FIG. 83C shows a portion of the device 900*a* with the nest 950*a* filled with one or more gasses. Also shown in FIG. 83C are springs 954 inserted into cavities of the nest 950*a*. FIG. 83D shows a side view of the device 900*a* with the top plate 920 and bottom plate 910. In FIG. 83D, the nest 950*a* that is filled with one or more gasses and that is holding the springs 954 is shown as having been inserted between the top plate 920 and the bottom plate 910. Also shown in FIG. 83D is a pin 940*a* inserted through the hinges in the plates 920 and 910. Another embodiment of the pin 940*a* may include a biased spring that applies repulsive force to separate the two plates 920 and 910. The device 900*a* may be inserted into a shoe in a similar manner as the device 400*a* (refer to FIG. 20). In various embodiments, the device 900*a* is positioned entirely in a forefoot portion of a shoe such that the top and bottom plates 920 and 910 are located entirely ahead of a ball portion of the shoe and entirely in front of a flex zone of the shoe.

In various embodiments, there are two rows of three springs each between the top and bottom plates 920 and 910. In some embodiments, the nest 950*a* is filled with approximately 100% nitrogen. In some embodiments, the nest 950*a* is filled with nitrogen and the pressure level inside of the nest 950*a* is between 6 psi and 7 psi. In some embodiments, the springs 954 are made of nickel and have a diameter of 0.9 mm and a width of 10.5 mm. In various embodiments, the top and bottom plates 920 and 910 are made of polyether block amide and have a hardness of 55 D or less. In some embodiments, the top and bottom plates 920 and 910 are made of polyether block amide and have a hardness of 72 D or less.

Figure 84A:
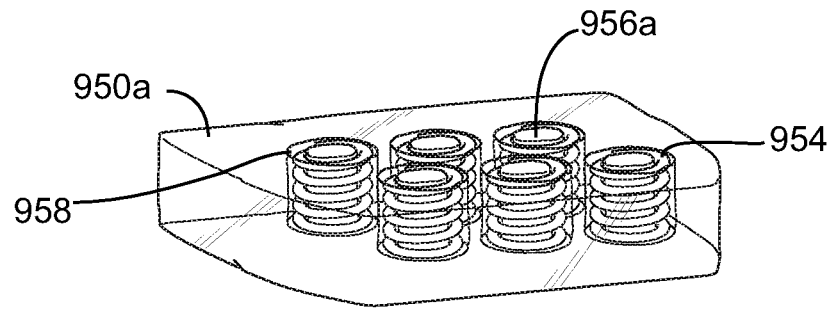
FIG. 84A shows an embodiment of a device with a nest and springs on pods in cavities within the nest.
Figure 84B:
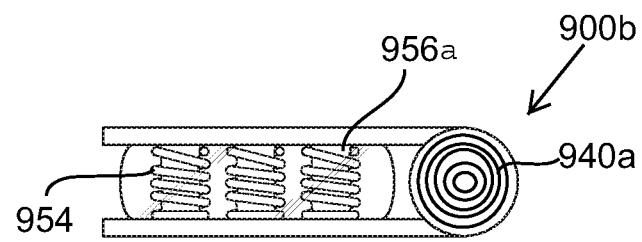
FIG. 84B shows a side view of the device of FIG. 84A between a top plate and a bottom plate.

FIG. 84A shows an embodiment of a nest 950*a* that may be used to hold the springs 954 in place between the top and the bottom plates 920 and 910 (refer to FIG. 81). In this embodiment, pods 956*a* having one or more gasses or compressed gasses within a bag, such as a polyurethane or plastic bag, may be inserted within the opening in the center of each spring 954. In some embodiments, each pod 956*a* may be filled with compressed air in combination with one or more other gasses, such as helium. FIG. 84B shows a side view of a device 900*b* that includes the nest 950*a* from FIG. 84*a* with the springs 954 and pods 956*a*. The device 900*b* may further include a spring 940*a*. The device 900*b* may be inserted into a shoe in a similar manner as the device 400*a* (refer to FIG. 20).

Figure 85A:
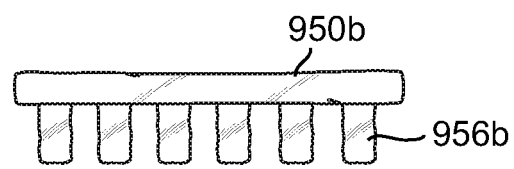
FIG. 85A shows a side view of a nest in accordance with an embodiment having pods that may be surrounded by springs.
Figure 85B:
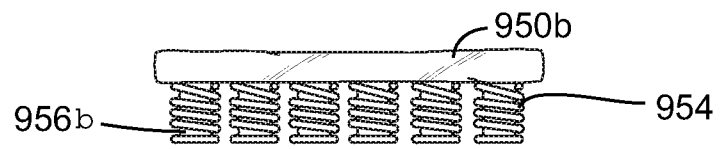
FIG. 85B shows a side view of an embodiment of a nest with springs located around pods of the nest.

FIG. 85A shows a side view of a nest 950*b* in accordance with an embodiment having pods 956*b* or protrusions that may be surrounded by springs 954 (refer to FIG. 85B). FIG. 85B shows a side view of an embodiment of the nest 950*b*. This embodiment of the nest 950*b* is formed by a gas filled bag with gas filled pods 956*b* that protrude from the larger gas filled bag. In some embodiments, the nest 950*b* with the protruding pods 956*b* is filled with one or more gasses, such as compressed air in combination with helium, or the like. In some embodiments, the pods 956*b* may be in a cylindrical or conical shape. In various embodiments, the pods 956*b* may be filled with the same gas or gasses as the nest 950*b*. In various other embodiments, the pods 956*b* may be filled with different gas or gasses than the nest 950*b*. In some embodiments, the pods 956*b* are formed as one continuous member with gas filled bag of the nest 950*b*. The springs 954 may surround the pods 956*b* and an outer circumference of the pods 956*b* may hold the springs 954 in position. The pods 956*b* may be inserted within an interior volume of the springs 954.

Figure 86:
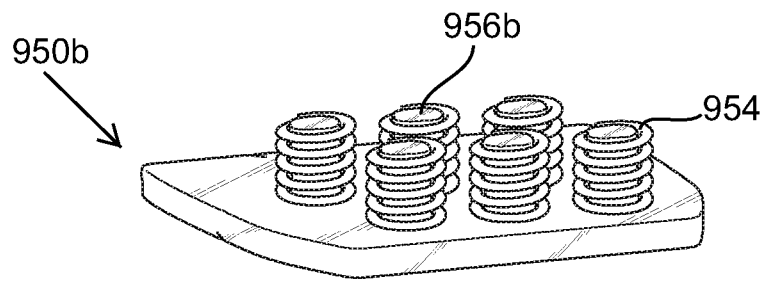
FIG. 86 shows a nest in accordance with an embodiment with springs located around pods of the nest.
Figure 87:
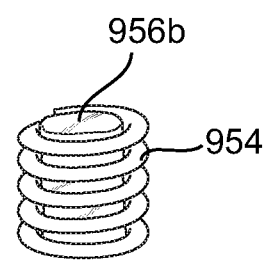
FIG. 87 shows a cylindrical spring surrounding a pod in accordance with an embodiment.

FIG. 86 shows a bottom view of the nest 950*b* in accordance with an embodiment. The top of pods 956*b* is shown in FIG. 86. The pods 956*b* are shown protruding from one side of the bag that forms the nest 950*b*. FIG. 87 shows a single cylindrical spring 954 surrounding a single pod 956*b*. Various other embodiments may have multiple pods 956*b* within a single spring 954.

Figure 88A:
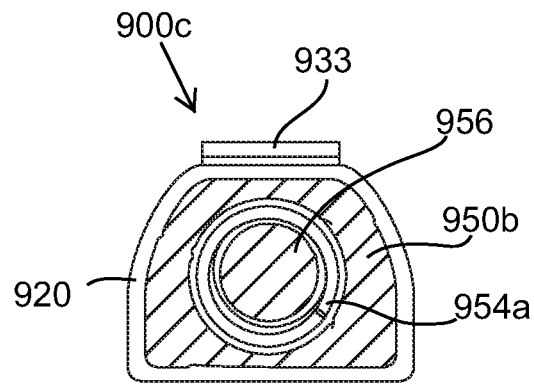
FIG. 88A shows an embodiment of a device.
Figure 88B:
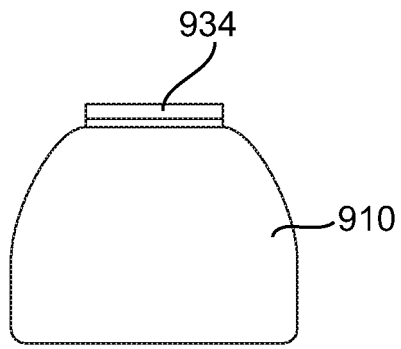
FIG. 88B shows a bottom plate of a device in accordance with an embodiment with a hinge that may be attached to a top plate.
Figure 88C:
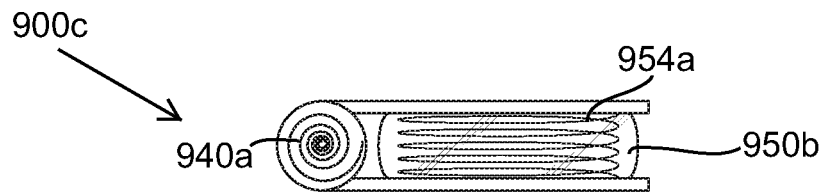
FIG. 88C shows a side view of the device from FIGS. 88A and 88B.

FIG. 88A shows an embodiment of a device 900*c* in accordance with an embodiment. The device 900*c* includes a single spring 954*a* within a nest 950*b*, and has a pod 956 that is inserted at the center of the spring 954*a*. The device 900*c* may have a hinge 933 on a top plate 920. FIG. 88B shows a bottom plate 910 with a hinge 934 that may be attached to the top plate 920 (refer to FIG. 88A). FIG. 88C shows a side view of the device 900*c* with a spring 940*a* attached to the hinges of the top plate 920 and the bottom plate 910 (refer to FIGS. 88A and 88B). The device 900C includes the nest 950*b* with the single spring 954*a*. The device 900C may be placed at various locations within a shoe.

Figure 89:
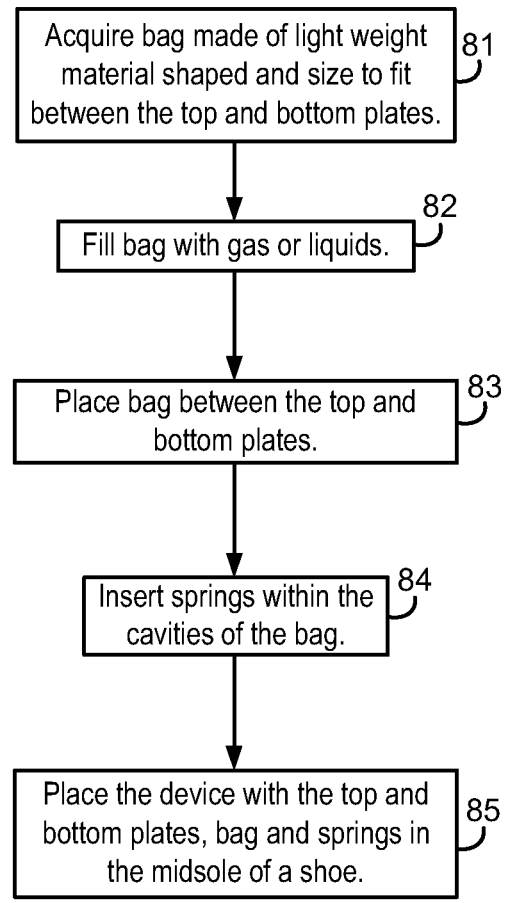
FIG. 89 shows a flow chart of a method in accordance with an embodiment that may be used to make a shoe.

FIG. 89 shows a flowchart of a method that may be used to make a shoe according to various embodiments. At step 81, a bag made of a material capable of holding one or more gasses and capable of being shaped and sized to fit between a bottom plate and a top plate may be acquired. In one embodiment, the bag may be formed to have one or more cavities to allow one or more springs to be inserted into the cavities. The bag may be made of various materials, such as, polyurethane, thermoplastic polyurethane or the like. The material of the bag may be elastic and thick enough to hold pressurized gasses inside the bag while allowing springs to be in the cavities of the bag. For example, in various embodiments, the walls of the bag may be at least 1, 2, or 3 mm thick. In some embodiments, the walls of the bag may be 5, 6, or 7 mm thick. At step 82, the bag may be filled with gases or liquids, such as, one or more of compressed helium, compressed nitrogen, and/or compressed air. In some embodiments, the bag is filled with compressed air in combination with helium. In step 83, the bag may be sandwiched between the top and bottom plates. In step 84, springs may be inserted within the cavities of the bag. In some embodiments, springs may be placed on the top or bottom plates before the bag is placed between the plates. In step 85, the device that comprises the top and bottom plates with the bag and the springs may be placed within the midsole of a shoe. In various embodiments, the location of the device may vary, for example, various embodiments of the device may be inserted into one or more of the heel portion, arch portion, ball portion, and/or forefoot portion of a shoe.

FIG. 90A shows a bottom view of a shoe 8000*a* in accordance with an embodiment. Shoe 8000*a* has a plurality of devices 900*c* (refer to FIG. 88C) installed in a sole or a midsole of the shoe 8000*a*. In the example embodiment shown in FIG. 90A, the midsole of the shoe 8000*a* has at least twenty devices 900*c*, and the devices 900*c* are visible through openings in a sole of the shoe 8000*a*. In alternative embodiments the midsole of the shoe may have less than or more than 20 devices 900*c*, for example, 10, 12, 14, 16, 18 or more devices. In various embodiments, hinges of the devices 900*c* that are placed in the forefoot portion 58 and the ball portion 56 of the shoe 8000*a* may be located closer to the heel of the shoe 8000*a* than to the front of the shoe. Also, in various embodiments, hinges of the devices 900*c* that are placed in the heel portion 52 of the shoe 8000*a* may be located closer to the front of the shoe 8000*a* than to the back of the shoe 8000*a*.

FIG. 90B shows a side view of the shoe 8000*a* with the devices 900*c* inserted into the midsole of the shoe 8000*a*. Also shown is the top plate 920 and the bottom plate 910 of the devices 900*c*. The devices 900*c* have a spring that is biased to provide repulsive force when force is applied against the top or the bottom plates. FIG. 90C shows the back of the shoe 8000*a* and three devices 900*c*. The devices shown in FIG. 90C may be located in the midsole of the shoe 8000*a*. In various other embodiments the devices 900*c* may be placed in the sole of the shoe 8000*a*. In various embodiments, some of the devices 900*c* are placed in a midsole of the shoe 8000*a* while other ones of the devices 900*c* are placed in the sole of the shoe 8000*a*. FIG. 91 shows a side view of a shoe 8000*b* with devices 900*c* that have been inserted in the heel portion of the shoe 8000*b* above a wish-bone shaped portion of the sole of the shoe.

Figure 92:
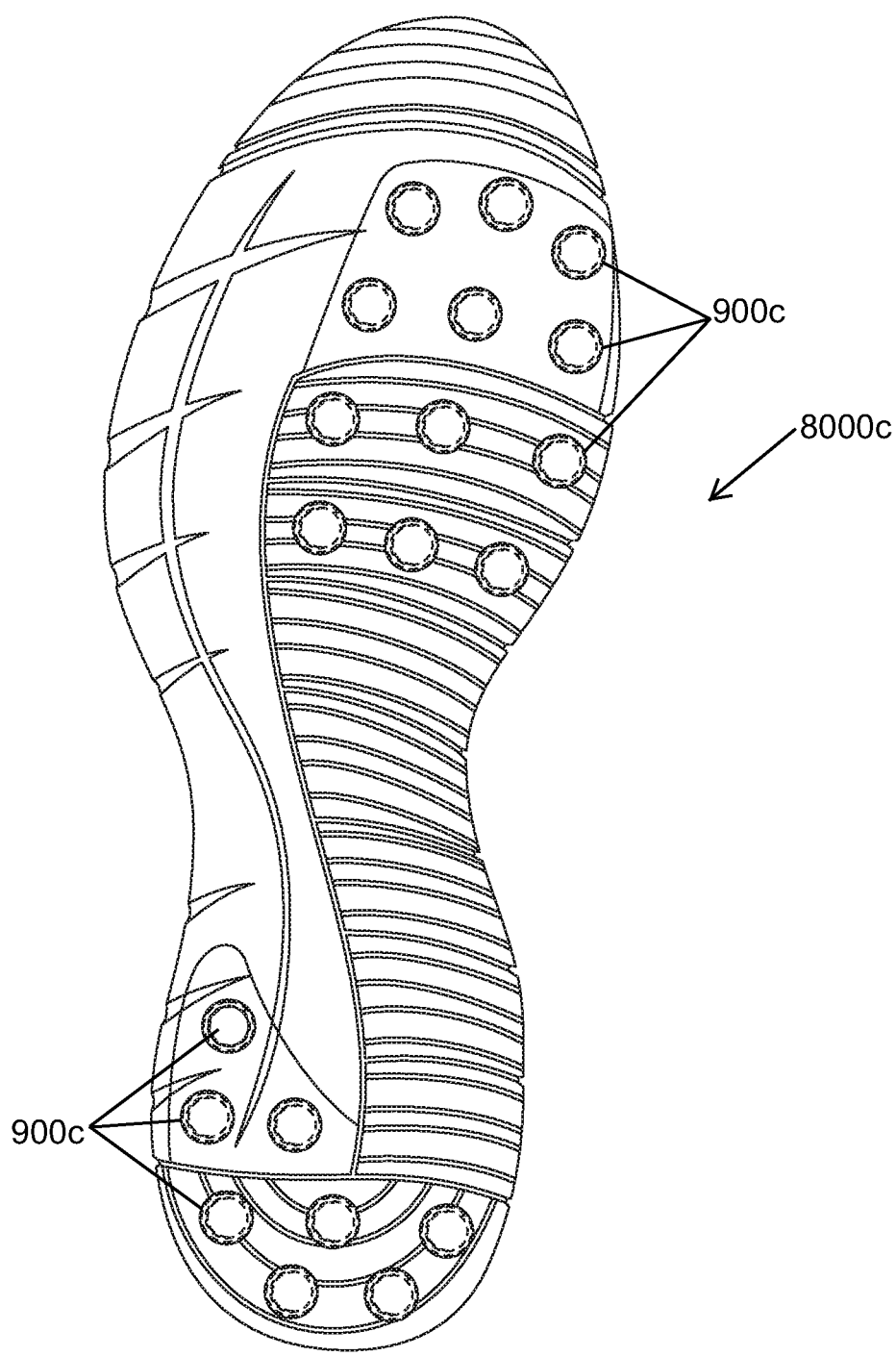
FIG. 92 shows a shoe in accordance with an embodiment with devices that have been inserted into portions of the shoe.

FIG. 92 shows a shoe 8000*c* with devices 900*c* that have been inserted into a portion of the forefoot portion, a portion of the ball portion, and a portion of the heel portion of the shoe. The devices 900*c* may be placed to be customized for a runner's step. For example, a runner may exert more force at the ball portion of the shoes where the ball of the large toe is located. Also the concentration of the devices 900*c* may be greater at one outer side of the heel portion than an inner side of the heel portion. In various embodiments, as illustrated in FIG. 92, there may be a greater number of devices on an outer side of a heel portion than on an inner side of the heel portion. As shown in FIG. 92, in various embodiments the part of the shoes under the smaller toes might not have any device, since a runner exerts more force in other parts of the shoe during a running movement. In some embodiments, there may be a greater number of devices on a big toe side of the forefoot portion than on a pinky toe side of the forefoot portion.

Figure 93:
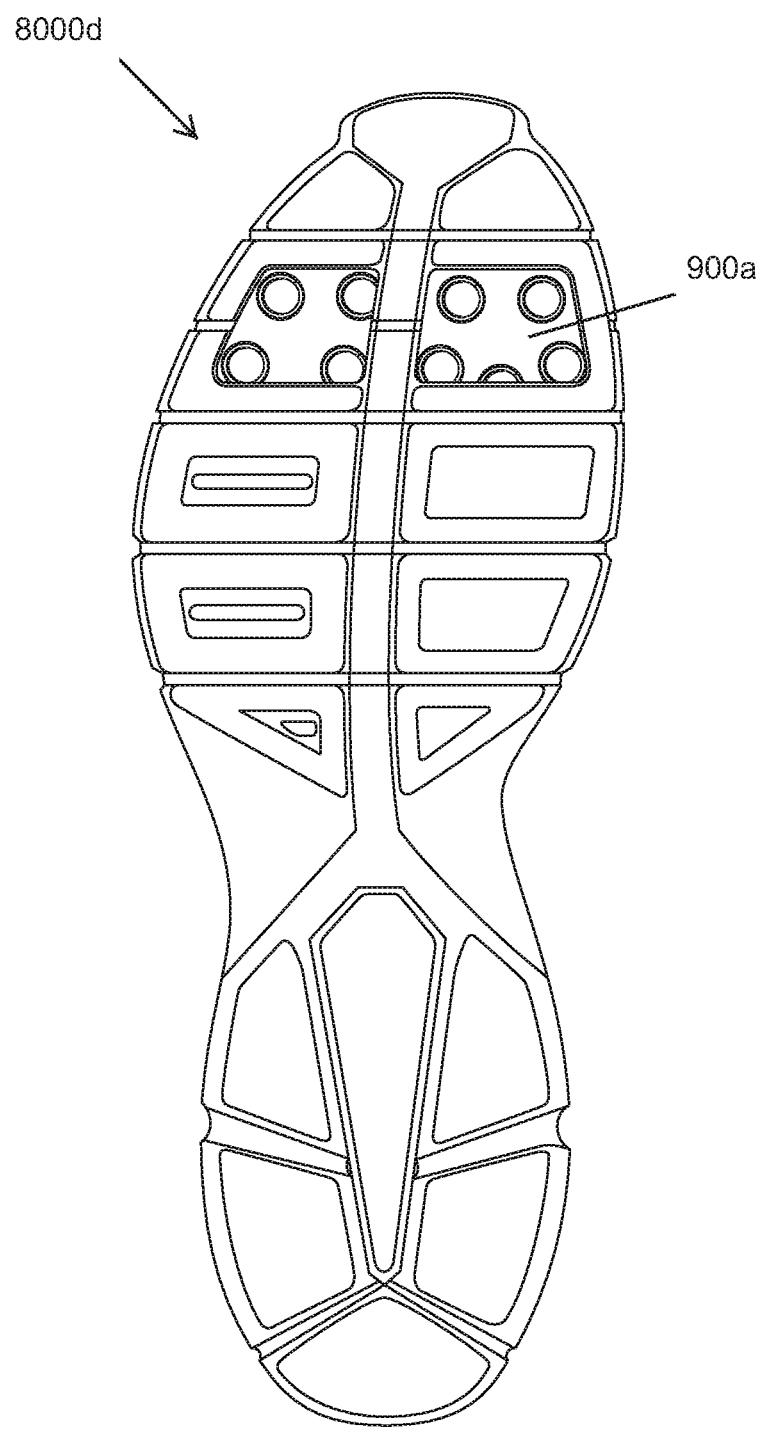
FIG. 93 shows an embodiment of a shoe in accordance with an embodiment.

FIG. 93 shows an embodiment of a shoe 8000*d* in accordance with an embodiment. In this embodiment, the device 900*a* (refer to FIG. 83D) may be inserted in the forefoot portion of the shoe. In various embodiments, the device 900*a* is positioned entirely in a forefoot portion of the shoe 8000*d* such that the device 900*a* is located entirely ahead of a ball portion of the shoe and entirely in front of a flex zone of the shoe. As shown in FIG. 93 the springs may be visible through a clear sole. In another embodiment, the springs may not be shown though the sole.

Figure 94A:
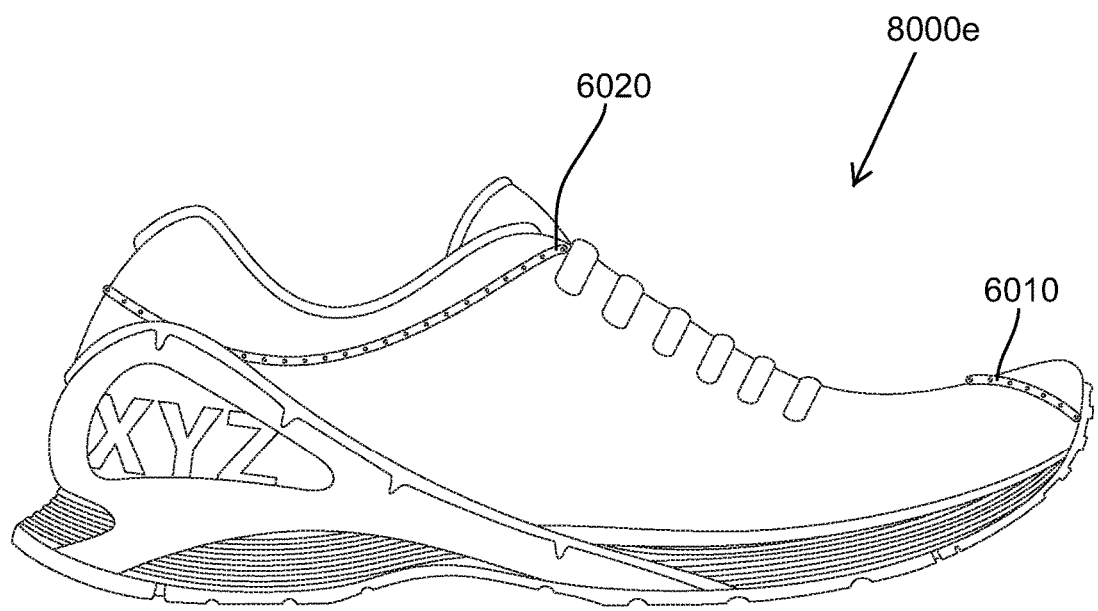
FIG. 94A shows a side view of an embodiment of a shoe in accordance with an embodiment.

FIG. 94A shows a side view of a shoe 8000*e* in accordance with an embodiment. Shoe 8000*e* may include a plurality of lights on the upper of the shoe 8000*e*. In one embodiment, some of the lights on the upper may be made of reflective materials. Shoe 8000*e* shows lights 6010 located at the forefoot portion of the shoe 8000*e*. The lights 6010 on the shoe 8000*e* may travel across to the other side of the shoe shown in FIG. 94B. The lights 6010 may be encapsulated in piping. In some embodiments, the lights used on the shoe may be low energy light emitting diodes. The lights may allow the wearer of the shoe 8000*e* to be visible in low lighting conditions. The shoe 8000*e* may further include a device, such as the device 900*a* (refer to FIG. 83D) located in a midsole of the shoe 8000*e*.

Figure 94B:
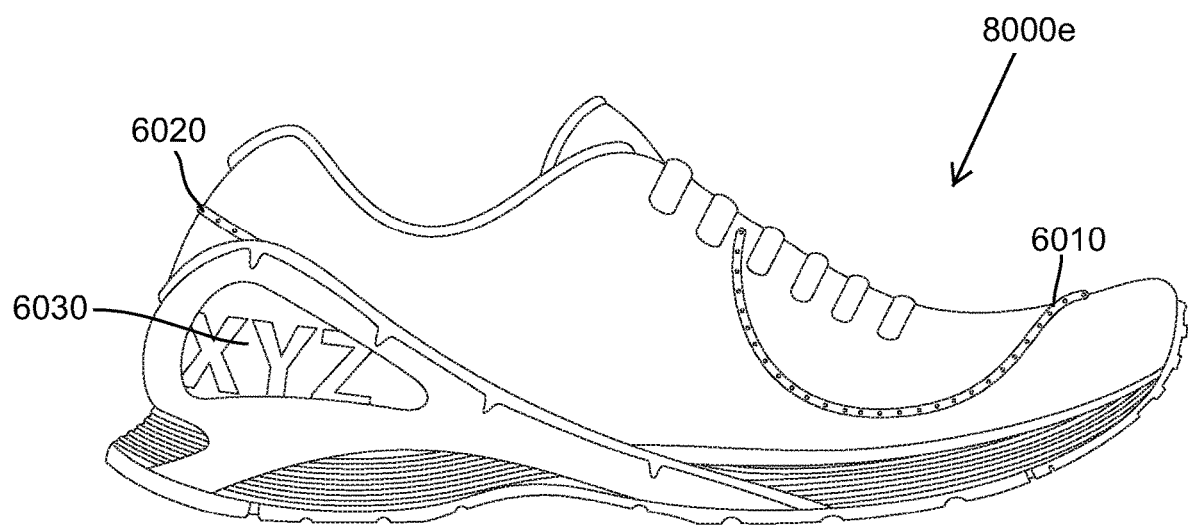
FIG. 94B shows a side view of a shoe in accordance with an embodiment.

FIG. 94A also shows another set of lights 6020 that are located on the upper of the shoe 8000*e*. FIG. 94B shows a side view of the shoe 8000*e* from FIG. 94A. Lights 6010 are shown as a trail of lights that goes toward the laces in the upper of the shoe 8000*e*. Lights 6020 are shown toward the rear of the upper of shoe 8000*e*. Also shown in FIG. 94B is a lighted triangle 6030 where a manufacturer of the shoe 8000*e* may be able to display a lighted logo. The shoe 8000*e* may also include an on/off switch for the lights 6010, 6020, and 6030. Various advantages may be realized with the use of the lights in shoe 8000*e*. For example, the shoe 8000*e* may have a higher visibility in the dark. In various other embodiments, if the shoe 8000*e* had device 900*a* (refer to FIG. 83D) or other similar device, then the lights 6010, 6020, and/or 6030 may light up to indicate a proper use of the device to a user of the shoe 8000*e*.

Figure 95A:
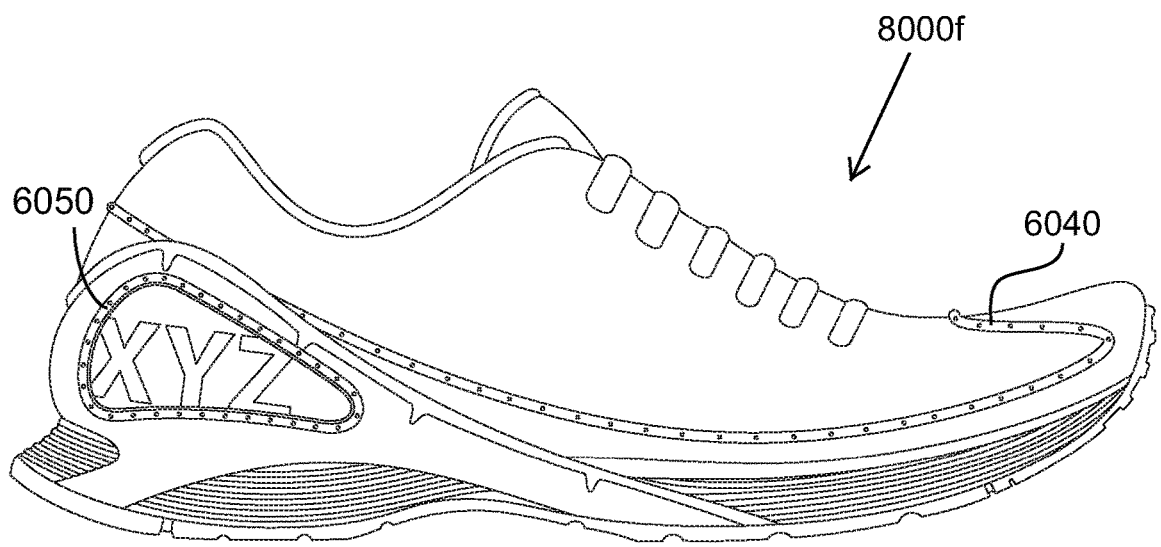
FIG. 95A shows a side view of an embodiment of a shoe.
Figure 95B:
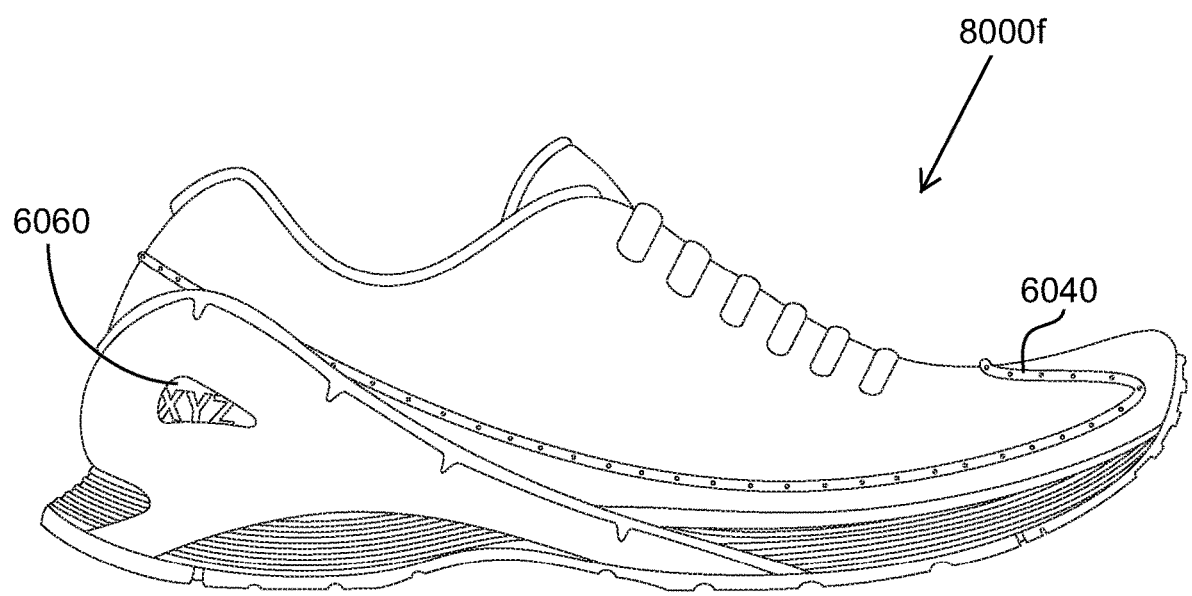

FIG. 95A shows a side view of a shoe 8000*f* in accordance with an embodiment. Shoe 8000*f* has a pattern of lights 6040 that is attached to an upper of the shoe 8000*f* and trails from the front to the rear of the shoe 8000*f*. Lights 6050 may be in a triangular shape near the rear of the shoe 8000*f*. The lights 6050 may allow for lighting up a logo of a company selling the shoe. FIG. 95B shows another side view of the shoe 8000*f* from FIG. 95A. FIG. 95B shows lights 6040 from FIG. 95A from another view. Also shown in FIG. 95B is a light triangle 6060 that may act as an on/off switch for the lights 6040. The light triangle 6060 may also have lights to indicate to a user the location of the on/off switch.

Figure 96:
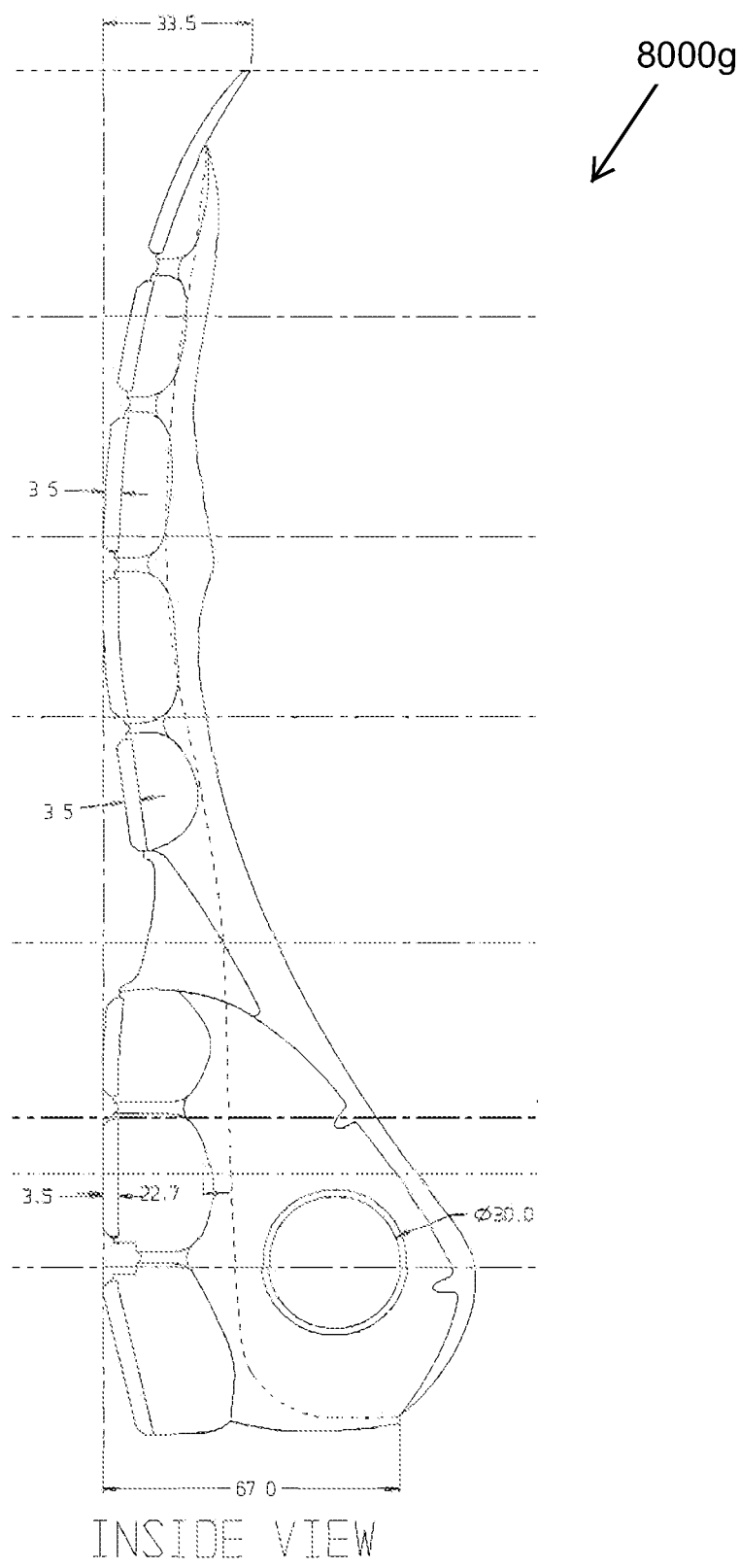
Figure 97:
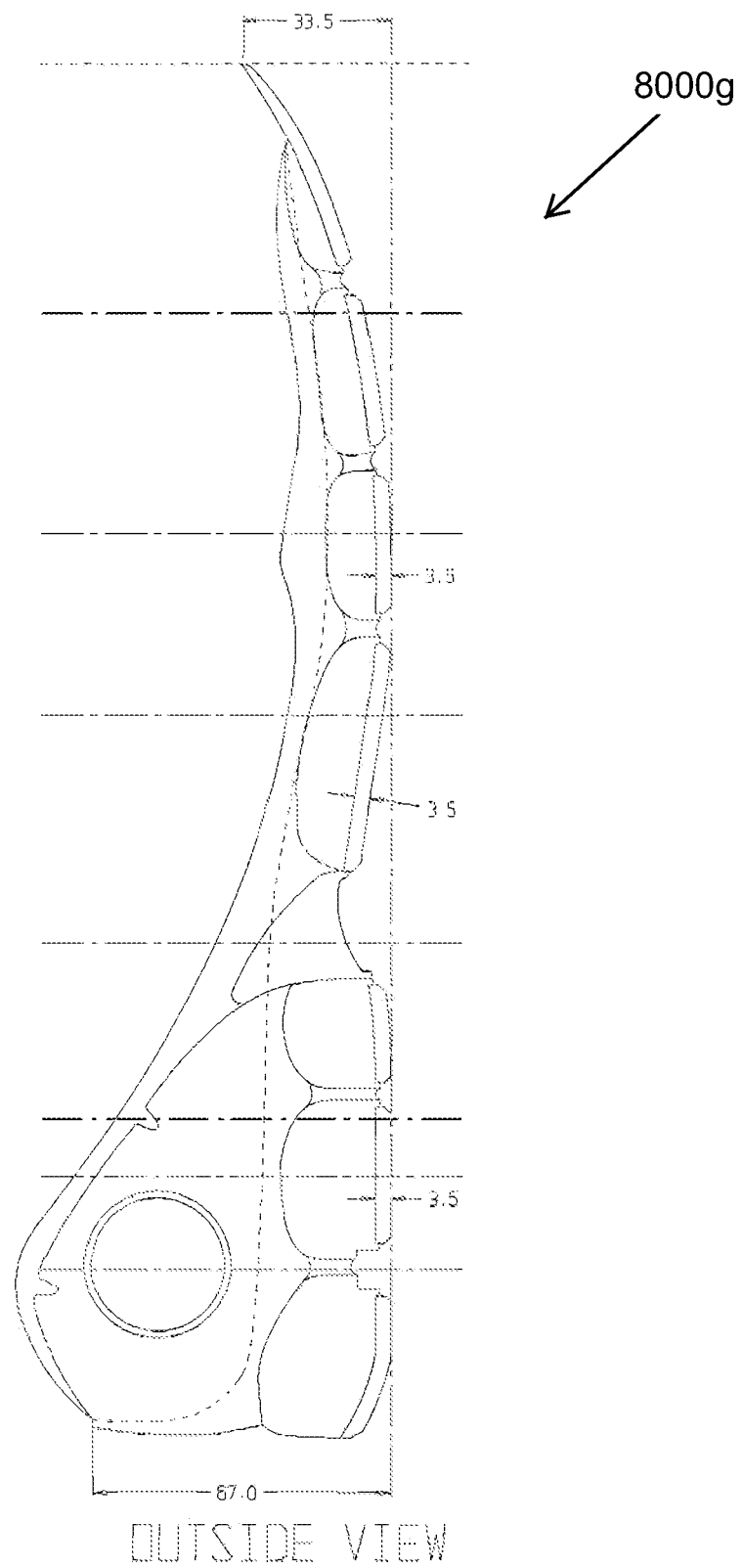
Figure 98:
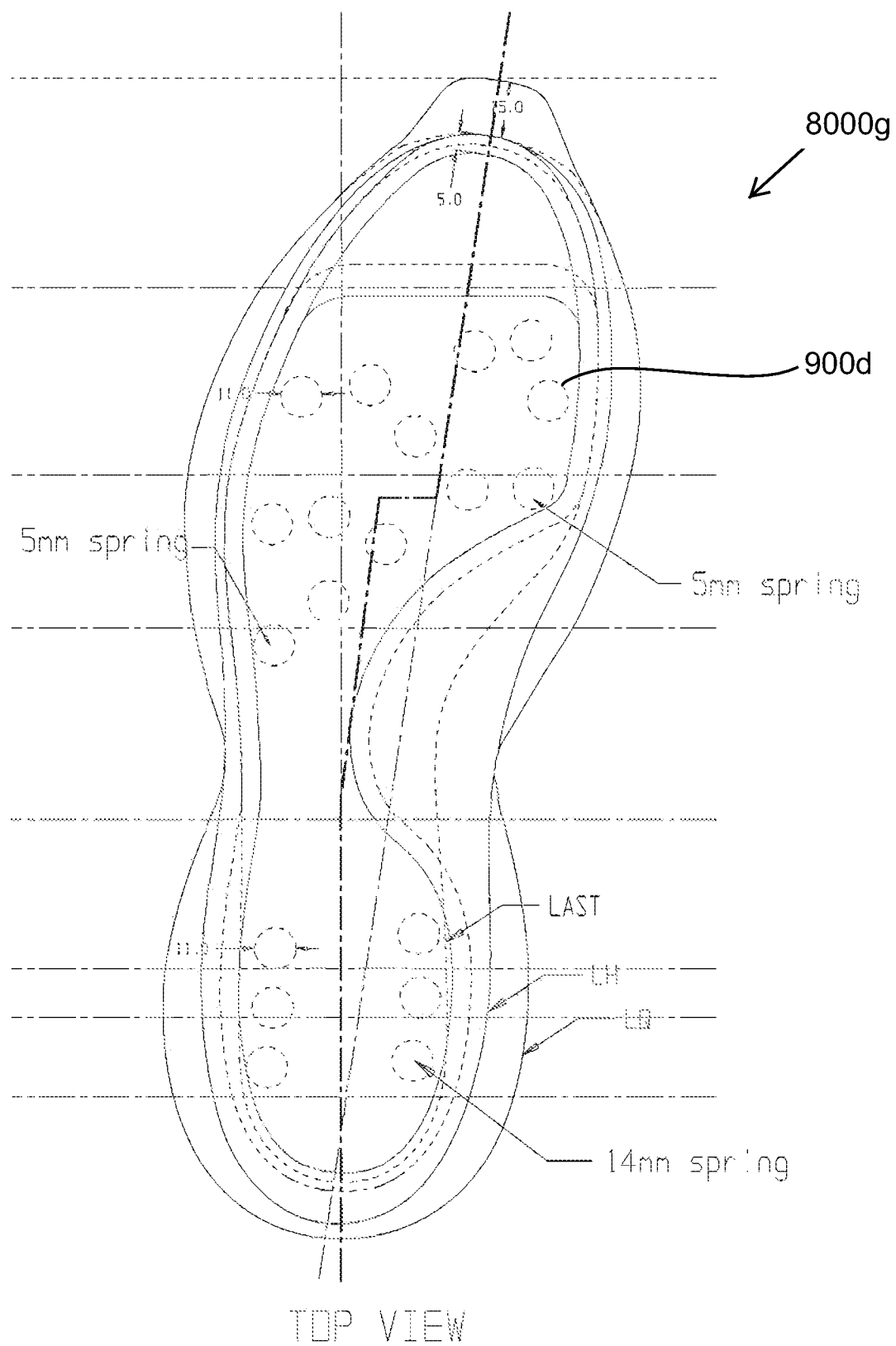

FIG. 96 shows a schematic diagram of an inside view of an embodiment of a shoe 8000*g*. FIG. 97 shows an outside view of the shoe 8000*g* of FIG. 96. FIG. 98 shows a top view of the shoe 8000*g* of FIGS. 96 and 97. FIG. 99 shows a bottom view of the shoe of FIGS. 96-98, and a location of devices 900*d* in the shoe. In various embodiments, the devices 900*d* may be constructed similar to the device 900*c* (refer to FIG. 88C). FIG. 100*a* shows a cross sectional view of the shoe 8000g of FIG. 99 along the line A-A' from FIG. 99. FIG. 100b shows a cross sectional view of the shoe 8000g of FIG. 99 along the line B-B' from FIG. 99. FIG. 100c shows a cross sectional view of the shoe 8000g of FIG. 99 along the line C-C' from FIG. 99. FIG. 100d shows a cross sectional view of the shoe 8000g of FIG. 99 along the line D-D' from FIG. 99. FIG. 100e shows a cross sectional view of the shoe 8000g of FIG. 99 along the line E-E' from FIG. 99. FIG. 100f shows a cross sectional view of the shoe 8000g of FIG. 99 along the line F-F' from FIG. 99. FIG. 100g shows a cross sectional view of the shoe 8000g of FIG. 99 along the line G-G' from FIG. 99. FIG. 100h shows a cross sectional view of the shoe 8000g of FIG. 99 along the line H-H' from FIG. 99.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. A shoe, comprising:
   a first plate including a first hinge portion that is part of the first plate and that is curved only partially around a circumference of a first portion of a pin such that the first plate is curved around less than an entirety of the circumference of the first portion of the pin;
   a second plate including a hinge portion that is part of the second plate and that is curved only partially around a circumference of a second portion of the pin such that the second plate is curved around less than an entirety of the circumference of the second portion of the pin and such that the second plate is hinged together with the first plate by the pin; and
   at least one spring located between the first plate and the second plate;
   wherein an outer edge of the first hinge portion of the first plate is recessed from an outer edge of a top portion of the first plate in order to accommodate the pin such that a first end of the pin is flush with the outer edge of the top portion of the first plate; and
   wherein the first end of the pin and the hinge portion of the second plate are located to opposite sides of the first hinge portion of the first plate from each other.

2. The shoe of claim 1,
   wherein the at least one spring comprises a first plurality of springs supported on the second plate and a second plurality of springs positioned in a pattern around the first plurality of springs.

3. The shoe of claim 2,
   wherein the first plurality of springs includes four springs positioned in a rectangular pattern on the second plate.

4. The shoe of claim 2,
   wherein the second plurality of springs are positioned in a circular pattern around an outer perimeter of a top surface of the second plate.

5. The shoe of claim 1,
   wherein the first plate starts from a flex point of the shoe where the forefoot portion of the shoe begins at an end of a ball portion of the shoe, and the first plate extends all the way to a front of the shoe.

6. The shoe of claim 1, further comprising:
   at least one pad positioned on the second plate.

7. The shoe of claim 6,
   wherein the at least one spring includes a plurality of springs;
   wherein the at least one pad includes a plurality of pads; and
   wherein each pad of the plurality of pads surrounds a portion of a corresponding spring of the plurality of springs.

8. The shoe of claim 7,
   wherein the plurality of pads are made of a same material as the second plate.

9. The shoe of claim 7,
   wherein the second plate and the plurality of pads have been formed as a single unit.

10. The shoe of claim 7,
    wherein each pad of the plurality of pads includes a protrusion around which the corresponding spring of the plurality of springs is positioned.

11. The shoe of claim 10,
    wherein the protrusion of each pad of the plurality of pads is a cylindrical protrusion.

12. The shoe of claim 7,
    wherein each pad of the plurality of pads includes a raised step.

13. The shoe of claim 12,
    wherein the raised step of each pad of the plurality of pads has a size such that an inner diameter of the raised step is slightly greater than an outer diameter of the corresponding spring.

14. The shoe of claim 12,
    wherein the raised step of each pad of the plurality of pads creates a channel for the corresponding spring to sit in.

15. The shoe of claim 1,
    wherein the first plate further includes a second hinge portion that is part of the first plate and that is curved only partially around a circumference of a third portion of the pin.

16. The shoe of claim 15,
    wherein the hinge portion of the second plate is located between the first hinge portion and the second hinge portion of the first plate.

17. The shoe of claim 1,
    wherein the first plate is located within a cavity in a midsole of the shoe.

18. The shoe of claim 15,
    wherein the first hinge portion of the first plate is shorter than the second hinge portion of the first plate in a direction of an axis of the pin.

19. The shoe of claim 18,
    wherein the second hinge portion of the first plate extends to a second outer edge of the top portion of the first plate that is on an opposite side of the top portion of the first plate from the outer edge of the top portion of the first plate.

20. The shoe of claim 15,
    wherein the first hinge portion of the first plate and the second hinge portion of the first plate are curved from the top portion of the first plate at a first end of the first plate; and
    wherein the first hinge portion of the first plate has a height such that the top portion of the first plate is parallel to a bottom portion of the second plate when the at least one spring is in an uncompressed state.

* * * * *